US012258921B2

(12) United States Patent
Sugden

(10) Patent No.: US 12,258,921 B2
(45) Date of Patent: Mar. 25, 2025

(54) ENGINE INCORPORATING IMPROVED GOVERNOR LINKAGE

(71) Applicant: Discovery Energy, LLC, Kohler, WI (US)

(72) Inventor: Andrew J. Sugden, Sheboygan, WI (US)

(73) Assignee: Discovery Energy, LLC, Kohler, WI (US)

( * ) Notice: Subject to any disclaimer, the term of this patent is extended or adjusted under 35 U.S.C. 154(b) by 0 days.

(21) Appl. No.: 18/480,938

(22) Filed: Oct. 4, 2023

(65) Prior Publication Data

US 2024/0026832 A1 Jan. 25, 2024

Related U.S. Application Data

(63) Continuation of application No. 17/848,072, filed on Jun. 23, 2022, now Pat. No. 11,808,233.

(60) Provisional application No. 63/218,964, filed on Jul. 7, 2021.

(51) Int. Cl.

| | |
|---|---|
| ***F02D 9/10*** | (2006.01) |
| ***F02D 9/02*** | (2006.01) |
| ***F02D 11/04*** | (2006.01) |

(52) U.S. Cl.

CPC ........... *F02D 9/1065* (2013.01); *F02D 9/107* (2013.01); *F02D 11/04* (2013.01); *F02D 2009/0206* (2013.01); *F02D 2009/0261* (2013.01)

(58) Field of Classification Search

CPC ........ F02D 9/1065; F02D 9/107; F02D 11/04; F02D 2009/0206; F02D 2009/0261; F02D 31/00; F02D 9/08

See application file for complete search history.

(56) References Cited

U.S. PATENT DOCUMENTS

| | | | | |
|---|---|---|---|---|
| 2,040,807 A | | 5/1936 | Goodman | |
| 2,040,847 A | * | 5/1936 | Jonas | F02M 59/02 123/495 |
| 4,431,369 A | * | 2/1984 | Lucas | F01D 17/20 251/234 |
| 8,567,371 B2 | * | 10/2013 | Vaughn | F02D 31/003 123/376 |
| 8,616,180 B2 | | 12/2013 | Spitler et al. | |
| 11,808,233 B2 | * | 11/2023 | Sugden | F02D 11/04 |
| 2006/0130808 A1 | * | 6/2006 | Steffes | F02D 9/02 123/376 |

(Continued)

FOREIGN PATENT DOCUMENTS

| | | |
|---|---|---|
| CN | 101315047 A | 12/2008 |
| CN | 105275667 A | 1/2016 |

(Continued)

*Primary Examiner* — Phutthiwat Wongwian
*Assistant Examiner* — Susan E Scharpf
(74) *Attorney, Agent, or Firm* — The Belles Group, P.C.

(57) ABSTRACT

An engine having a linkage assembly, the linkage assembly having a governor lever, a governor shaft, and a throttle link. The governor lever couples the governor shaft to the throttle link. The governor lever is configured to adjust the relative position between the throttle link and the governor shaft. The governor lever has a primary arm and a secondary arm, the primary arm being movable with respect to the secondary arm. The primary arm and secondary arm are secured via a fastener which prevents relative motion between the primary and secondary arms.

20 Claims, 54 Drawing Sheets

(56) References Cited

U.S. PATENT DOCUMENTS

| | | | | |
|---|---|---|---|---|
| 2011/0005024 | A1* | 1/2011 | Spitler | F02D 11/04 123/339.16 |
| 2011/0214641 | A1* | 9/2011 | Vaughn | F02D 31/003 123/376 |
| 2011/0226217 | A1* | 9/2011 | Raasch | F02M 17/04 123/376 |
| 2016/0108856 | A1* | 4/2016 | Rotter | B01F 23/20 261/64.6 |
| 2018/0252168 | A1 | 9/2018 | Dlugi et al. | |
| 2018/0252190 | A1 | 9/2018 | Roth et al. | |
| 2023/0008610 | A1* | 1/2023 | Sugden | F02D 9/1065 |
| 2023/0100841 | A1* | 3/2023 | Hashimoto | F02N 11/0803 123/434 |

FOREIGN PATENT DOCUMENTS

| | | | |
|---|---|---|---|
| CN | 110425032 | A | 11/2019 |
| CN | 210660322 | U | 6/2020 |
| JP | 2008190415 | A | 8/2008 |
| JP | 2016160877 | A | 9/2016 |

* cited by examiner

ENGINE INCORPORATING IMPROVED GOVERNOR LINKAGE

CROSS-REFERENCE TO RELATED APPLICATIONS

The present application is a continuation of U.S. patent application Ser. No. 17/848,072, filed Jun. 23, 2022, which claims the benefit of priority to U.S. Provisional Application No. 63/218,964 filed Jul. 7, 2021, which are incorporated herein by reference in their entireties.

BACKGROUND

The present invention generally relates to internal combustion engines, and more particularly to governor levers and related devices or apparatuses for such engines.

Internal combustion engines may utilize governors to prevent excessive engine speed during a variety of operating conditions. In many implementations, governors are mechanical devices which close a throttle butterfly when a certain engine speed is reached, preventing an over-speed condition. These governors require a linkage assembly to operate the throttle butterfly of a carburetor or throttle body, and frequently include a lever coupled to the governor which is adjusted to ensure proper operation. Adjustments are necessary during initial assembly and again later, when certain maintenance is performed, such as removing the carburetor or throttle body.

Improvements are desired to easier and more reliable assembly of the linkage assembly which connects the governor to the throttle butterfly. Improvements are also desired to minimize assembly errors and reduce assembly time.

SUMMARY

The present application discloses an engine having a governor and a linkage assembly. The governor has a governor shaft. The linkage assembly has a governor lever and a throttle link. The governor lever has a primary arm, a secondary arm, and a fastener. The primary arm is movably coupled to the secondary arm and the fastener is configured to restrain motion between the primary arm and the secondary arm. One of the primary arm and the secondary arm are coupled to the governor shaft. The governor lever is movable from a first position where the governor shaft is in a first orientation relative to the throttle link to a second position where the governor shaft is in a second orientation relative to the throttle link. The primary arm moves relative to the secondary arm as the governor lever is transitioned from the first position to the second position.

The present application also discloses a linkage assembly for an engine. The linkage assembly has a governor lever and a throttle link. The governor lever has a primary arm, a secondary arm, and a fastener. The primary arm is movably coupled to the secondary arm and the fastener is configured to restrain motion between the primary arm and the secondary arm. The secondary arm is movable from a first position relative to the primary arm to a second position relative to the primary arm.

The present application also discloses a method of installation of a linkage assembly. In step a), the engine is provided. The engine has a fuel/air mixer and a governor. The fuel/air mixer has a throttle valve and the governor has a governor shaft. In step b), a primary arm of a governor lever of a linkage assembly is coupled to the governor shaft of the governor such that the primary arm is non-rotatable with respect to the governor shaft. In step c), a throttle link of the linkage assembly is coupled to the throttle valve of the fuel/air mixer. In step d), a relative position of a secondary arm of the governor lever is adjusted with respect to the primary arm. In step e), a fastener of the linkage assembly is secured to prevent relative movement between the primary arm and the secondary arm of the governor lever.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
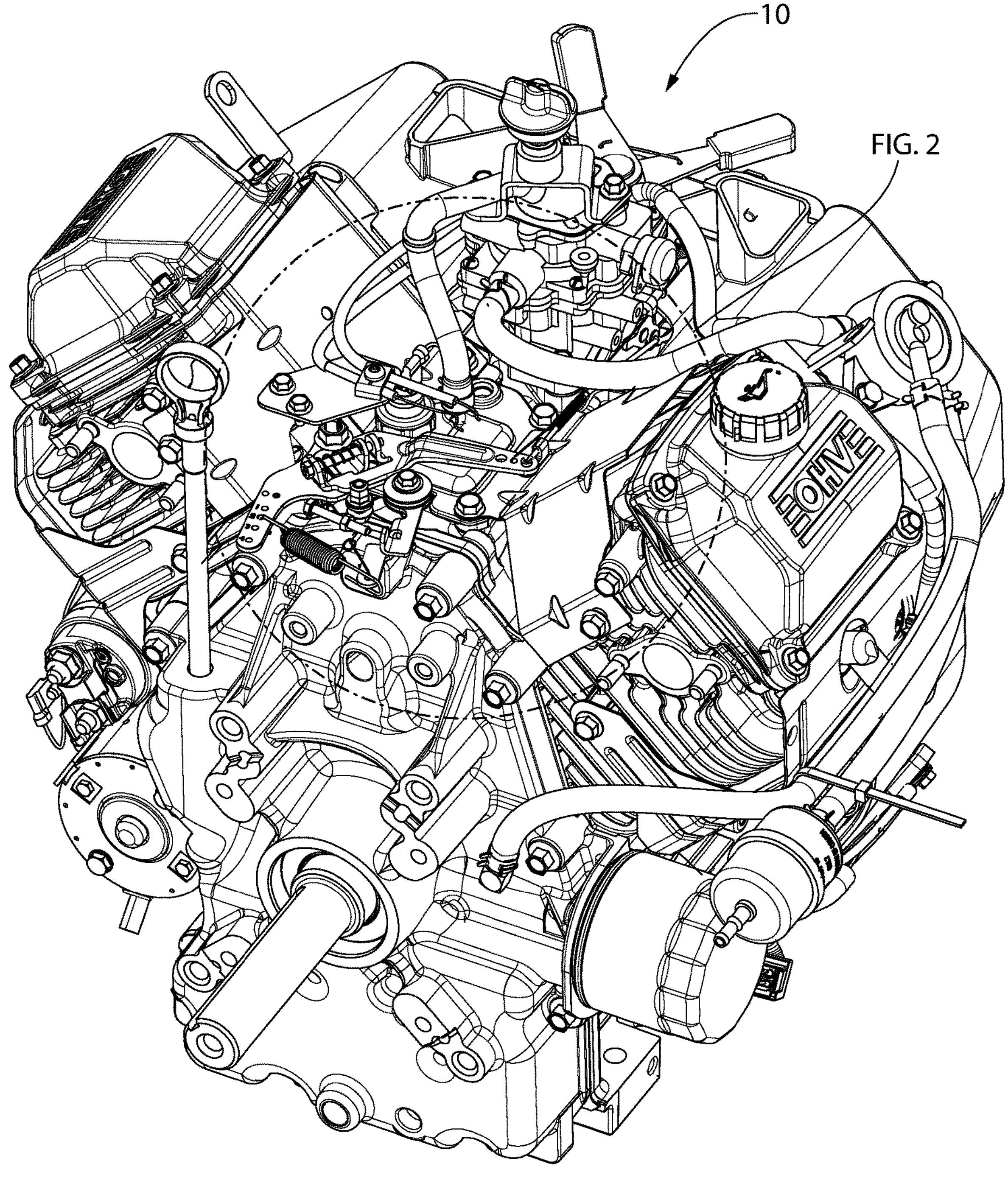
FIG. 1 is a perspective view of an engine incorporating a first implementation of a linkage assembly according to the present disclosure.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Figure 2:
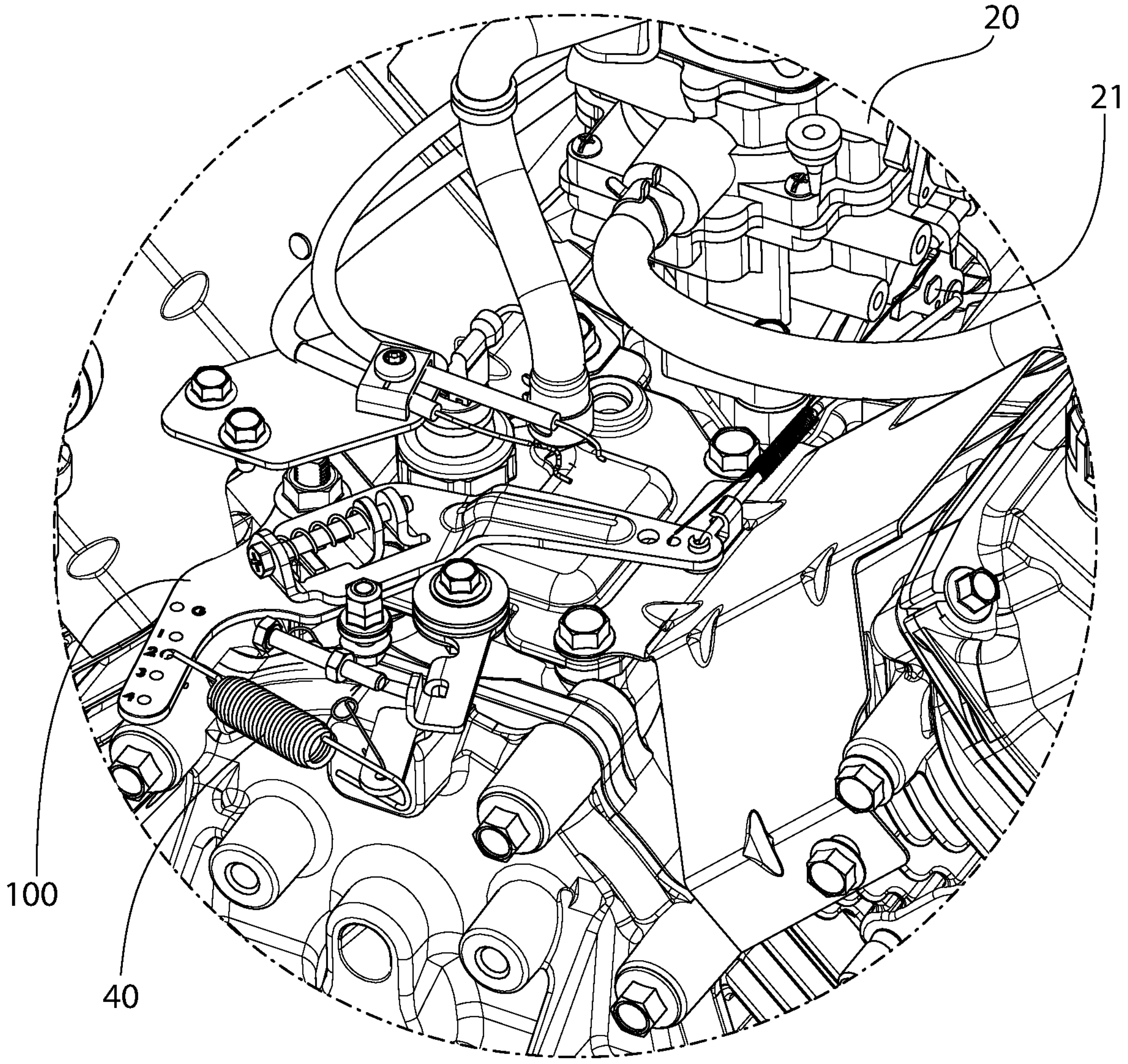
FIG. 2 is a close-up view of a portion thereof showing portions of the linkage assembly.

FIG. 1 shows a perspective view of an internal combustion engine 10 incorporating the linkage assembly 100. FIG. 2 shows a close-up view of the engine 10 focusing on the linkage assembly 100. As can be seen, the linkage assembly 100 connects to a fuel/air mixer 20. In some implementations, the fuel/air mixer 20 may be a carburetor. In other implementations, the fuel/air mixer 20 may be a throttle body or another means of controlling air flow into the engine 10. The fuel/air mixer 20 may only meter air, with fuel being added to the air downstream of the fuel/air mixer 20 by a fuel injector or other device. The fuel/air mixer 20 has a throttle valve 21, the throttle valve 21 operated by the linkage assembly 100. The linkage assembly 100 is biased by a biasing element 40 to return the linkage assembly to a rest state. Optionally, the biasing element 40 may be omitted.

Figure 3:
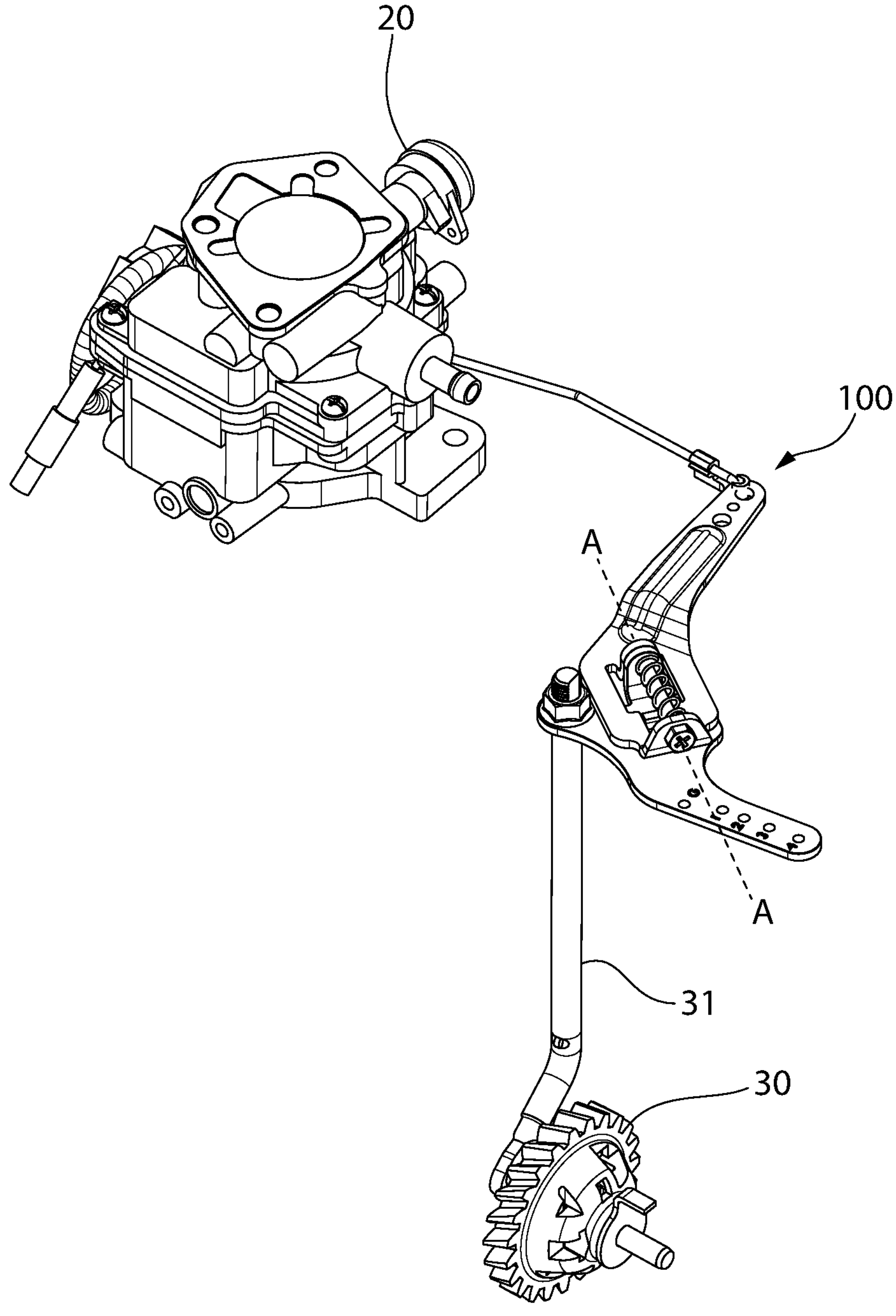
FIG. 3 is a perspective view showing portions of the engine including the linkage assembly, a governor lever of the linkage assembly in a first position.
Figure 4:
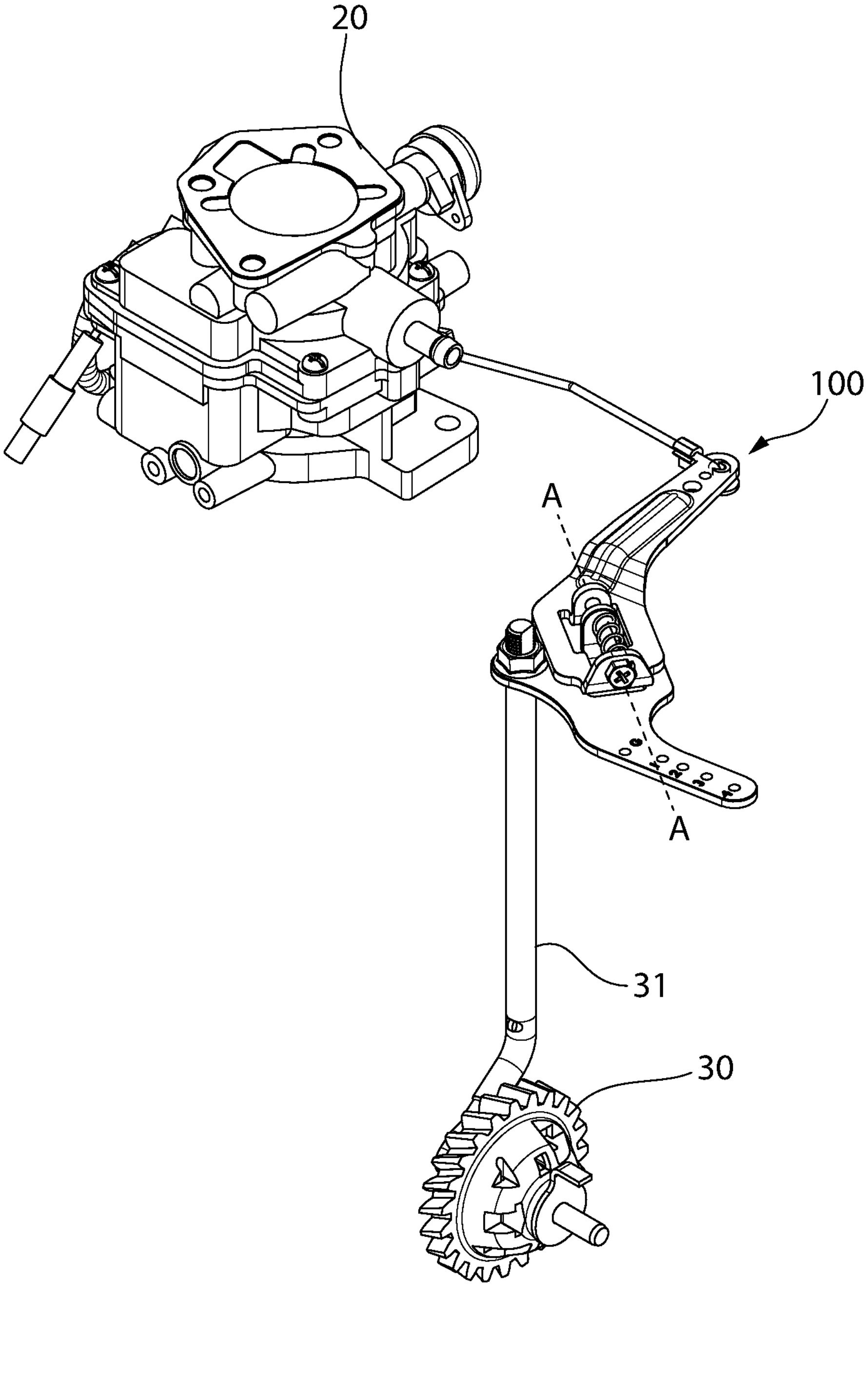
FIG. 4 is a perspective view showing portions of the engine including the linkage assembly, the governor lever of the linkage assembly in a second position.
Figure 5:
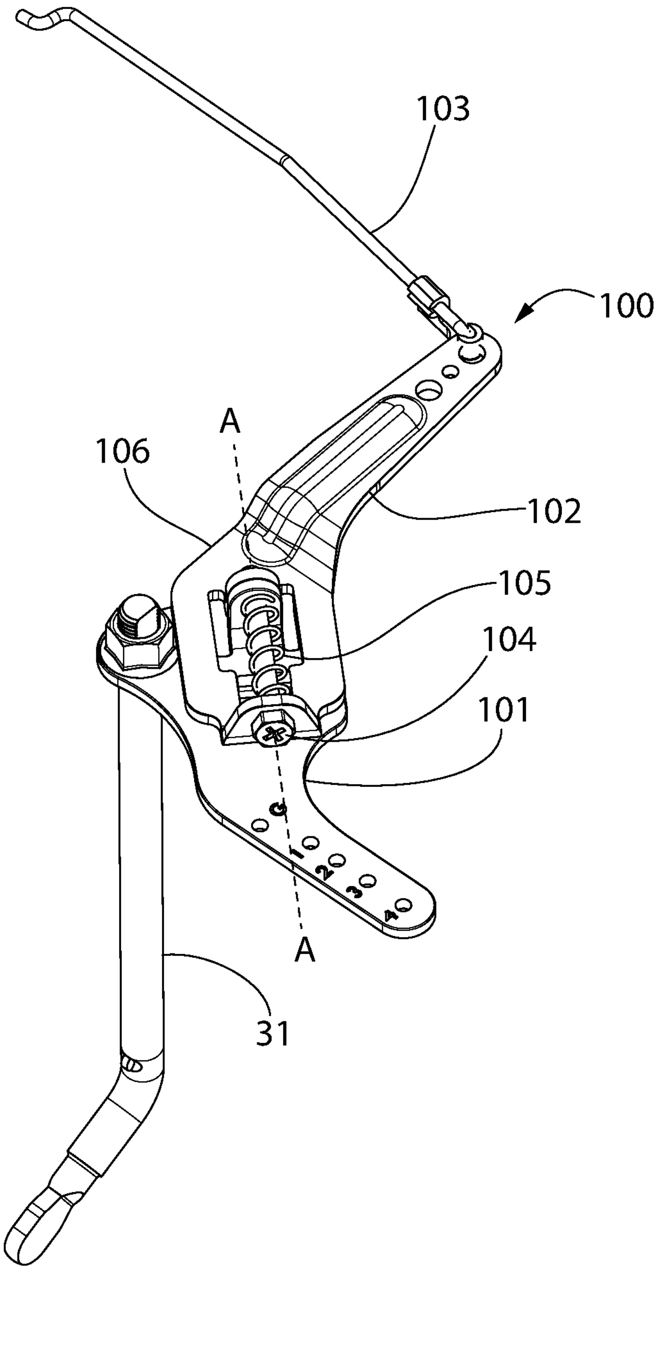
FIG. 5 is a perspective view of the linkage assembly and a governor shaft.
Figure 6:
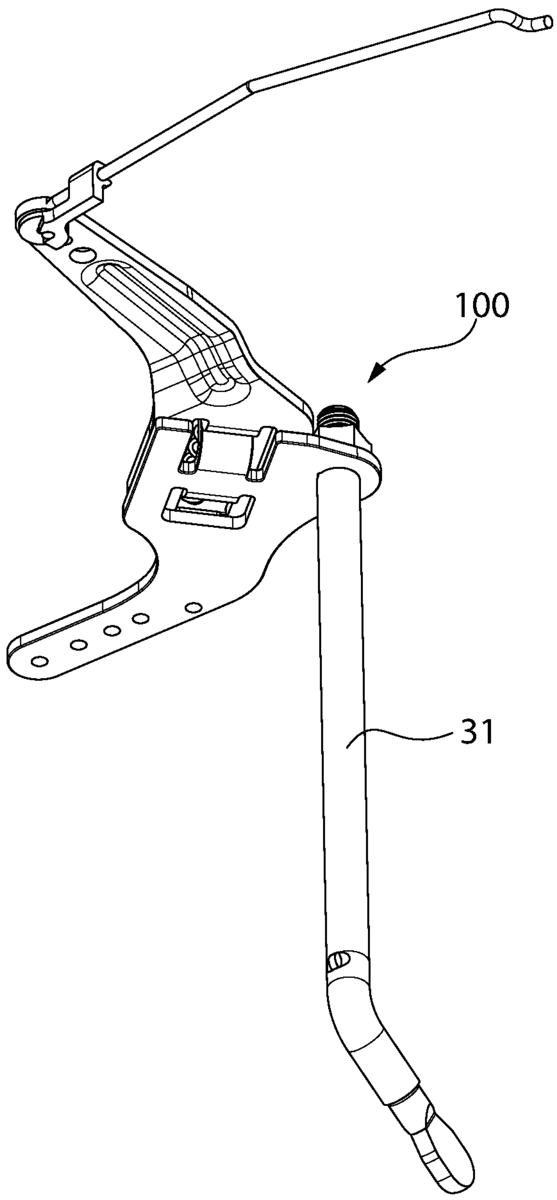
FIG. 6 is bottom perspective view of the linkage assembly and the governor shaft of FIG. 5.
Figure 7:
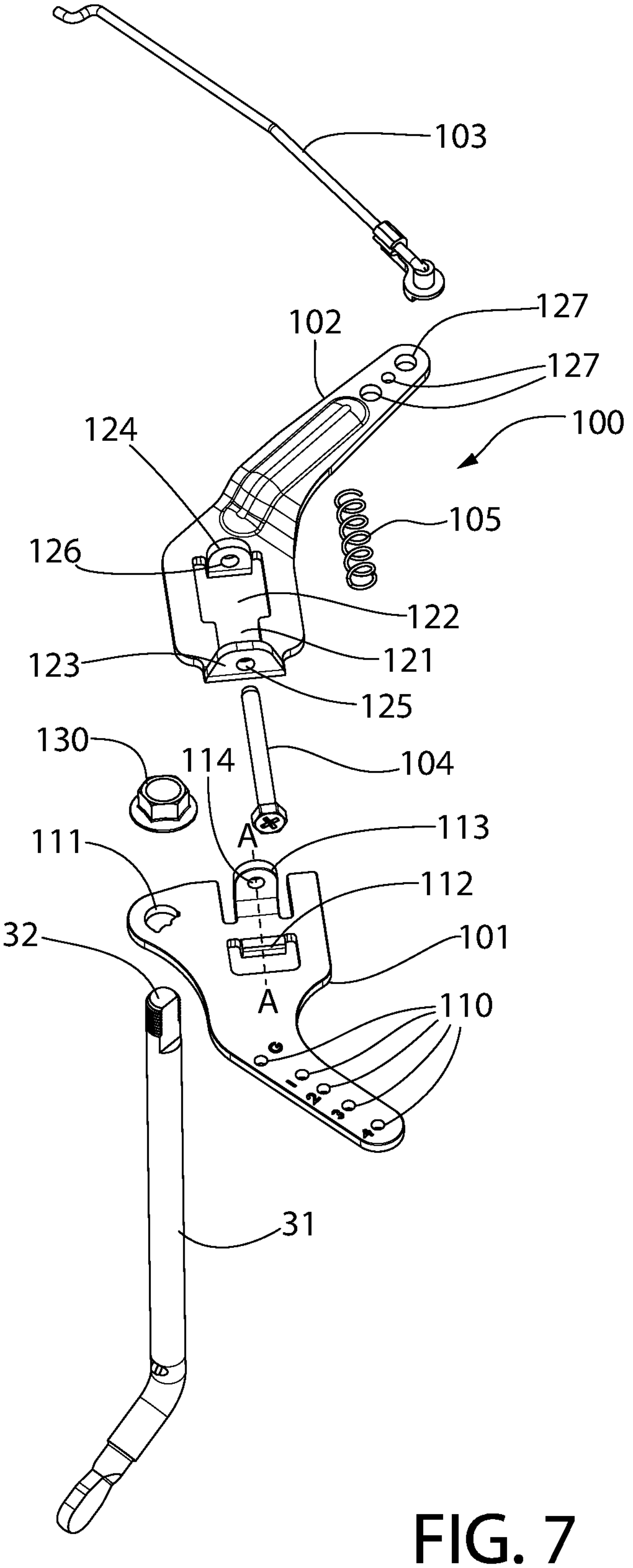
FIG. 7 is an exploded view of the linkage assembly and governor shaft of FIG. 5.
Figure 9:
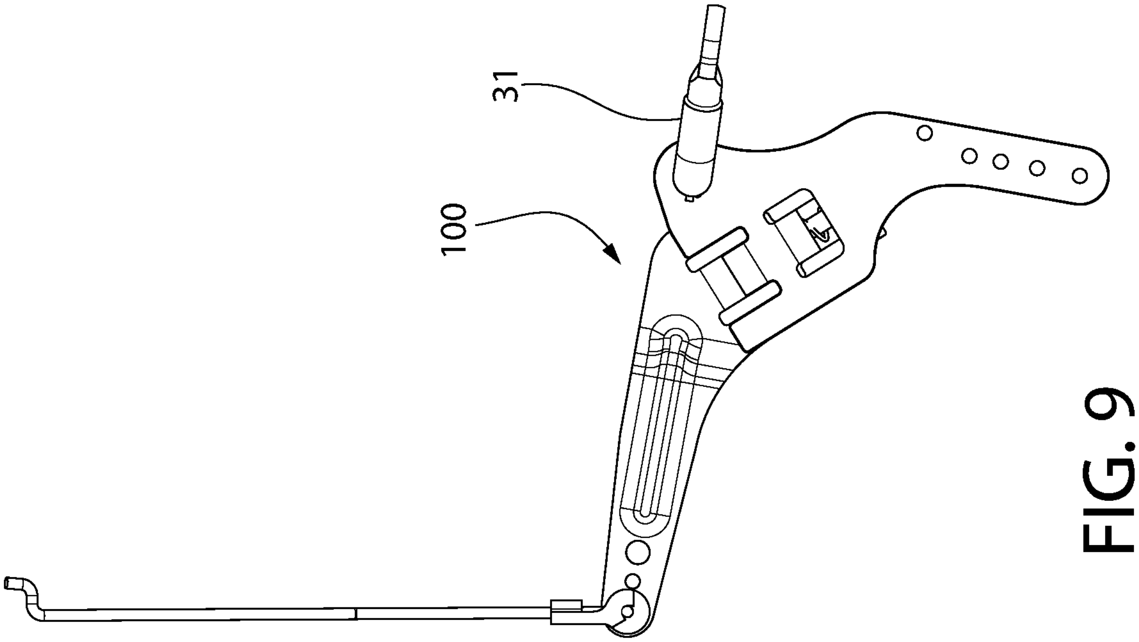
FIG. 9 is a bottom plan view thereof.
Figure 8:
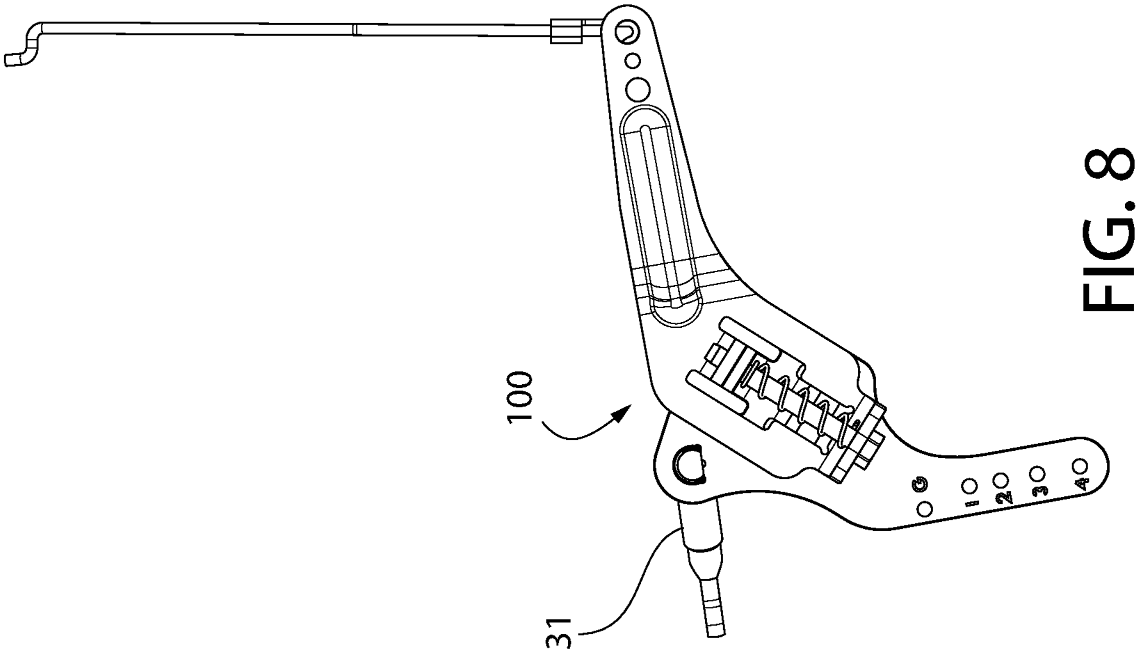
FIG. 8 is a top plan view thereof.
Figure 10:
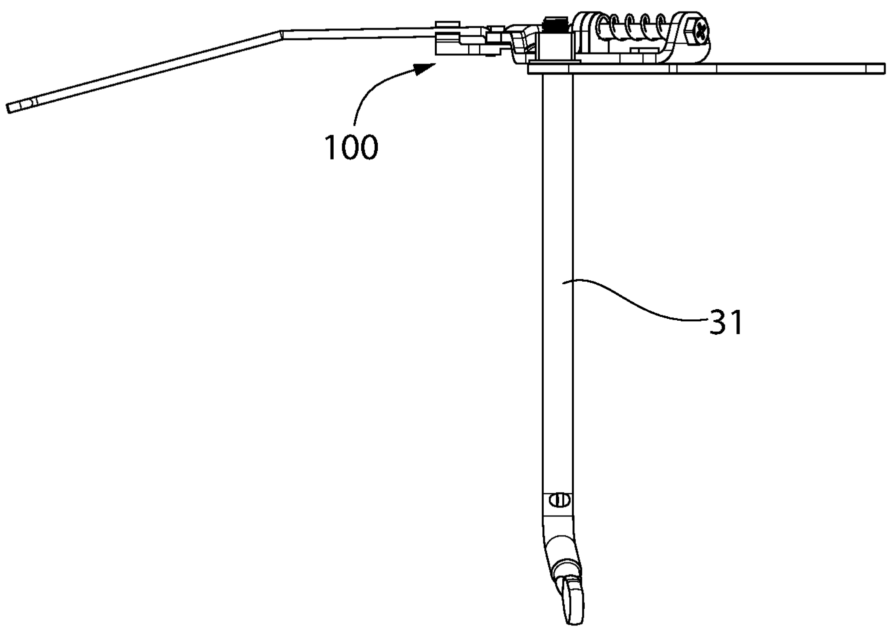
FIG. 10 is a front view thereof.
Figure 11:
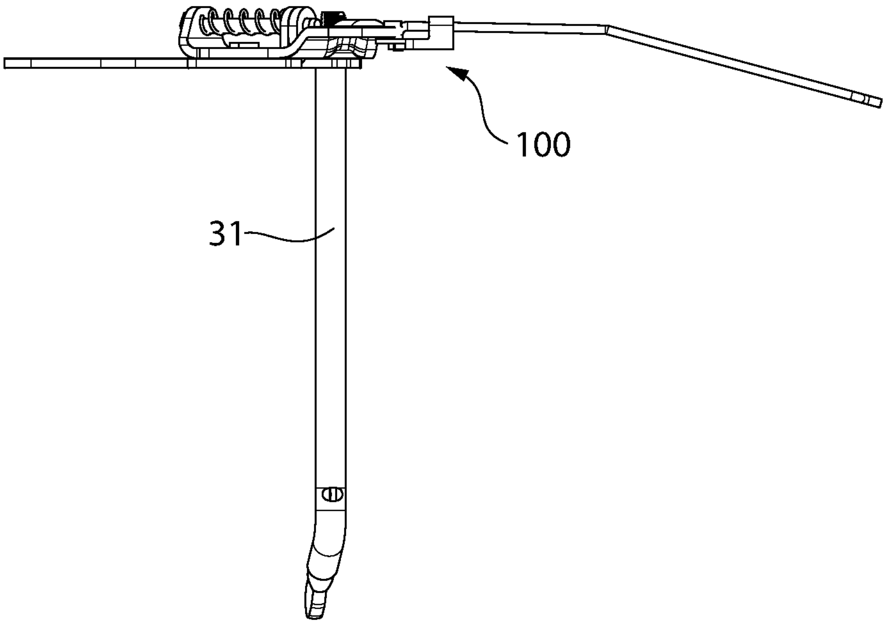
FIG. 11 is a rear view thereof.
Figure 12:
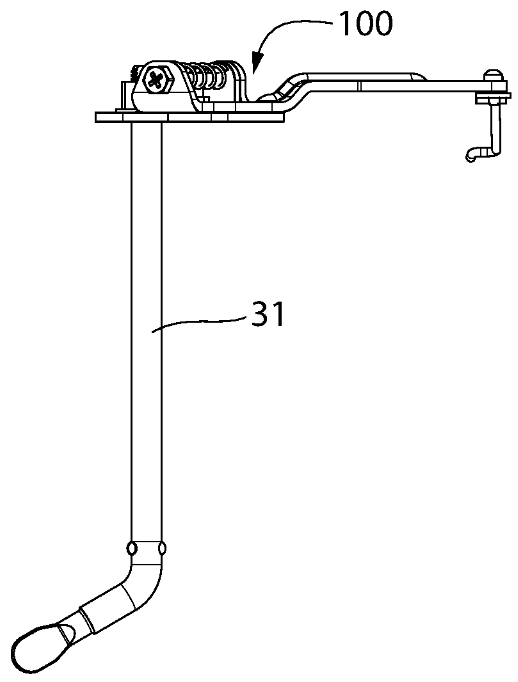
FIG. 12 is a left side view thereof.
Figure 13:
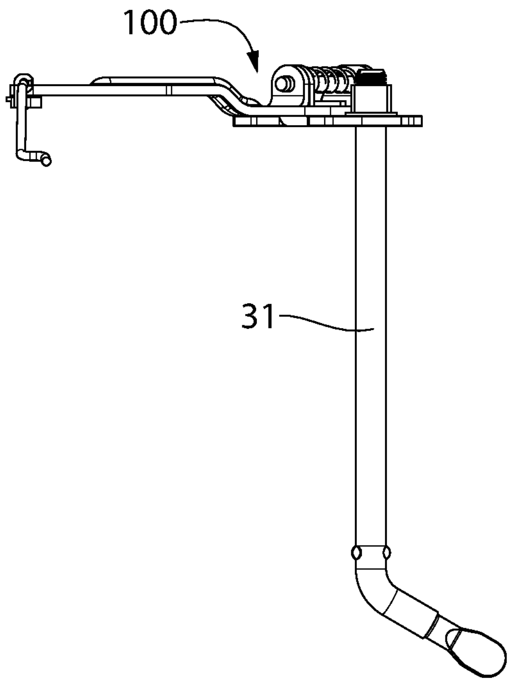
FIG. 13 is a right side view thereof.
Figure 15:
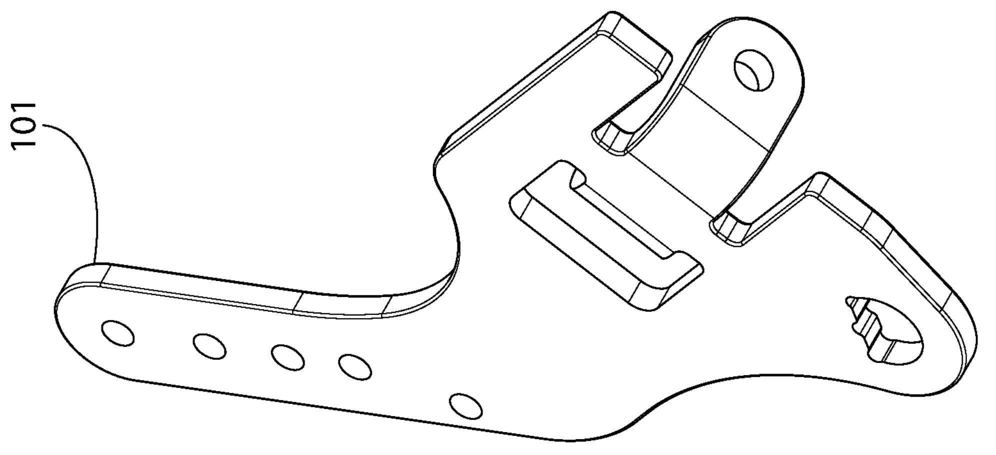
FIG. 15 is a bottom perspective view of the primary arm of the governor lever thereof.
Figure 14:
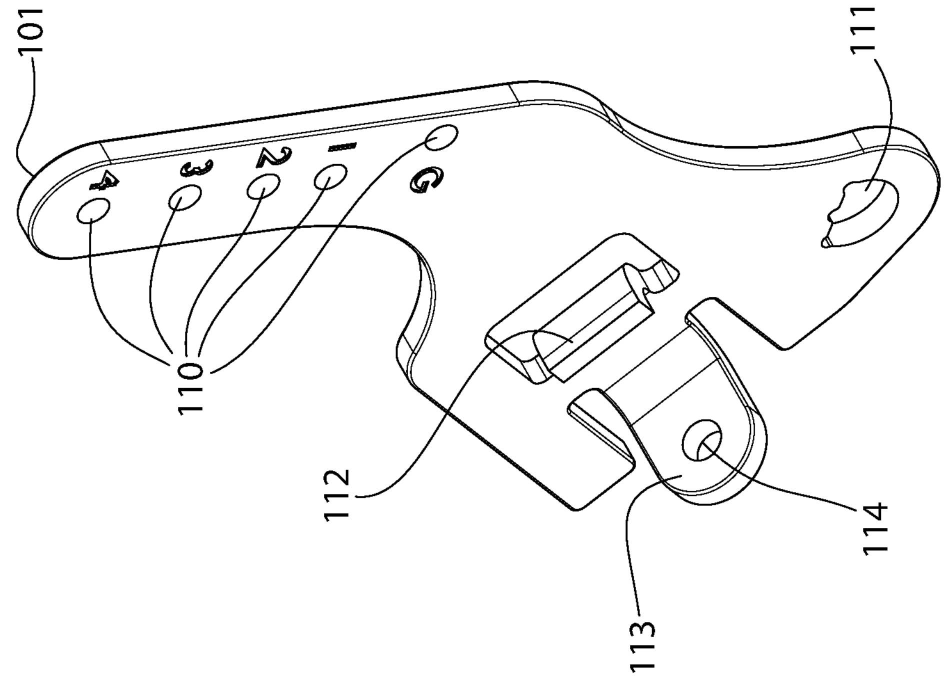
FIG. 14 is a perspective view of a primary arm of the governor lever thereof.
Figure 17:
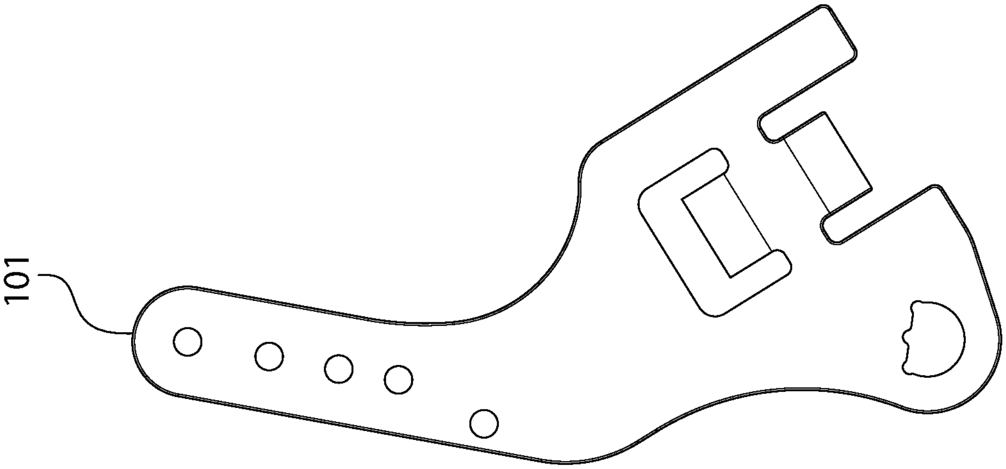
FIG. 17 is a top plan view of the primary arm of the governor lever thereof.
Figure 16:
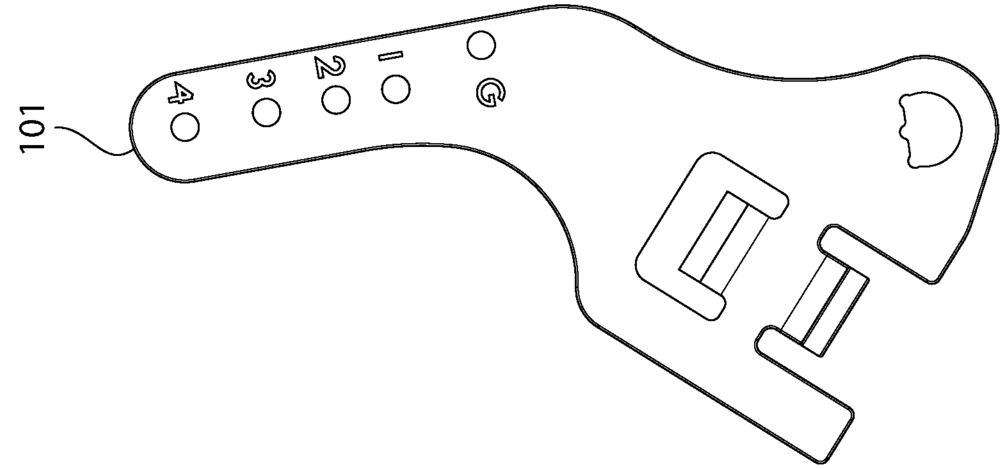
FIG. 16 is a top plan view of the primary arm of the governor lever thereof.
Figure 18:
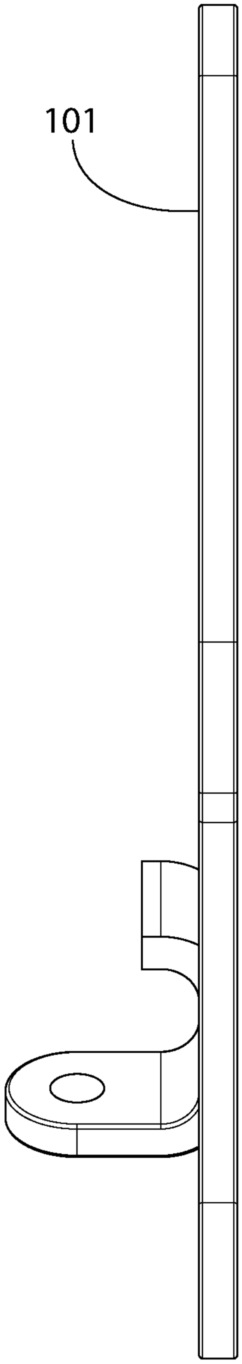
FIG. 18 is a left view of the primary arm of the governor lever thereof.
Figure 19:
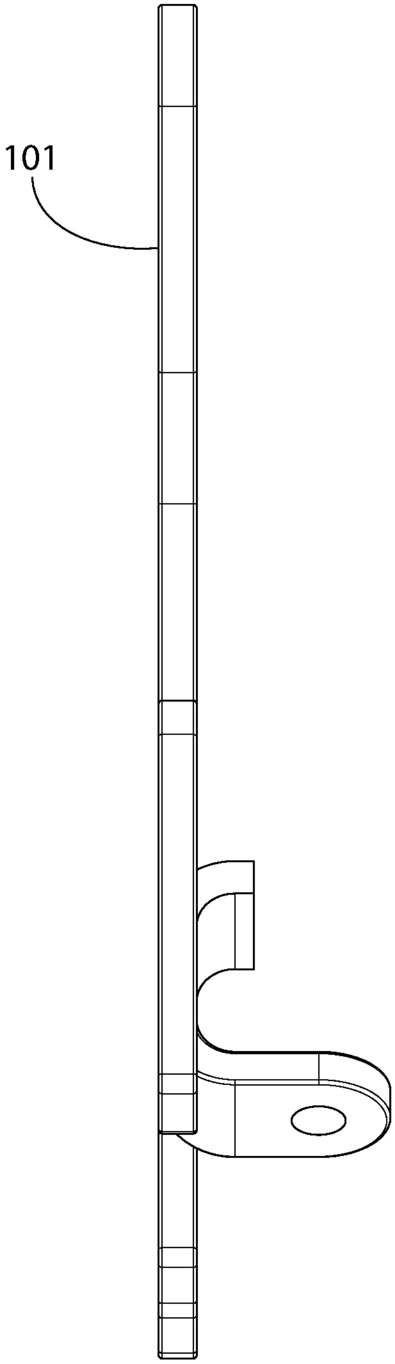
FIG. 19 is a right view of the primary arm of the governor lever thereof.
Figure 20:
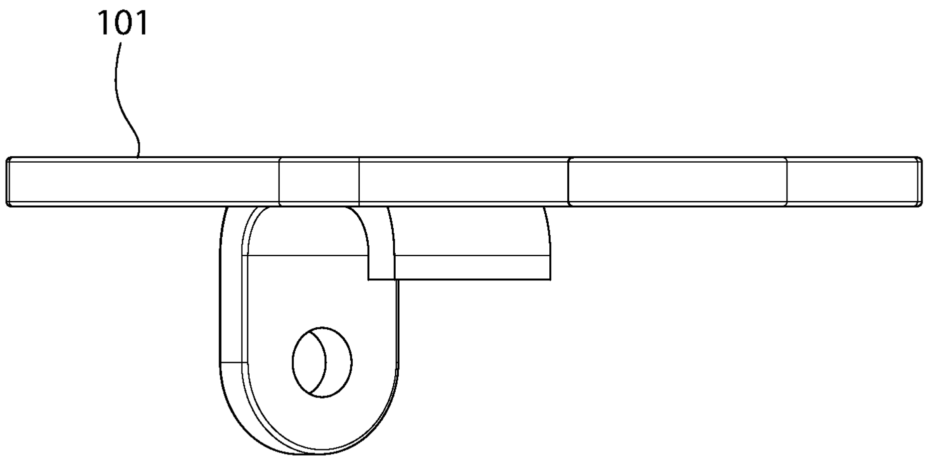
FIG. 20 is a rear view of the primary arm of the governor lever thereof.
Figure 21:
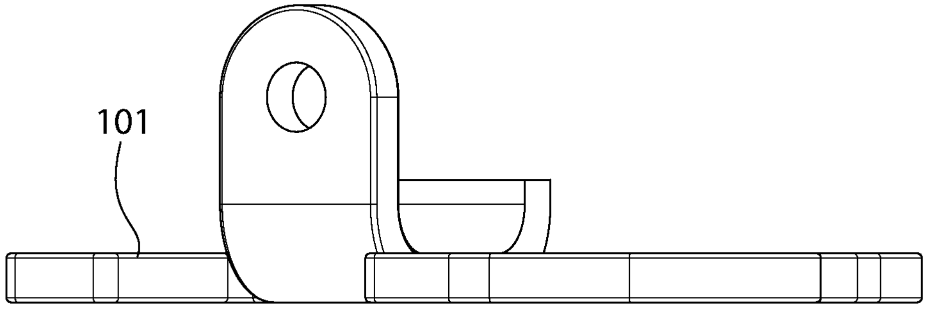
FIG. 21 is a front view of the primary arm of the governor lever thereof.
Figure 22:
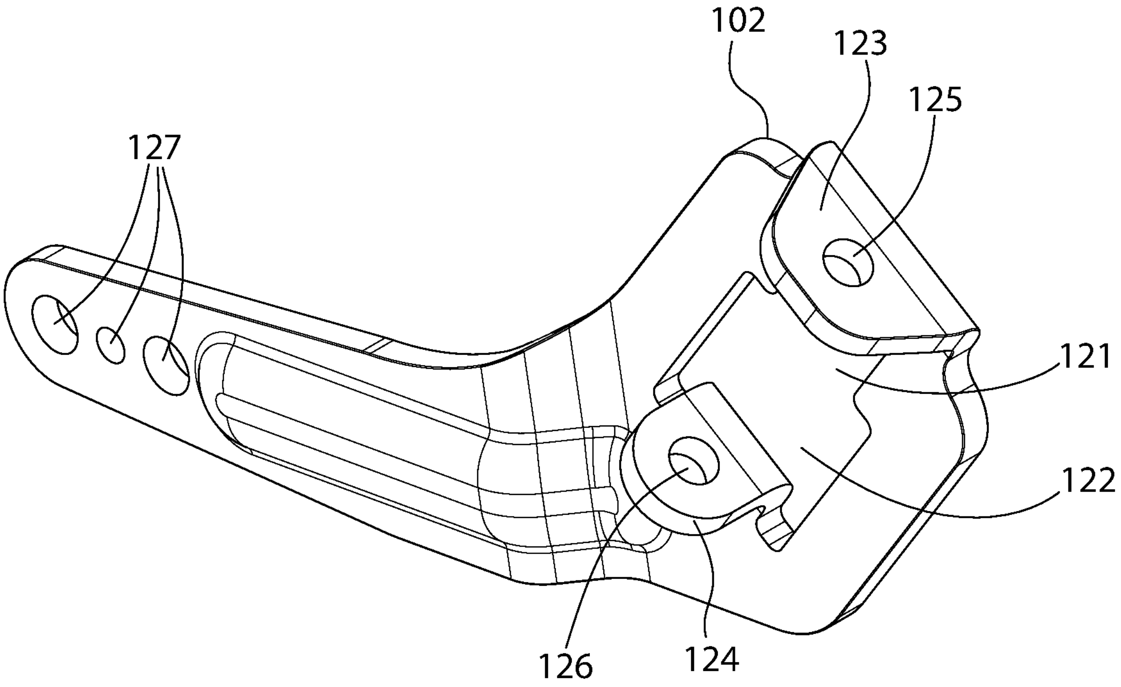
FIG. 22 is a perspective view of a secondary arm of the governor lever thereof.
Figure 23:
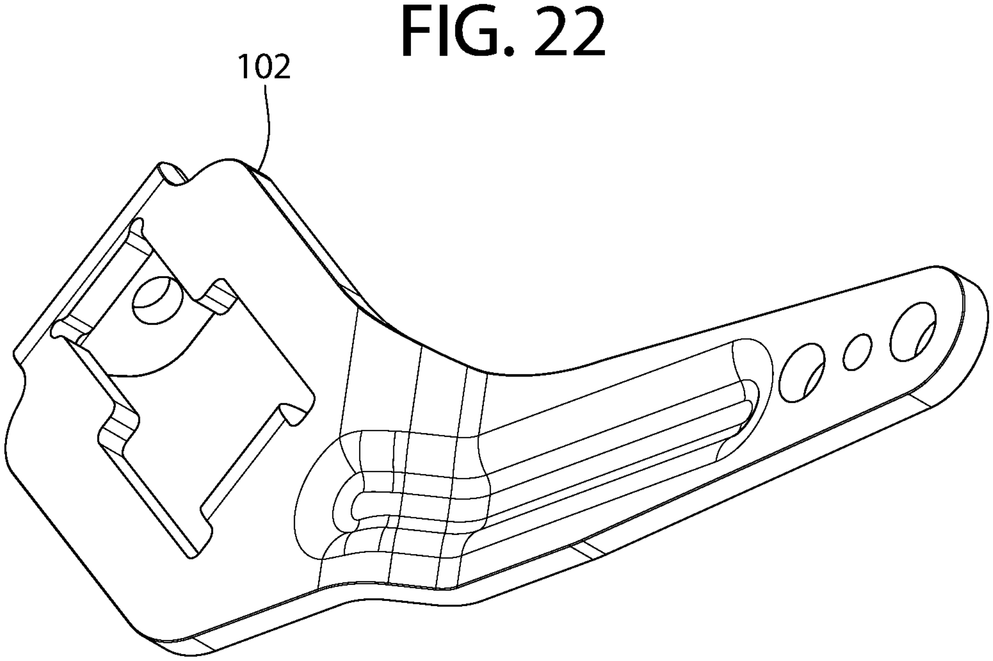
FIG. 23 is a bottom perspective view of the secondary arm of the governor lever thereof.
Figure 24:
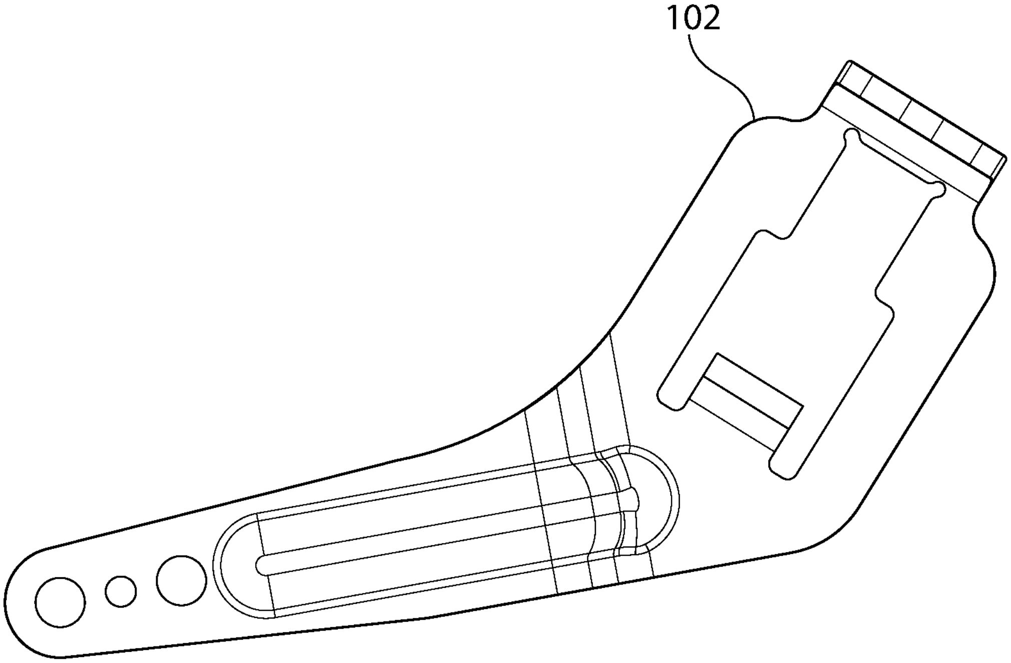
FIG. 24 is a top plan view of the secondary arm of the governor lever thereof.
Figure 25:
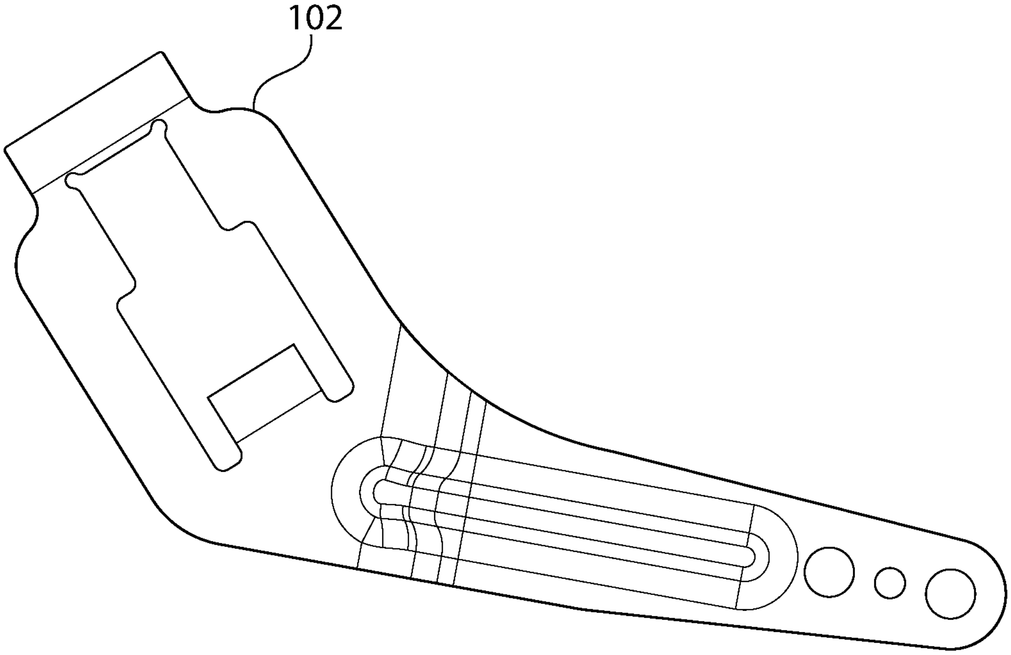
FIG. 25 is a bottom plan view of the secondary arm of the governor lever thereof.
Figure 26:
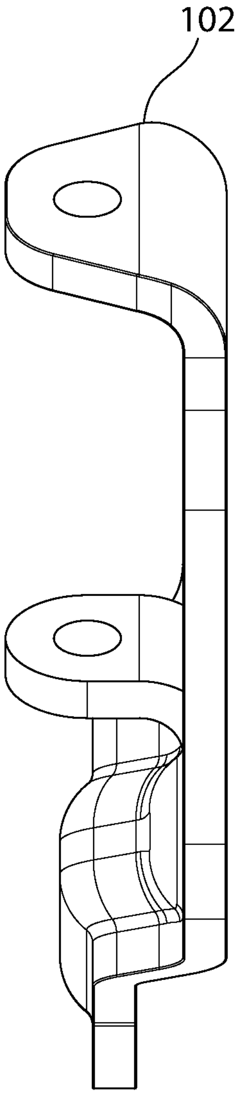
FIG. 26 is a rear view of the secondary arm of the governor lever thereof.
Figure 27:
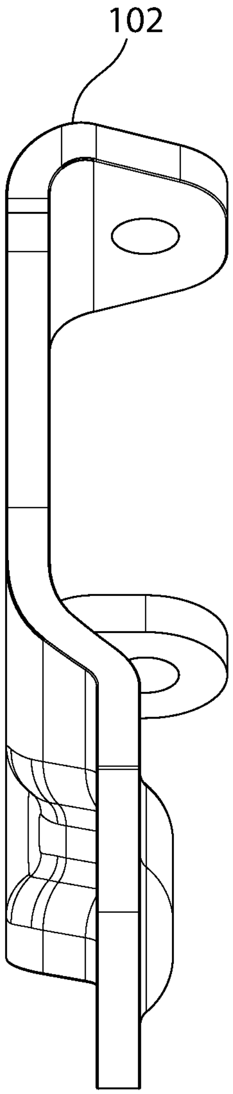
FIG. 27 is a front view of the secondary arm of the governor lever thereof.
Figure 28:
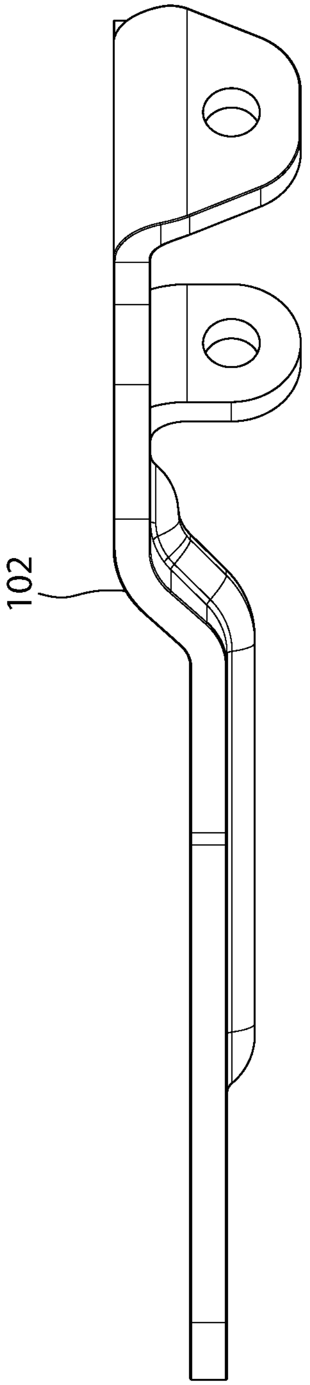
FIG. 28 is a left side view of the secondary arm of the governor lever thereof.
Figure 29:
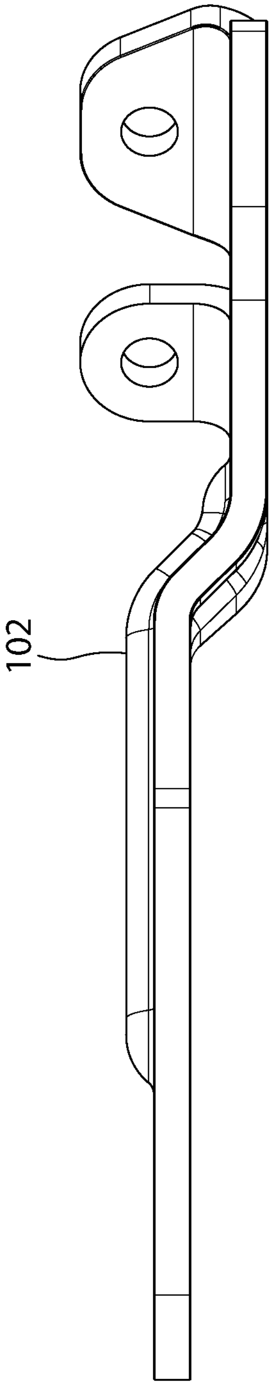
FIG. 29 is a right side view of the secondary arm of the governor lever thereof.
Figure 30:
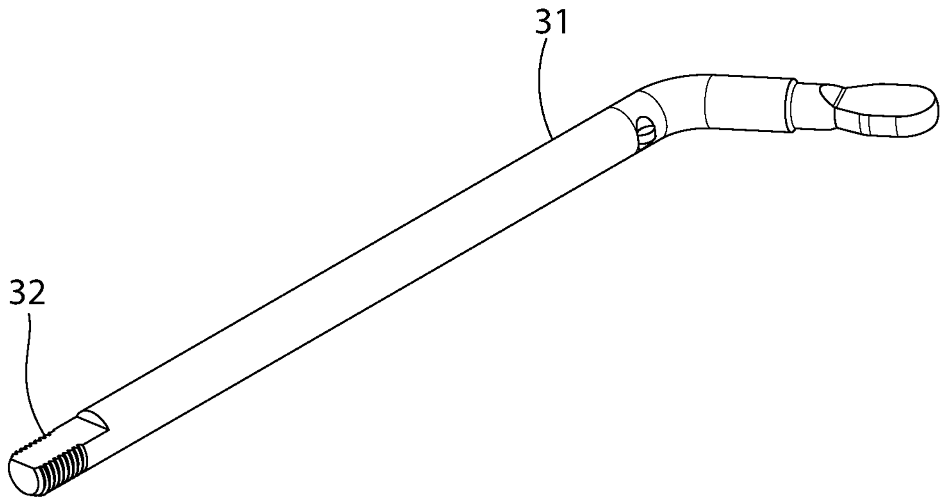
FIG. 30 is a perspective view of the governor shaft.

FIGS. 3-13 show the linkage assembly 100 in greater detail. As best seen in FIGS. 3 and 4, the linkage assembly 100 connects a governor 30 to the throttle valve 21 of the fuel/air mixer 20 as shown. The governor 30 has a mechanism which, at a pre-selected speed, rotates a governor shaft 31 to close the throttle valve 21 via the linkage assembly 100. Turning to FIGS. 5-13, the linkage assembly 100 is shown with the governor shaft 31. The linkage assembly 100 has a primary arm 101, a secondary arm 102, a throttle link 103, an adjustment component 104, and a biasing element 105. The primary arm 101, secondary arm 102, adjustment component 104, and elastic element 105 collectively form a governor lever 106. The governor lever 106 is an assembly of the aforementioned components which couple the throttle link 103 and the governor shaft 31 and set the relative orientations of one with respect to the other.

The governor lever 106 is biased such that the governor shaft 31 presses against an actuating portion of the governor 30 in the rest state. As noted above, the linkage assembly 100 is biased into the rest state by the biasing element 40 shown in FIGS. 1 and 2. In the rest state, the biasing element 40 causes the governor lever 106 to rotate in a counter-clockwise direction as shown when viewed from above the governor shaft 31. When the engine 10 exceeds a set maximum operating speed, the governor 30 causes the governor shaft 31 to rotate in a clockwise direction. This rotation is transmitted to the governor lever 106, which then causes the throttle link 103 to close the throttle valve 21 and reduce the air flow into the engine. This causes the speed of the engine 10 to decrease, preventing an over-speed condition. The biasing element 40 may only be used for assembly and may be removed after the governor lever 106 is set. Alternatively, the biasing element 40 may be omitted entirely.

The governor lever 106 is coupled to the biasing element 40 via a plurality of holes 110 formed in the primary arm 101. The holes 110 are utilized for adjusting the tension of the biasing element 40. An aperture 111 receives the governor shaft 31 and has a generally "D" shape. The aperture 111 mates with a corresponding proximal end 32 having a generally "D" shape and threads thereon. The proximal end 32 is formed by machining, grinding, or otherwise forming a flat on the end of the governor shaft 31. A fastener 130 may be used to ensure that the primary arm 101 of the governor lever 106 is securely retained on the governor shaft 31. The fastener 130 may be a nut, bolt, pin, or any other known component for fastening two items together. In other implementations, the governor shaft 31 may attach to the primary arm 101 via another means such as clamping, welding, brazing. Thus, the proximal end 32 and the aperture 111 need not have "D" shapes and may instead have a circular, splined, or other geometry.

The primary arm 101 of the governor lever 106 further has a first tab 112, a second tab 113, and a connection feature 114. The first tab 112 may be a sheet metal tab or other feature which may be used for alignment or registration of the secondary arm 102 as will be discussed in greater detail below. The second tab 113 may also be a sheet metal tab or other feature which may be used for alignment or registration of the secondary arm 102 as will be discussed in greater detail below. Finally, the connection feature 114 may be a threaded hole which can engage the adjustment component 104. Preferably, the connection feature 114 is aligned with an axis A-A and configured to engage the adjustment component 104 such that the adjustment component 104 may be axially fixed to the connection feature 114.

The secondary arm 102 of the governor lever 106 has a first slot 121, a second slot 122, a first tab 123, and a second tab 124. The first slot 121 preferably has a width suitable to engage the first tab 112 of the primary arm 101. The second slot 122 preferably has a width suitable to engage the second tab 113 of the primary arm 101. Furthermore, the first and second slots 121, 122 are preferably sized so that the primary arm 101 can slide in the direction A-A and remain aligned by the first and second tabs 112, 113. The first tab 123 has a first hole 125 and the second tab 124 has a second hole 126. The first and second holes 125, 126 are configured to accept the adjustment component 104. The biasing element 105 is assembled such that it is co-axial with the adjustment component 104 and biases the first tab 123 of the secondary arm 102 away from the second tab 113 of the primary arm 101 in the axis A-A. The adjustment component 104 engages the connection feature 114 and sets the distance between the first tab 123 of the secondary arm 102 and the second tab 113 of the primary arm 101.

The secondary arm 102 further has a plurality of holes 127 configured to accept the throttle link 103 and, optionally, additional biasing elements. The holes 127 allow a secure connection between the throttle link 103 and the governor lever 106. Additional holes 127 allow for a range of adjustment, allowing greater tolerances in component manufacture. Alternately, additional holes 127 may permit use of additional links for operating additional components on the engine 10.

The linkage assembly 100 is adjusted such that the rotational orientation of the governor shaft 31 is set with respect to the throttle link 103. In particular, for correct adjustment of the engine 10, the linkage assembly 100 cannot allow any relative or "lost" motion between the throttle valve 21 and the governor shaft 31. In the event that there is excessive motion, the governor 30 may not operate correctly or the engine may not idle properly, among other issues. As is apparent, slack between the throttle link 103 and the governor shaft 31 is undesirable. The governor lever 106 may be adjusted via the adjustment component 104 to ensure that there is no slack between the governor shaft 31 and the throttle link 103 without applying undesired tension on the throttle link 103. In other words, when properly adjusted the governor shaft 31 and the throttle link 103 should not be under tension but should also not have any play.

By adjusting the adjustment component 104 such that the secondary arm is moved along axis A-A, the governor lever 106 is adjusted. When the adjustment component 104 is adjusted such that the first tab 123 of the secondary arm 102 and the second tab 113 of the primary arm 101 are closer together, the primary arm 101 is moved closer to the throttle link 103. This reduces the tension on the throttle link 103. If adjusted too far, this results in play between the throttle 21 and the governor lever 106. When the adjustment component 104 is adjusted such that the first tab 123 of the secondary arm 102 and the second tab 113 of the primary arm 101 are further apart, the primary arm 101 is moved further away from the throttle link 103. This decreases play in the throttle link 103 to governor lever 106 connection. If adjusted too far, this results in tension applied to the throttle link 103. Optionally, the governor lever 106 may also incorporate a clamping feature to lock the setting of the adjustment component 104. This may be a jam nut on the adjustment component 104, a bolt or other clamp which engages the primary and secondary arms 101, 102, or some other means of ensuring no further relative motion occurs once the appropriate adjustments have been made.

As best seen in FIGS. 3 and 4, the governor lever 106 can be transitioned from a first position to a second position. FIG. 3 shows the governor lever 106 in the first position where the secondary arm 102 is adjusted closest to the governor shaft 31. FIG. 4 shows the governor 106 in the second position where the secondary arm 102 is adjusted furthest from the governor shaft 31. In particular, the holes 127 are closest to the governor shaft 31 when the governor lever 106 is in the first position. The holes 127 are furthest from the governor shaft 31 when the governor lever 106 is in the second position. The governor lever 106 may be adjusted to a position anywhere between the first position and the second position to permit effective adjustment, the governor lever 106 altering the relative orientation of the throttle link 103 with respect to the governor shaft 31.

In a method of installation, an engine 10 is provided, the engine 10 having a fuel/air mixer 20 and a governor 30. The fuel/air mixer 20 has a throttle valve 21. The governor 30 has a governor shaft 31. A governor lever 106 of a linkage assembly 100 is coupled to a proximal end 32 of the governor shaft 31. More specifically, a primary arm 101 of the governor lever 106 is coupled to the proximal end 32 of the governor shaft 31. Preferably, the primary arm 101 is non-rotatable with respect to the governor shaft 31. A throttle link 103 of the linkage assembly 100 is coupled to the throttle valve 21 of the fuel/air mixer 20. A secondary arm 102 is coupled to the primary arm 101 of the governor lever 106. The governor lever 106 is in a second position when the linkage assembly 100 is coupled to the throttle valve 21 and the governor shaft 31. The second position ensures adequate slack to permit assembly and subsequent adjustment. The throttle link 103 is then coupled to the secondary arm 102 of the governor lever 106. Optionally, the order of the coupling steps may be altered as desired.

A relative position or orientation between a secondary arm 102 of the governor lever 106 and the primary arm 101 of the governor lever 106 is adjusted. The governor shaft 31 is biased into the rest state by installing a biasing element 40. Alternately, hand pressure or another piece of assembly equipment may be used to bias the governor shaft 31 into the rest state and the biasing element 40 may be omitted. The relative position or orientation between the primary and secondary arms 101, 102 is adjusted until the throttle link 103 is under tension sufficient to maintain the throttle valve 21 in the wide open throttle position. This may be done via an adjustment component 104 or via another means such as a fastener of the linkage assembly 100. The adjustment component 104 or the fastener secures the primary and secondary arms 101, 102 relative to one another to maintain the desired setting. The governor lever 106 is now in a first position or an intermediate position between the second position and the first position as a result of the adjustment step. In this manner, the relative position or orientation between the governor shaft 31 and the throttle valve 21 is set. When the throttle valve 21 is in the wide open throttle position, the governor 30 will be able to close the throttle valve 21 without any lost motion in the governor 30.

Figure 31:
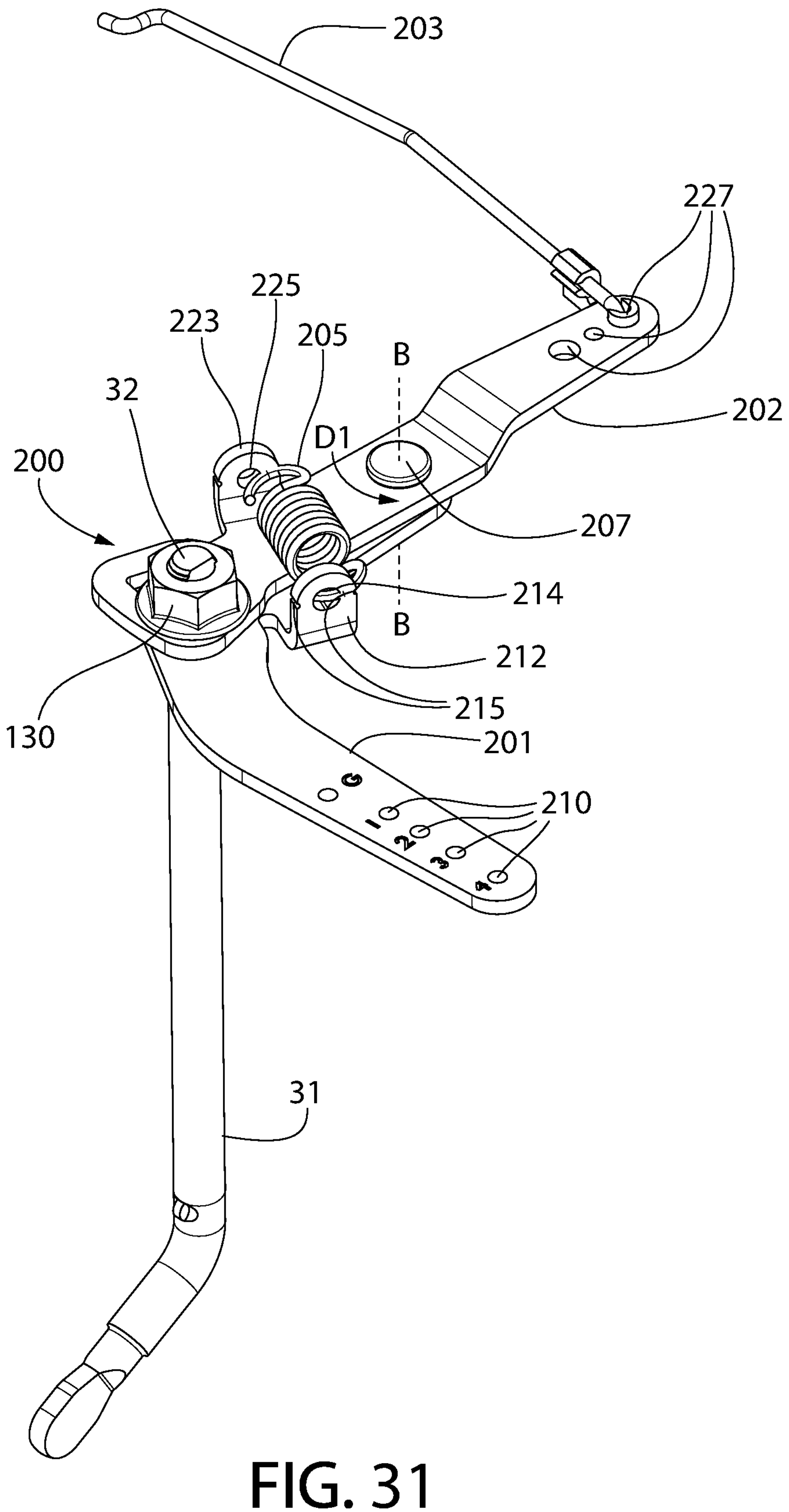
FIG. 31 is a perspective view of a second implementation of a linkage assembly and a governor shaft, a governor lever of the linkage assembly being in a first position.
Figure 32:
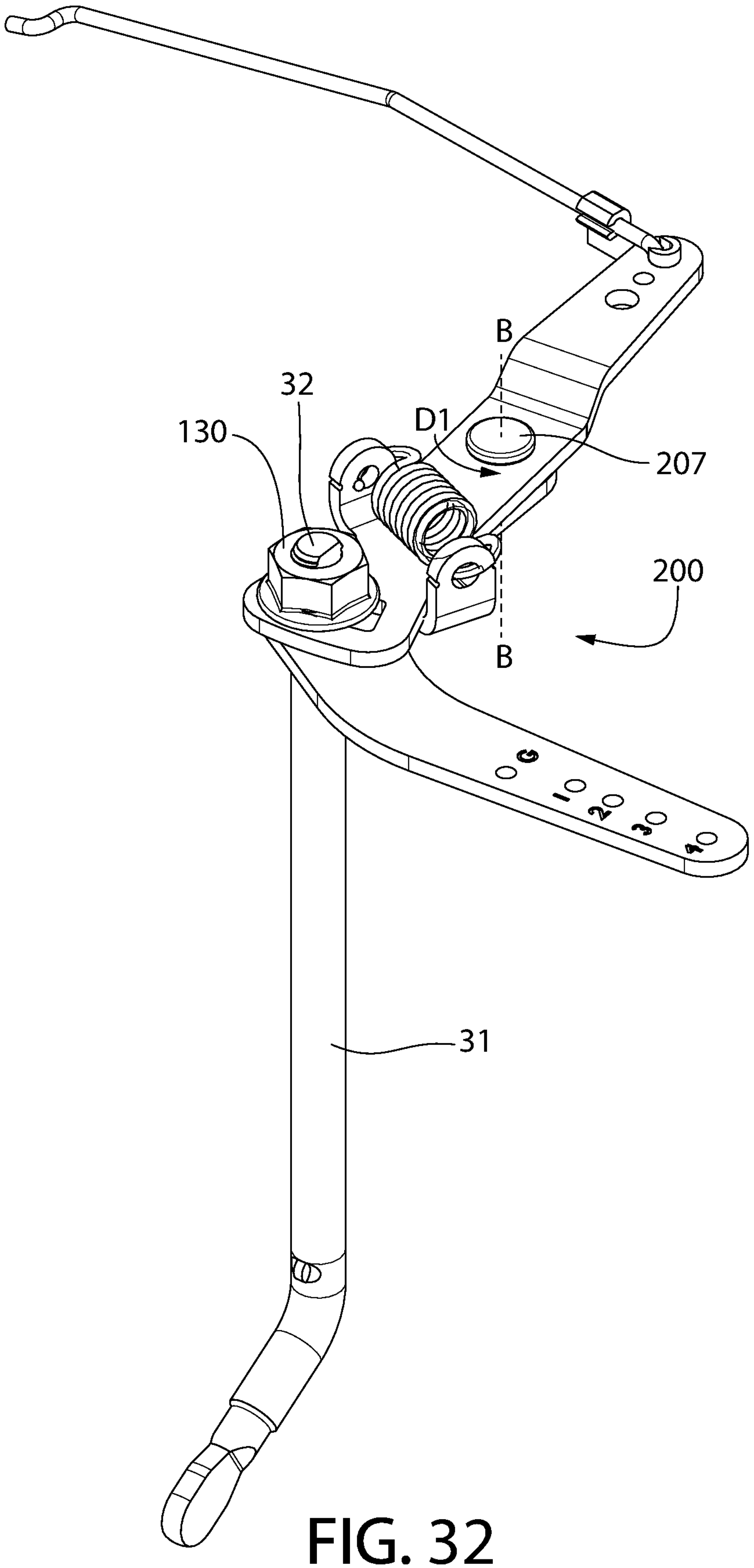
FIG. 32 is a perspective view of the second implementation of the linkage assembly and a governor shaft, the governor lever being in a second position.
Figure 33:
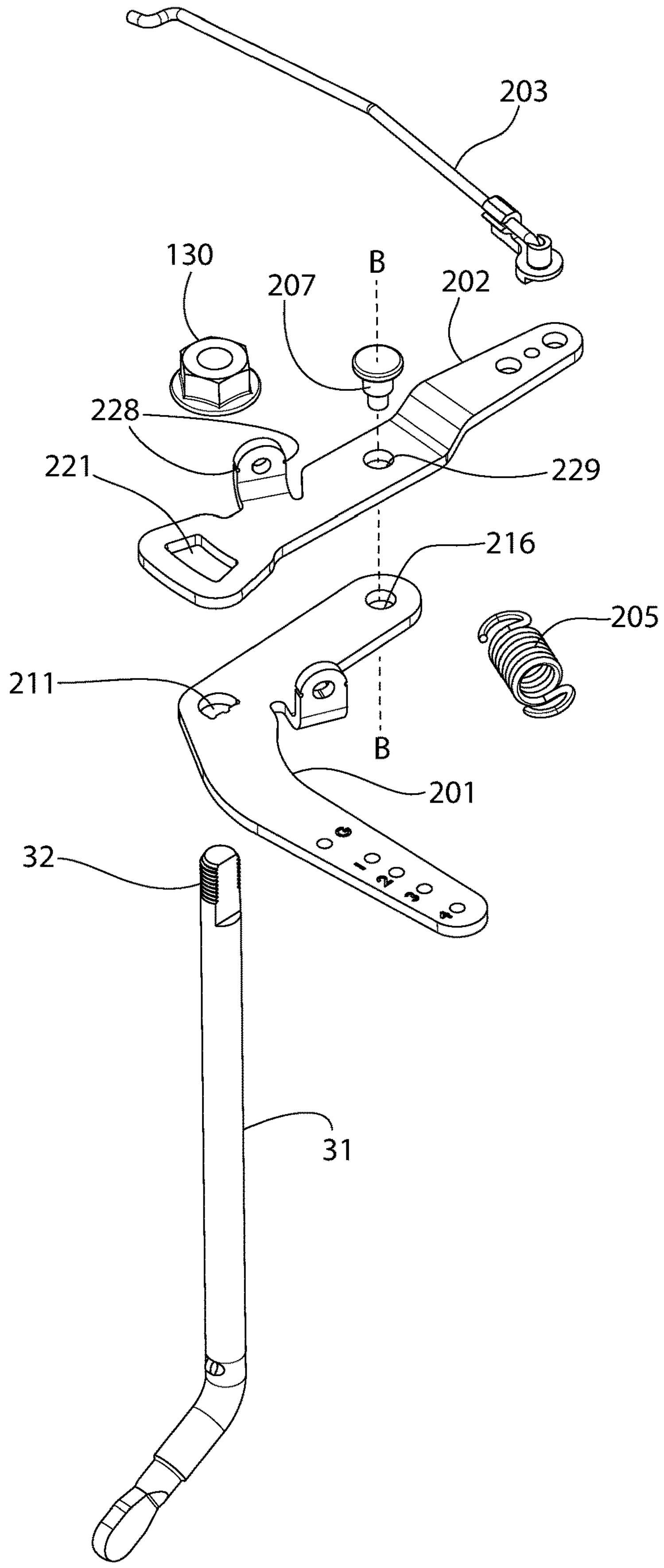
FIG. 33 is an exploded view of the linkage assembly and governor shaft of FIG. 31.
Figure 34:
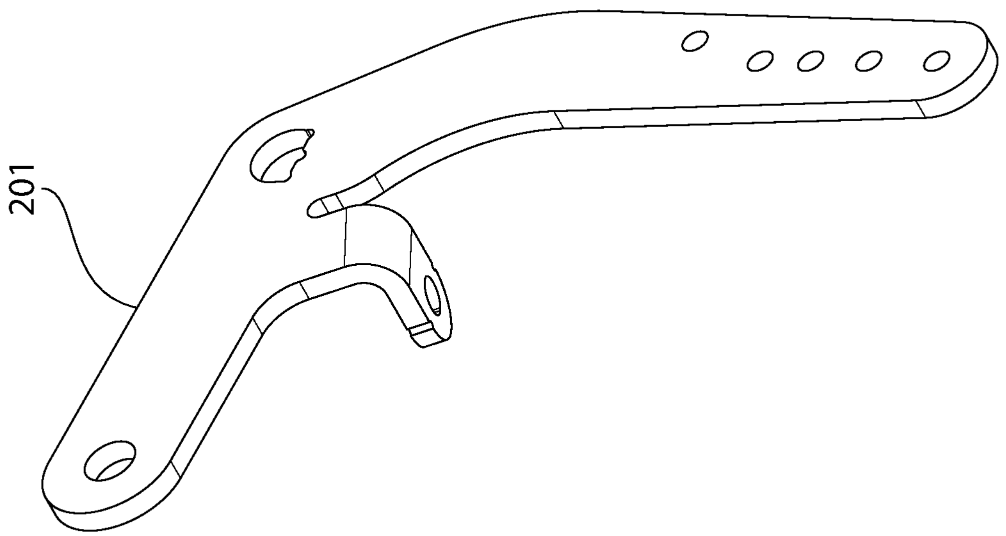
FIG. 34 is a bottom perspective view of a secondary arm of the governor lever thereof.
Figure 35:
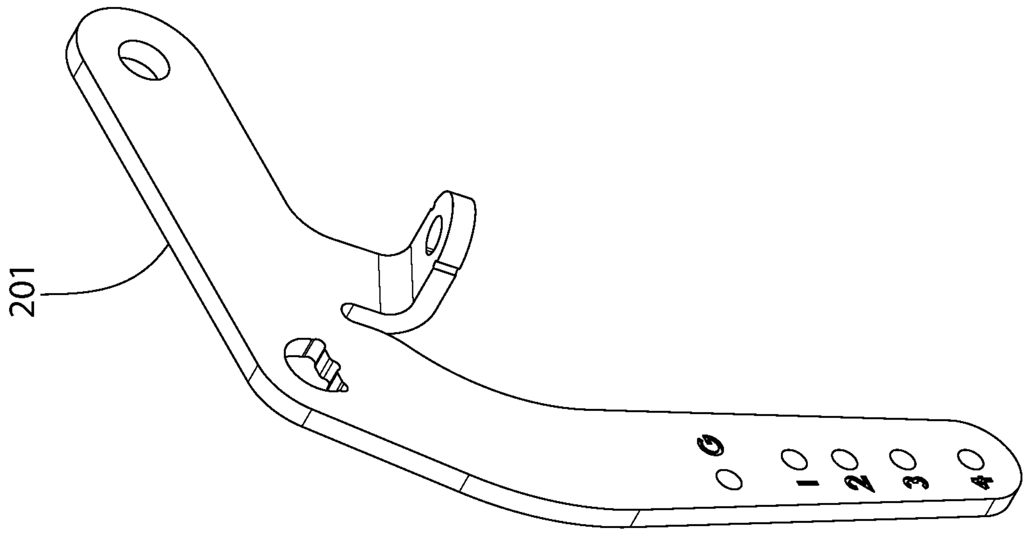
FIG. 35 is a perspective view of the secondary arm of the governor lever thereof.
Figure 37:
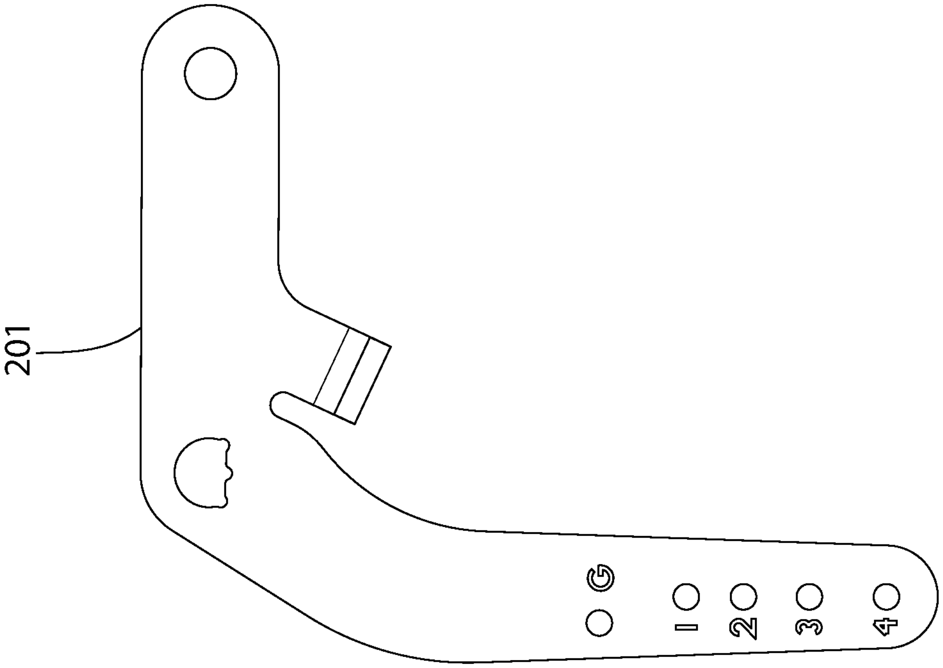
FIG. 37 is a top plan view of the secondary arm of the governor lever thereof.
Figure 36:
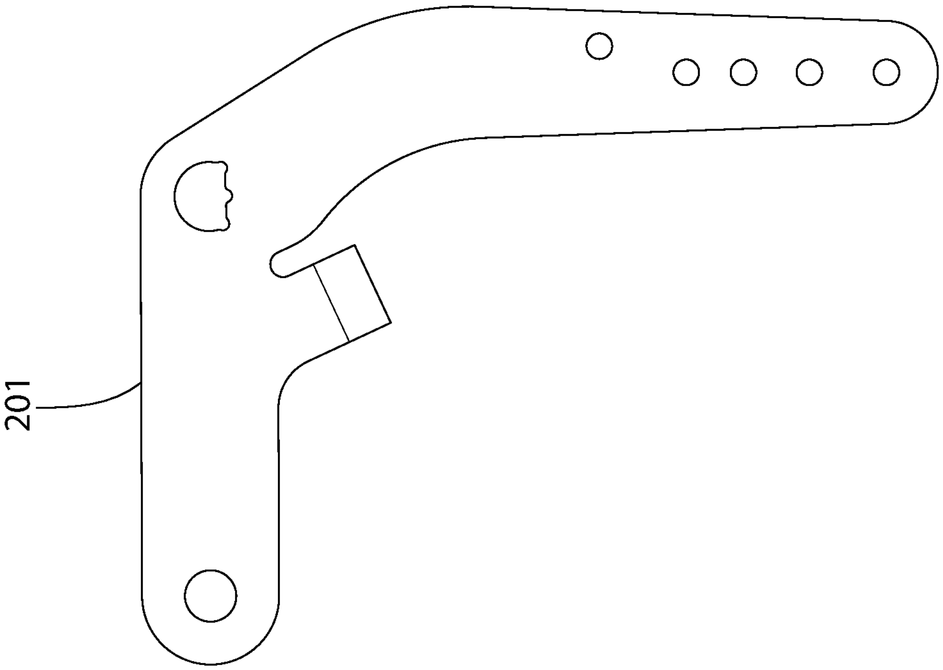
FIG. 36 is a bottom plan view of the secondary arm of the governor lever thereof.
Figure 38:
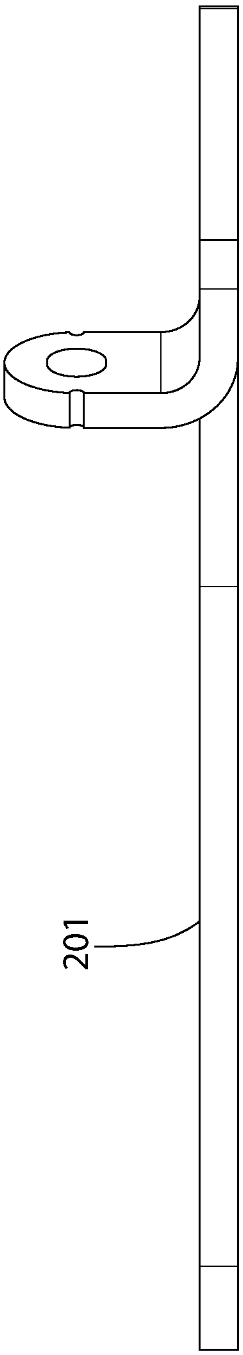
FIG. 38 is a front view of the secondary arm of the governor lever thereof.
Figure 39:
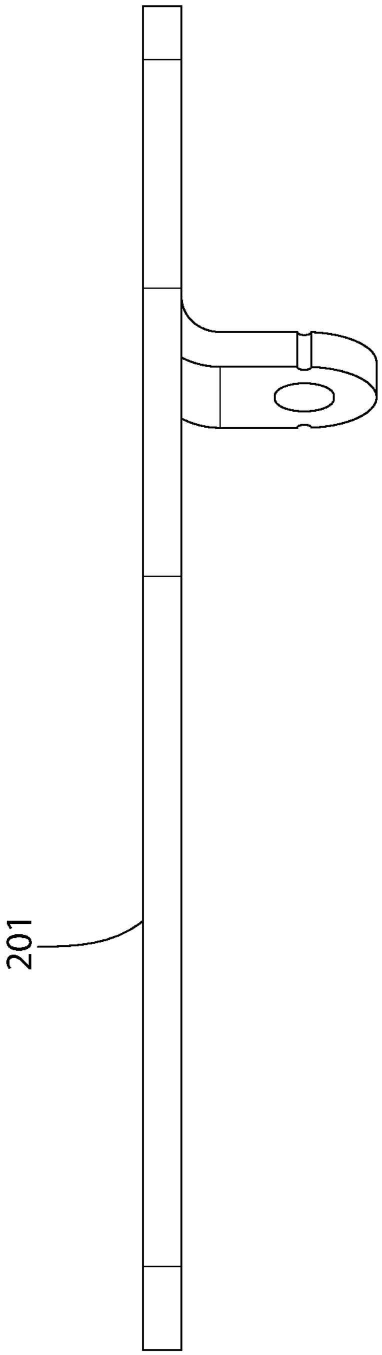
FIG. 39 is a rear view of the secondary arm of the governor lever thereof.
Figure 40:
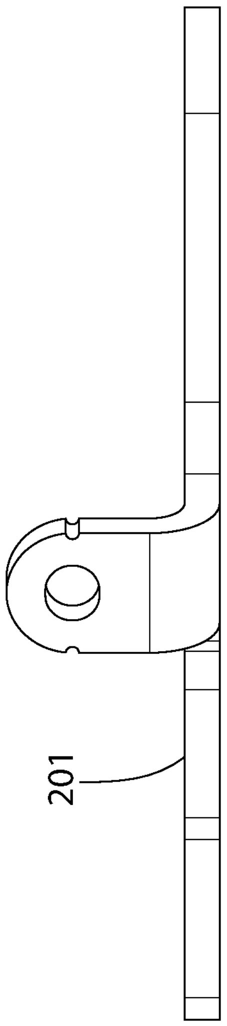
FIG. 40 is a left side view of the secondary arm of the governor lever thereof.
Figure 41:
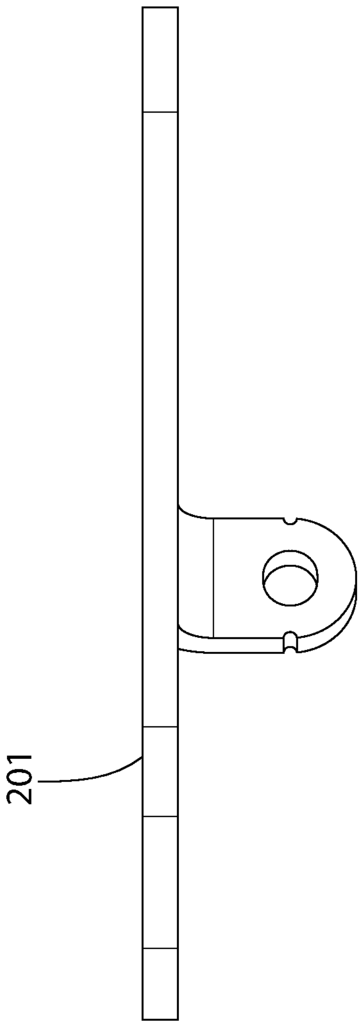
FIG. 41 is a right side view of the secondary arm of the governor lever thereof.
Figure 42:
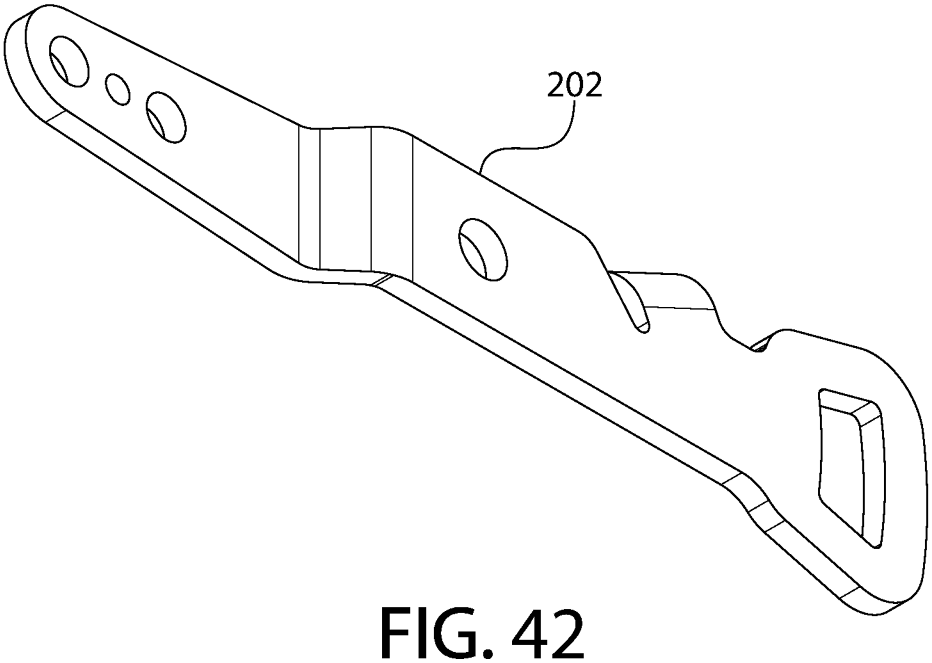
FIG. 42 is a bottom perspective view of a primary arm of the governor lever thereof.
Figure 43:
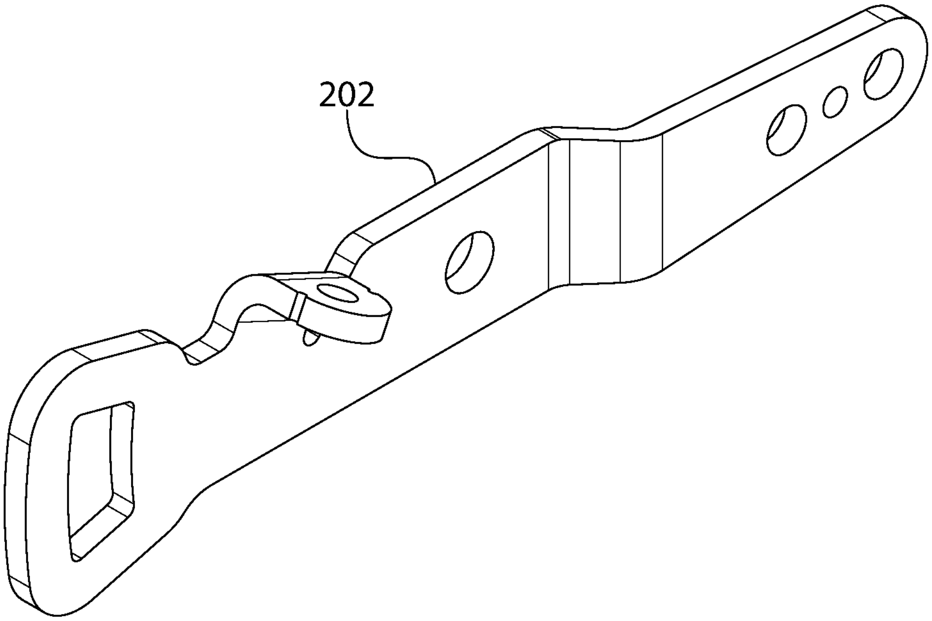
FIG. 43 is a perspective view of the primary arm of the governor lever thereof.
Figure 44:
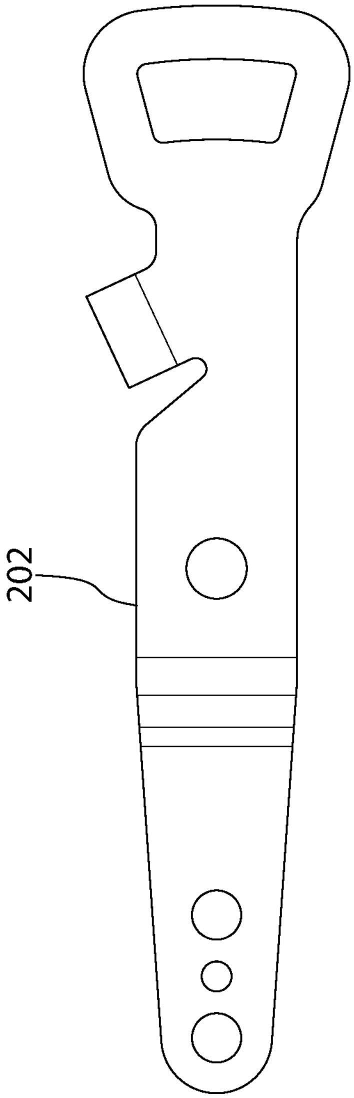
FIG. 44 is a bottom plan view of the primary arm of the governor lever thereof.
Figure 45:
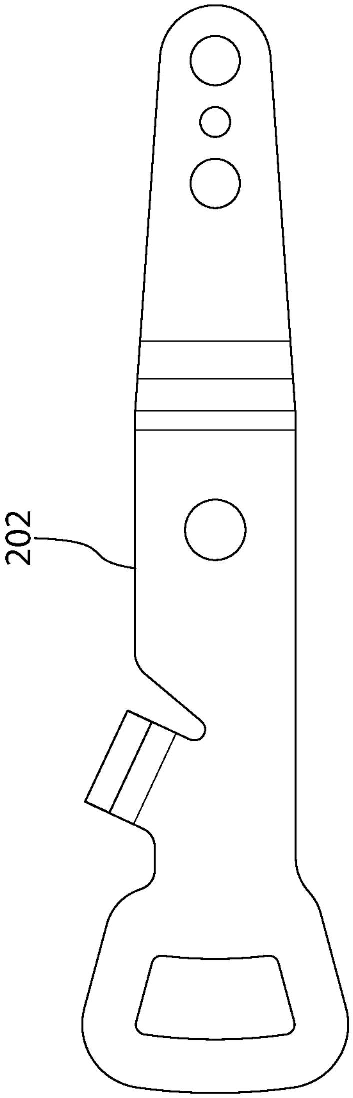
FIG. 45 is a top plan view of the primary arm of the governor lever thereof.
Figure 47:
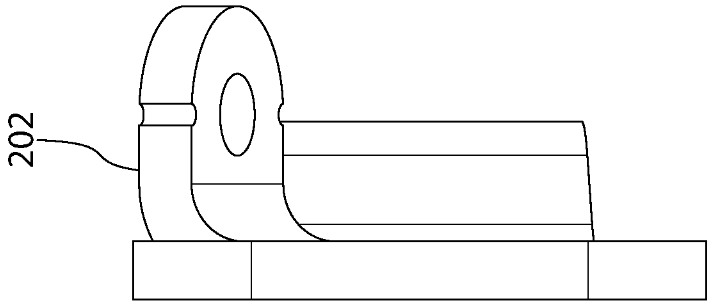
FIG. 47 is a right view of the primary arm of the governor lever thereof.
Figure 46:
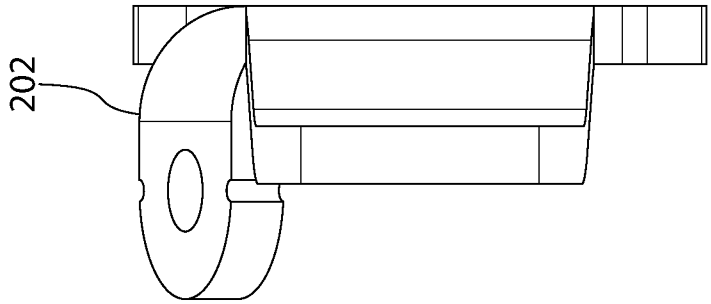
FIG. 46 is a left view of the primary arm of the governor lever thereof.
Figure 48:
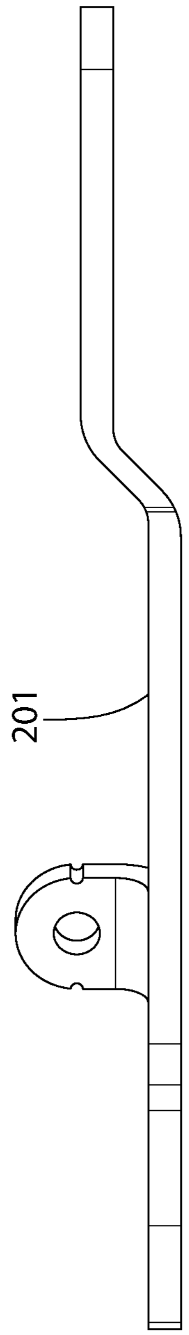
FIG. 48 is a rear view of the primary arm of the governor lever thereof.
Figure 49:
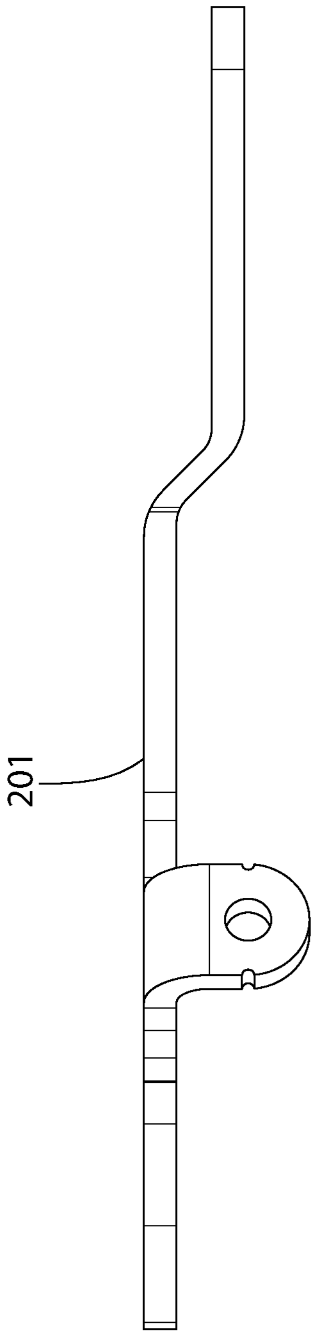
FIG. 49 is a front view of the primary arm of the governor lever thereof.

Turning to FIGS. 31-49, a second implementation of the linkage assembly 200 is shown paired with the governor shaft 31. FIG. 31 shows the proximal end 32 of the governor shaft 31 engaged with a primary arm 201 and a secondary arm 202. As better seen in FIG. 33, the proximal end of the shaft 32 engages with an aperture 211 which has a generally "D" shape to non-rotatably couple to the governor shaft 31. As with the linkage assembly 100, the aperture 211 may have a variety of configurations to permit non-rotatable assembly, and may be round and clamp to the proximal end 32 in a different manner. Alternately it may be welded, brazed, connected via a splined connection, or other methods known in the art. A fastener 130 engages the proximal end 32 to secure the primary arm 201 to the governor shaft 31. Optionally, the fastener 130 may be a nut. In other implementations, the fastener 130 may be a pin such as a cotter pin or other pin. In yet other configurations, the fastener 130 may be replaced by a welded or brazed connection, or other fastening means known in the art.

The primary arm 201 also has a plurality of holes 210 to engage the biasing element 40 so that the governor lever 206 of the linkage assembly 200 can be used to bias the governor shaft 31 into the rest position. The primary arm 201 has a first tab 212 and a connection feature 214. The first tab 212 may be a metal tab bent at an angle with respect to the rest of the primary arm 201. The connection feature 214 may be a hole formed into the first tab 212 as shown, and the first tab 212 may incorporate lateral notches 215. The connection feature 214 and lateral notches 215 enable connection of a biasing element 205 to the primary arm 201. Finally, the primary arm 201 has a hole 216 which receives a pivot member 207. Optionally, the hole 216 may be threaded and the pivot member 207 may have corresponding threads to non-rotatably couple the pivot member 207 to the primary arm 201. Alternately, the pivot member 207 and hole 216 may be a free fit so that the pivot member 207 and the primary arm 201 may be rotatably coupled. The pivot member 207 and the hole 216 are located on an axis B-B which extends perpendicular to the hole 216 and the length of the pivot member 207.

The secondary arm 202 has a first tab 223 having a connection feature 225 and a pair of lateral notches 228. The first tab 223 may be a metal tab bent at an angle with respect to the rest of the secondary arm 202 and the connection feature 225 may be a hole formed through the first tab 223. The lateral notches 228 may be formed on either side of the connection feature 225 as shown. The connection feature 225 and the lateral notches 228 engage the biasing element 205 in a similar manner to that of the first tab 212 and lateral notches 215 of the primary arm 201.

The secondary arm 202 also has a hole 229 located on the axis B-B and configured to have a free fit with the pivot member 207. Thus, the secondary arm 202 may rotate about the axis B-B with respect to the primary arm 201. The pivot member 207 may be a shoulder bolt or other fastener configured to permit relative rotation of the primary arm 201 relative to the secondary arm 202. The biasing element 205 may be used to bias the secondary arm 201 in a first rotational direction $D_1$ about the axis B-B. The first rotational direction $D_1$ is a counter-clockwise direction. In other implementations, the first rotational direction $D_1$ may be either clockwise or counter-clockwise, depending on the desired configuration. In the case of the linkage assembly 200, the secondary arm 202 is preferably biased into a first position where the secondary arm 202 is rotated counter-clockwise with respect to the primary arm 201. In other implementations, the secondary arm 202 may be biased into a second position where the secondary arm 202 is rotated clockwise with respect to the primary arm 201.

The secondary arm 202 further has an aperture 221 and a plurality of holes 227. The plurality of holes 227 are utilized to connect a throttle link 203 and may optionally receive additional links or biasing elements as desired. The aperture 221 is shaped so that it receives the proximal end 32 of the governor shaft 31. The aperture 221 is also shaped to permit relative rotation of the secondary arm 202 with respect to the primary arm 201. Thus, the fastener 130 mentioned above may be loosened, the correct relative orientation between the primary arm 201 and the secondary arm 202 set, and the fastener 130 may be tightened to clamp the primary arm 201 to the secondary arm 202 by virtue of threads on the proximal end 32 of the governor shaft 31. Thus, the relative orientation of the governor shaft 31 may be set with respect to the throttle link 203 and the throttle valve 21. This ensures rapid and reliable setting of the governor 30 during assembly or maintenance.

As can be seen, the aperture 221 sets the travel limits and defines the first and second positions of the secondary arm 202 with respect to the primary arm 201. Thus, the aperture 221 of the secondary arm 202 is used to control the range of motion. Optionally, the aperture 221 and the aperture 211 may be reversed, such that the aperture 211 is located on the secondary arm 202 and the aperture 221 is located on the primary arm 201.

Figure 50:
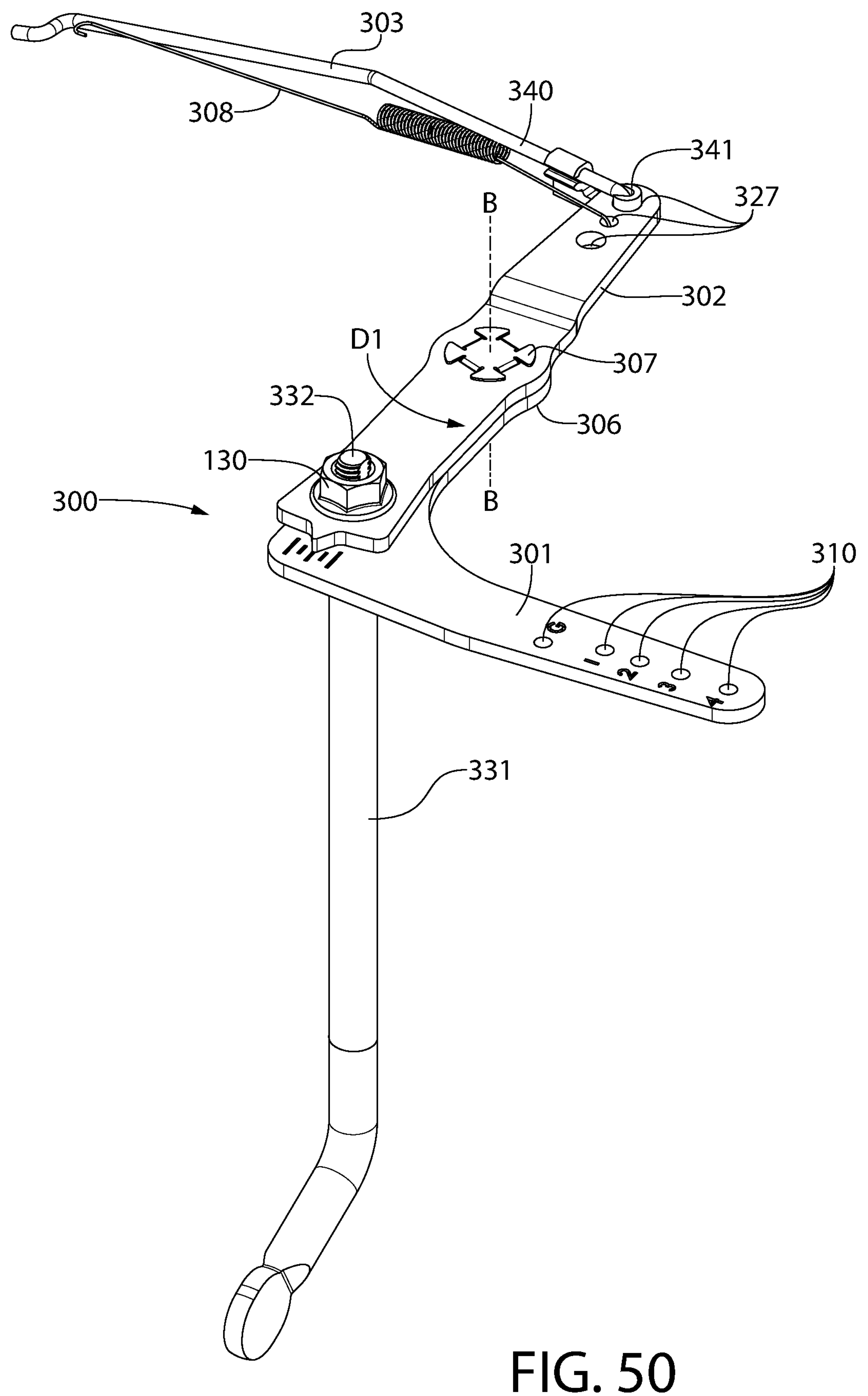
FIG. 50 is a perspective view of a third implementation of a linkage assembly and a governor shaft.
Figure 51:
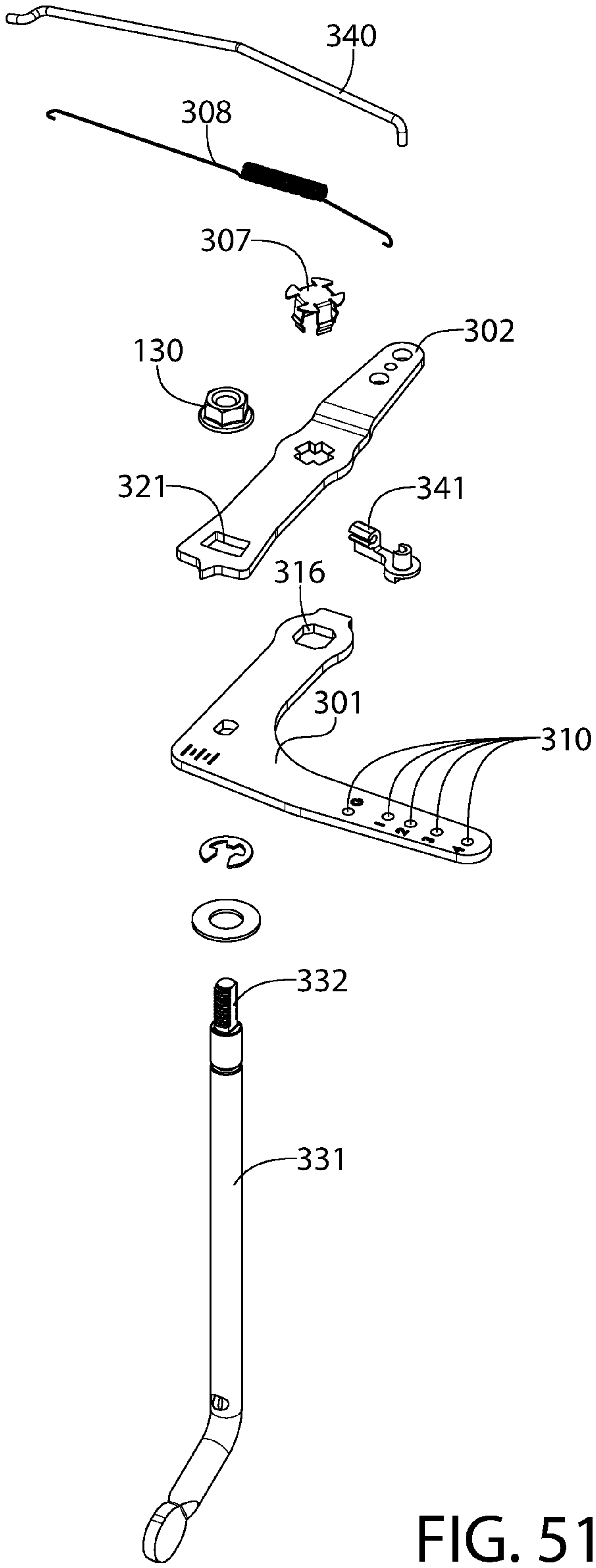
FIG. 51 is an exploded view of the linkage assembly and governor shaft of FIG. 50.
Figure 52:
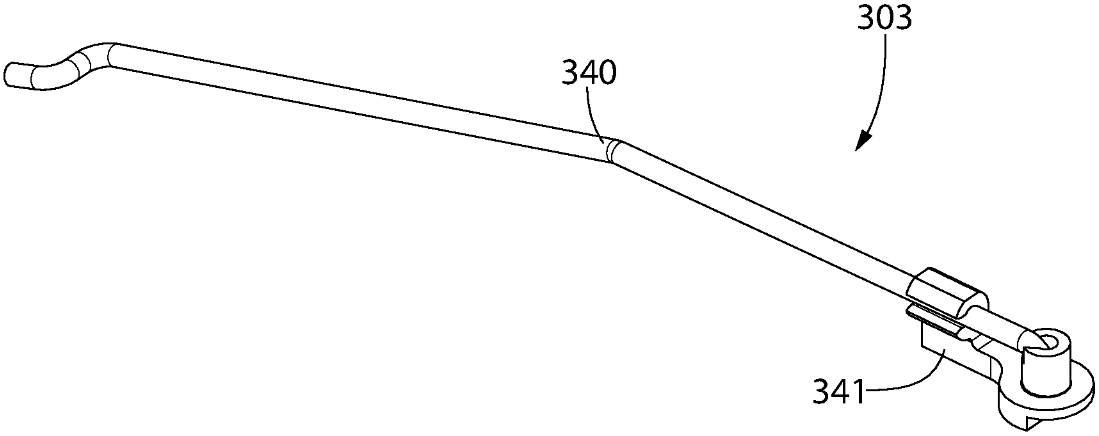
FIG. 52 is a perspective view of a throttle link of the linkage assembly thereof.
Figure 53:
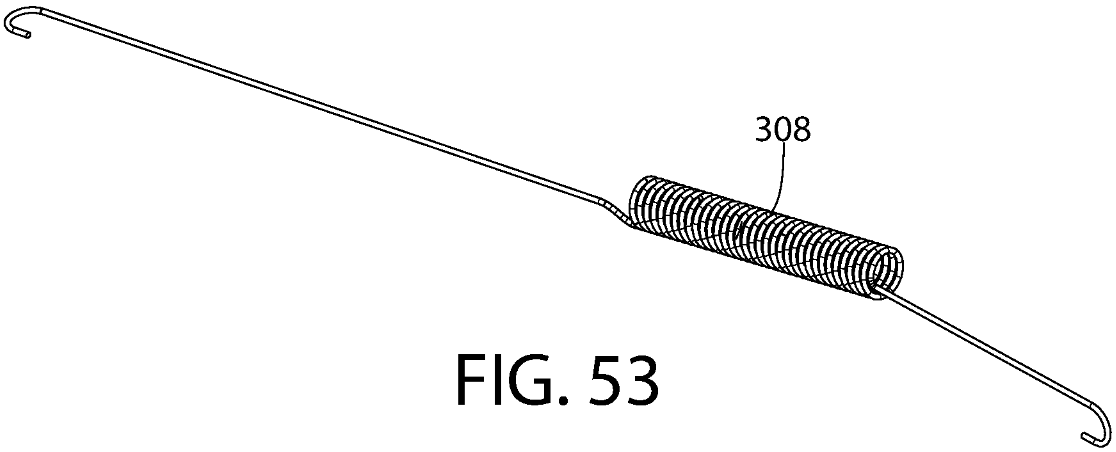
FIG. 53 is a perspective view of a biasing element of the linkage assembly thereof.

Turning to FIGS. 50-63, a third implementation of the linkage assembly 300 is shown paired with a governor shaft 331. FIG. 50 shows the proximal end 332 of the governor shaft 331 engaged with a primary arm 301 and a secondary arm 302. The proximal end 332 of the governor shaft 331 engages with an aperture 311 which has two flat sides to non-rotatably couple the primary arm 301 to the governor shaft 331. As with the linkage assembly 100, the aperture 311 may have a variety of configurations to permit non-rotatable assembly, and may be round and clamp to the proximal end 332 in a different manner. Alternately it may be welded, brazed, connected via a splined connection, or other methods known in the art. A fastener 130 engages the proximal end 332 to secure the primary arm 301 to the governor shaft 331. Optionally, the fastener 130 may be a nut. In other implementations, the fastener 130 may be a pin such as a cotter pin or other pin. In yet other configurations, the fastener 130 may be replaced by a welded or brazed connection, or other fastening means known in the art.

The primary arm 301 has a plurality of holes 310 to engage the biasing element 40 so that the governor lever 306 of the linkage assembly 300 can be used to bias the governor shaft 331 into the rest position. The primary arm 301 also has a hole 316 which receives a pivot member 307. Optionally, the hole 316 may be non-circular. In the present example, the hole 316 is substantially square as will be discussed in greater detail below. The pivot member 307 extends into the hole 316 to couple the pivot member 307 to the primary arm 301. The pivot member 307 and the hole 316 are located on an axis B-B which extends perpendicular to the hole 316. Optionally, the secondary arm 302 may rotate with respect to the primary arm 301 about the axis B-B, the axis B-B extending through the pivot member 307. Thus, the pivot member 307 allows rotation of the secondary arm 302 with respect to the primary arm 301.

The secondary arm 302 has a hole 329 located on the axis B-B and configured to receive the pivot member 307. The hole 329 is a generally cruciform shape. Thus, the secondary arm 302 may rotate about the axis B-B with respect to the primary arm 301, the axis B-B intersecting the pivot member 307. The pivot member 307 is formed of a metal material such as spring steel, but may also be formed of plastic or another material. The pivot member 307 also functions as a biasing element. Thus, the arrangement of the pivot member 307, in combination with the holes 316, 329, allows pivoting of the primary and secondary arms 301, 302. In addition, the pivot member 307 may also bias the secondary arm 302 with respect to the primary arm 301 in a first rotational direction $D_1$ about the axis B-B.

The first rotational direction $D_1$ is a counter-clockwise direction. In other implementations, the first rotational direction $D_1$ may be either clockwise or counter-clockwise, depending on the desired configuration. In the case of the linkage assembly 300, the secondary arm 302 is preferably biased into a first position where the secondary arm 302 is rotated counter-clockwise with respect to the primary arm 301. In other implementations, the secondary arm 302 may be biased into a second position where the secondary arm 302 is rotated clockwise with respect to the primary arm 301.

The secondary arm 302 further has an aperture 321 and a plurality of holes 327. The plurality of holes 327 are utilized to connect a throttle link 303 and may optionally receive additional links or biasing elements as desired. In the present implementation a biasing element 308 is utilized along with the throttle link 303. The aperture 321 is shaped so that it receives the proximal end 332 of the governor shaft 331. The aperture 321 is also shaped to permit relative rotation of the secondary arm 302 with respect to the primary arm 301. Thus, the fastener 130 mentioned above may be loosened, the correct relative orientation between the primary arm 301 and the secondary arm 302 set, and the fastener 130 may be tightened to clamp the primary arm 301 to the secondary arm 302 by virtue of threads on the proximal end 332 of the governor shaft 331. Thus, the relative orientation of the governor shaft 331 may be set with respect to the throttle link 303 and the throttle valve 21. This ensures rapid and reliable setting of the governor 30 during assembly or maintenance.

As can be seen, the aperture 321 sets the travel limits and defines the first and second positions of the secondary arm 302 with respect to the primary arm 301. Thus, the aperture 321 of the secondary arm 302 is used to control the range of motion. Optionally, the aperture 321 and the aperture 311 may be reversed, such that the aperture 311 is located on the secondary arm 302 and the aperture 321 is located on the primary arm 301. The aperture 321 may be a slot having a generally arcuate shape, with straight or arcuate ends defining the travel limits of the secondary arm 302.

Optionally, the throttle link 303 may have a rod 340 and a retainer 341, the retainer 341 retaining an end of the rod 340 and securing it to the secondary arm 302. Optionally, the retainer 341 may be formed of plastic or metal. The rod 340 may be formed of metal, or in some other implementations it may be formed of metal. Collectively, the throttle link 303 is formed by the rod 340 and the retainer 341. However, in other implementations, the retainer 341 may be omitted and the throttle link 303 may be exclusively formed of the rod 340.

Figure 54:
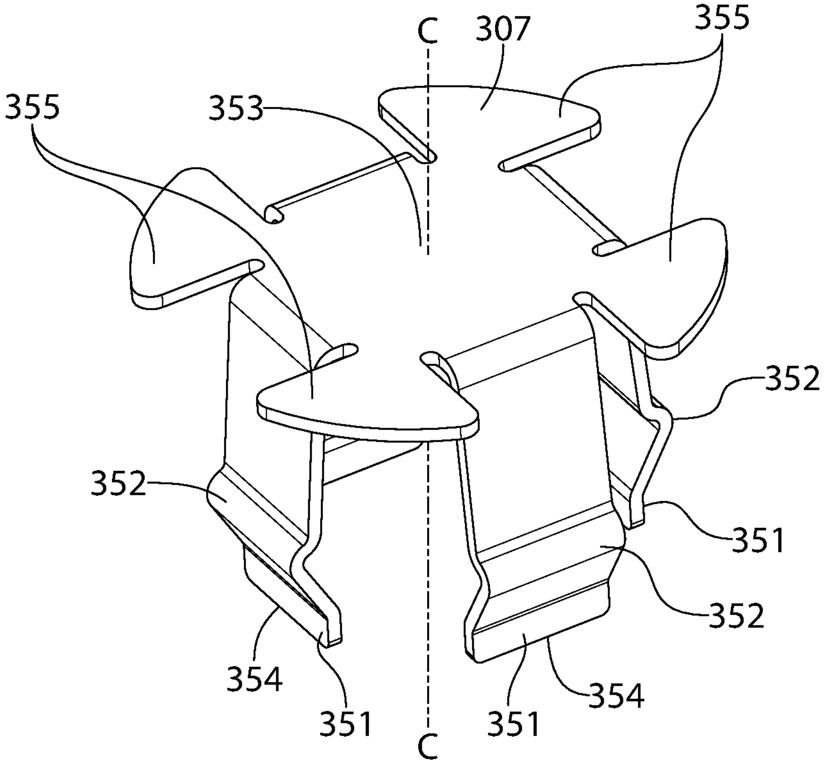
FIG. 54 is a perspective view of a pivot member of the linkage assembly thereof.
Figure 55:
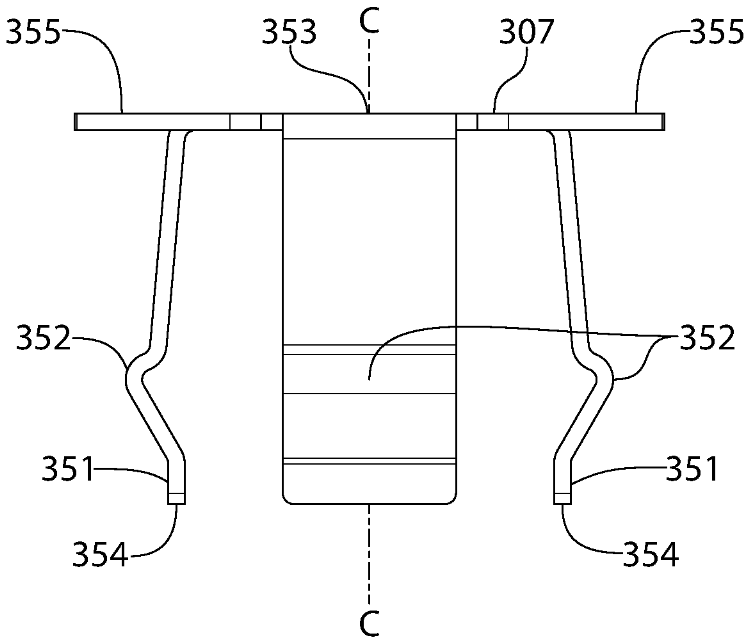
FIG. 55 is a front view of the pivot member of the linkage assembly thereof.
Figure 56:
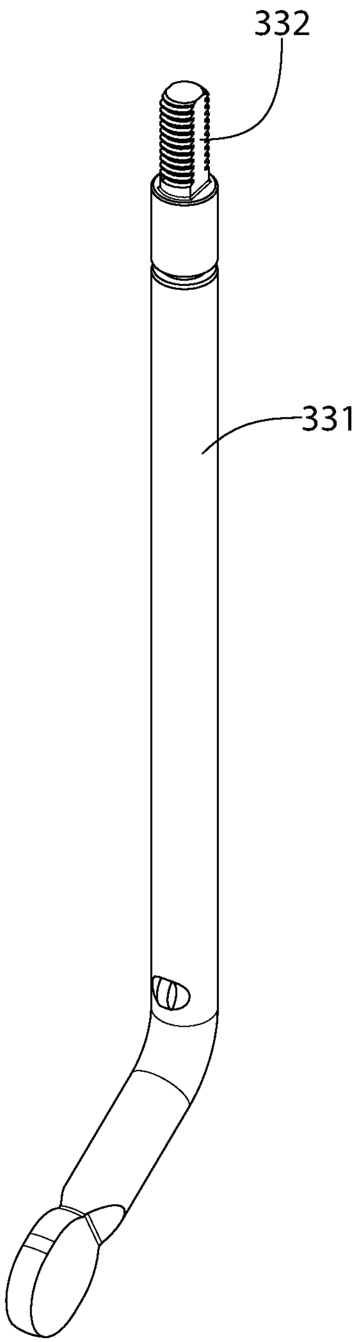
FIG. 56 is a perspective view of the governor shaft thereof.

The pivot member 307 is shown in greater detail in FIGS. 54 and 55. The pivot member 307 is formed of a sheet material such as spring steel, and has four tabs 351. Each tab 351 has a snap feature 352 and extends from a base 353 to a distal end 354. The snap features 352 are located proximate the distal ends 354. The base 353 further has four retention features 355 which extend radially outward from a center axis C-C between adjacent tabs 351. The base 353 is substantially planar and perpendicular to the axis C-C. When assembled with the primary and secondary arms 301, 302, the tabs 351 extend through the holes 316, 329 such that the snap features 352 engage the primary arm 301 and compress the primary and secondary arms 301, 302 together to maintain them in position. The retention features 355 engage the secondary arm 302 while the snap features 352 engage the primary arm 301.

Figure 57:
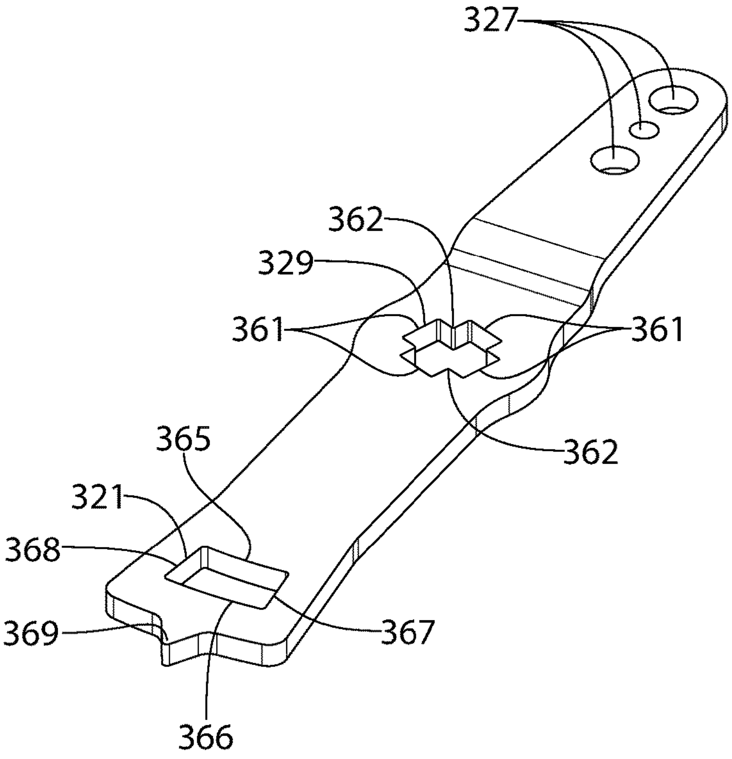
FIG. 57 is a perspective view of a secondary arm of the governor lever thereof.
Figure 58:
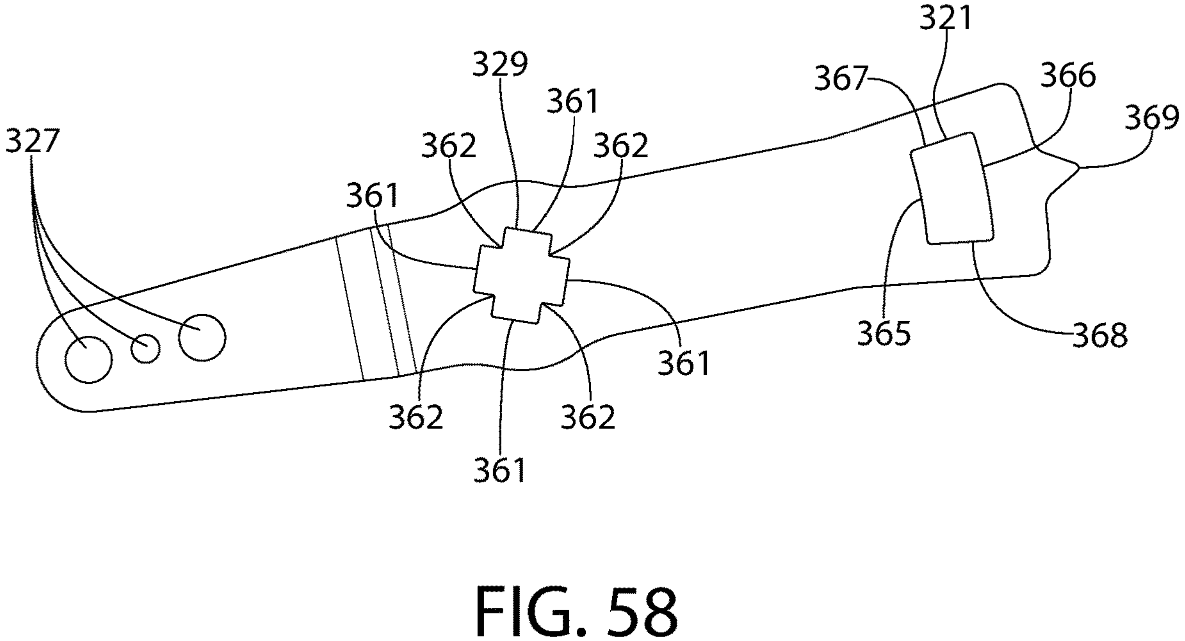
FIG. 58 is a top plan view of the secondary arm of the governor lever thereof.

FIGS. 57 and 58 illustrate the secondary arm 302 in greater detail. The secondary arm 302 incorporates the plurality of holes 327 for receiving the throttle link 303, the hole 329 for receiving the pivot member 307, and the aperture 321 for receiving the proximal end 332 of the governor shaft 331 while allowing a range of adjustment between the primary and secondary arms 301, 302. The hole 329 has a cruciform shape as noted above. The hole 329 incorporates four notches 361, each of the notches 361 sized to receive a tab 351 of the pivot member 307. The notches 361 terminate in corners 362 which isolate the notches 361 from one another. The notches 361 prevent rotation of the pivot member 307 within the hole 329.

The aperture 321 has an arcuate inner wall 365, an arcuate outer wall 366, and first and second lateral sides 367, 368 which extend from the arcuate inner wall 365 to the arcuate outer wall 366. The first and second lateral sides 367, 368 constrain motion of the secondary arm 302 when they contact with the proximal end 332 of the governor shaft 331. An indicator 369 may be formed on the secondary arm 302 to indicate the position or orientation of the secondary arm 302 with respect to the primary arm 301. Optionally, one or more bends may be utilized to place the plurality of holes 327 on a different plane than the hole 329 and the aperture 321. This may be done for clearance reasons or may be done to better align the throttle link 303 and increase reliability of the linkage assembly 300.

Figure 59:
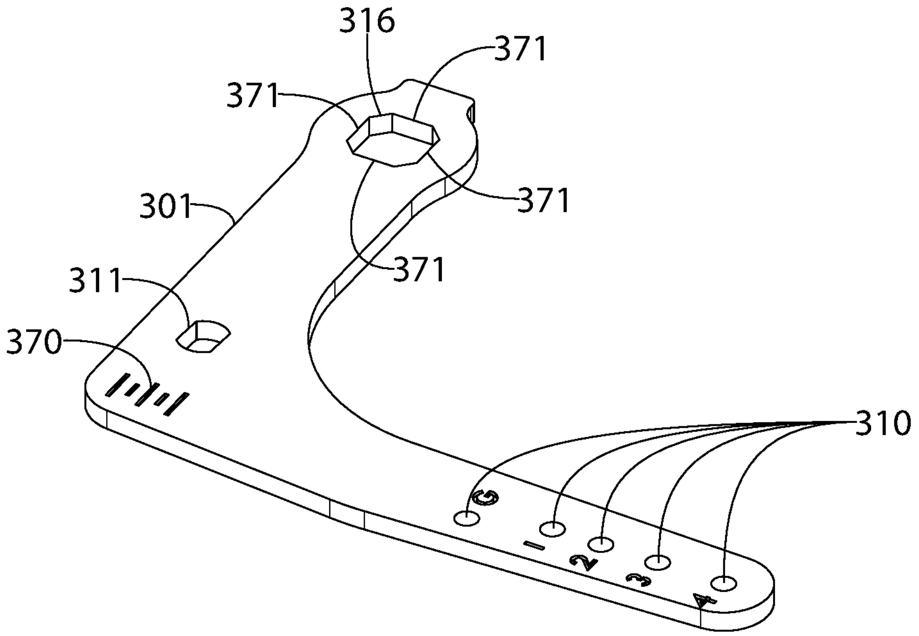
FIG. 59 is a perspective view of a primary arm of the governor lever thereof.
Figure 60:
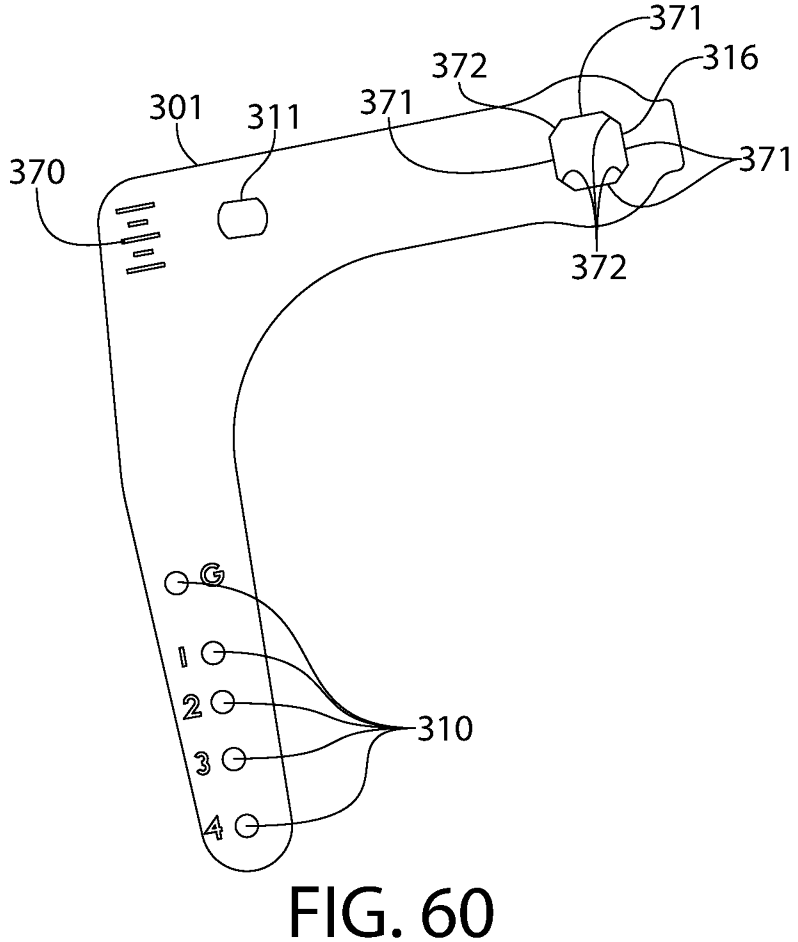
FIG. 60 is a top plan view of the primary arm of the governor lever thereof.
Figure 61:
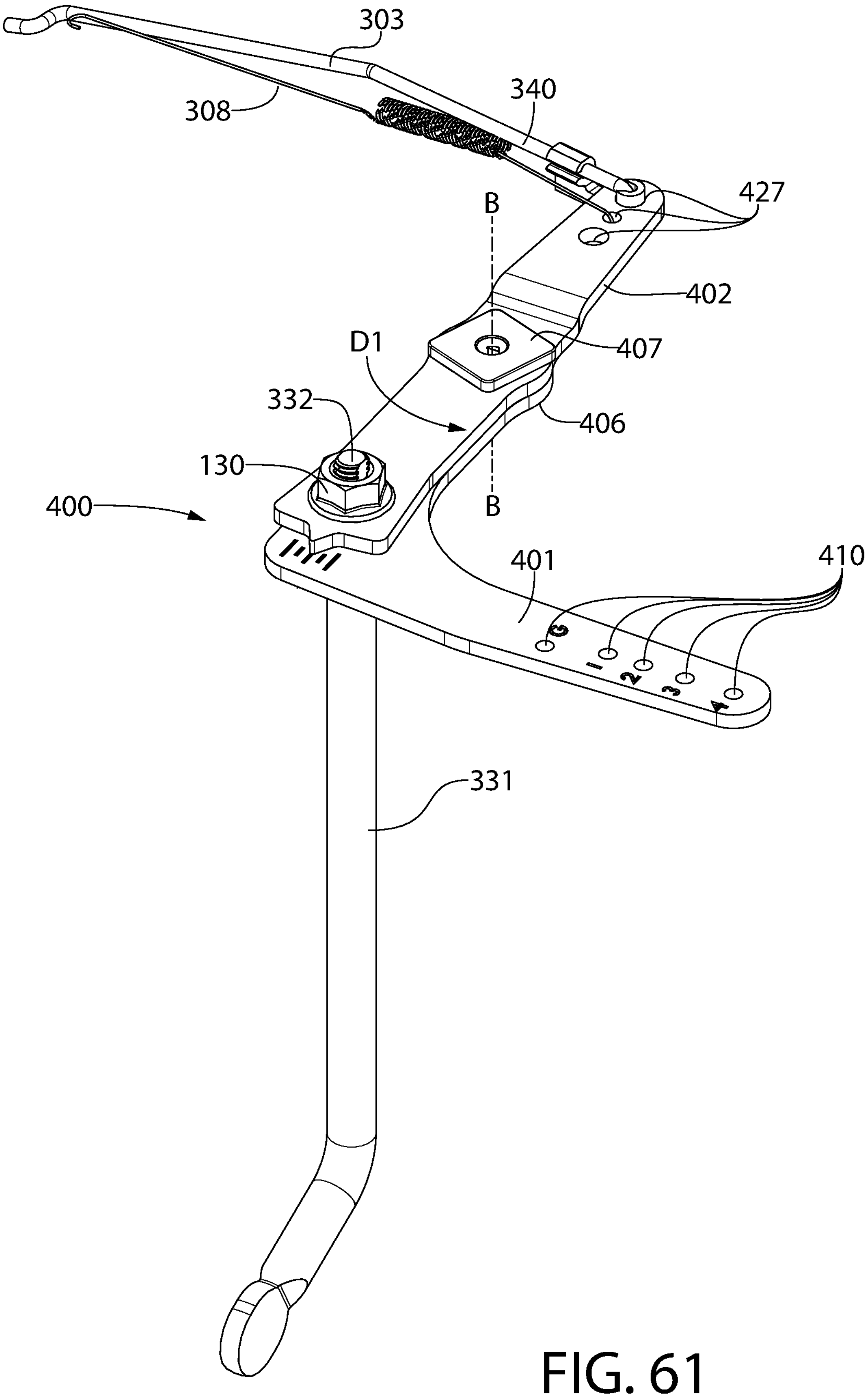
FIG. 61 is a perspective view of a fourth implementation of a linkage assembly and a governor shaft.
Figure 62:
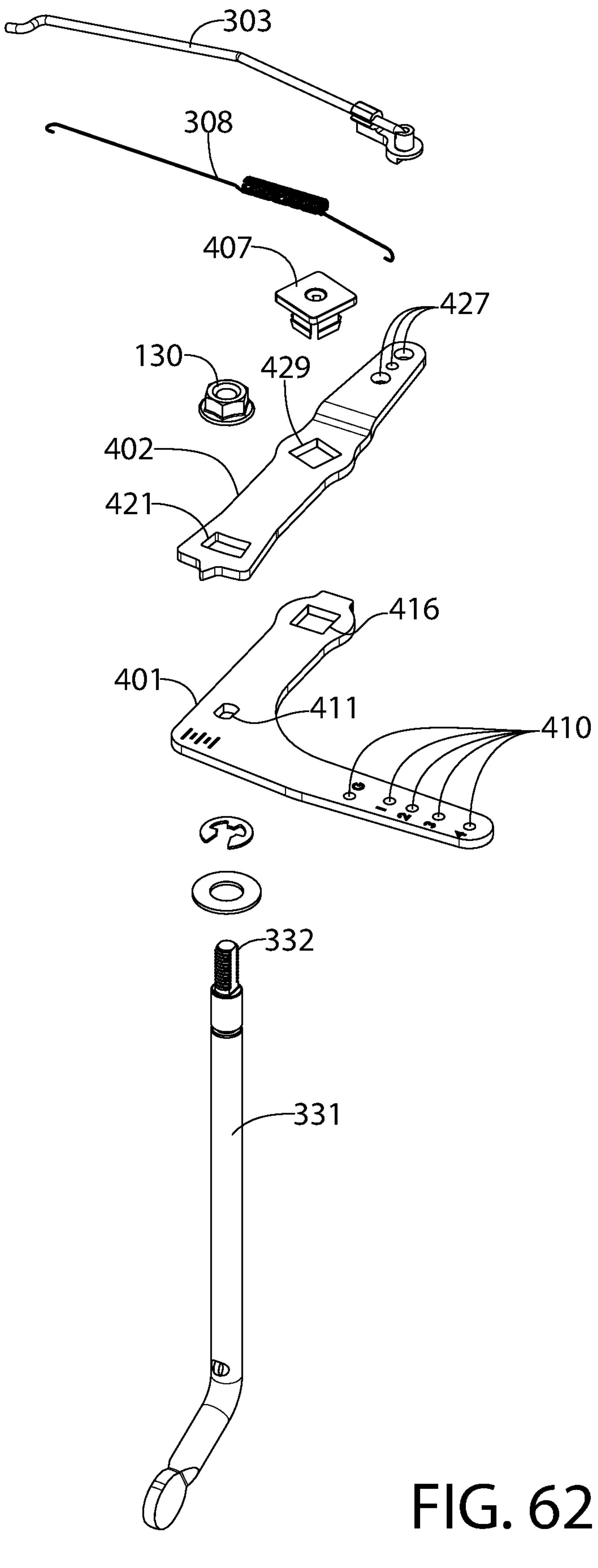
FIG. 62 is an exploded view of the linkage assembly and governor shaft of FIG. 61.

Turning to FIGS. 59 and 60, the primary arm 301 is illustrated in greater detail. The primary arm 301 has the hole 316, the aperture 311, and the plurality of holes 310. The aperture 311 may be a slot having two arcuate sides and two flat sides, or it may be any other shape suitable for non-rotatable connection to the proximal end 332 of the governor shaft 331. In other configurations, it may be a D shape, or it may be a spline or other shape. The primary arm 301 may be planar and have a generally L shaped configuration. In other implementations, the primary arm 301 may be non-planar and be elongate or have any other shape.

The primary arm 301 also incorporates a plurality of graduations 370 which, in combination with the indicator 369 of the secondary arm 302, may be utilized to indicate the current setting of the secondary arm 302 with respect to the primary arm 301. In other implementations, the indicator 369 and the graduations 370 may be reversed such that the indicator 369 is on the primary arm 301 and the graduations 370 are on the secondary arm 302. In yet other configurations, other means of position indication may be used or the indicator 369 and graduations 370 may be omitted.

The hole 316 has a substantially square shape, with four sides 371, each side 371 substantially perpendicular to each adjacent side 371. A plurality of projections 372 extend between adjacent sides 371. The projections 372 engage the tabs 351 as the secondary arm 302 is rotated with respect to the primary arm 301. The tabs 351 deflect, providing a biasing torque which biases the secondary arm 302 in the first rotational direction $D_1$.

The amount of biasing torque can be adjusted by a variety of factors including the stiffness of the tabs 351 and the relative positioning of the sides 371 of the primary arm 301 with respect to the notches 361 of the secondary arm 302. In other words, no biasing torque is present when the sides 371 are parallel with the notches 361. It is necessary to set the rotational position of the sides 371 with respect to the notches 361 to achieve the desired biasing torque at both the first and second positions of the secondary arm 302. The rotational angle between the notches 361 and the sides 371 may vary depending on the desired biasing torque, the properties and geometry of the pivot member 307, and the desired range of motion.

Turning to FIGS. 61-68, a fourth implementation of a linkage assembly 400 is illustrated. The linkage assembly 400 is shown paired with the governor shaft 331 having a proximal end 332. The linkage assembly 400 has a governor lever 406. The governor lever 406 has a primary arm 401 and a secondary arm 402, the primary arm 401 having an aperture 411. The aperture 411 receives the proximal end 332 of the governor shaft 331. The fastener 130 secures the primary and secondary arms 401, 402 to the governor shaft 331. The biasing member 308 and the throttle link 303 are coupled to the secondary arm 402 in the same manner as in the linkage assembly 300.

The primary arm 401 has a plurality of holes 410 to engage the biasing element 40 so that the governor lever 406 of the linkage assembly 400 can be used to bias the governor shaft 331 into the rest position. The primary arm 401 also has a hole 416 which receives a pivot member 407. Optionally, the hole 416 may be non-circular. In the present example, the hole 416 is substantially square as will be discussed in greater detail below. The pivot member 407 extends into the hole 416 to couple the pivot member 407 to the primary arm 401. The pivot member 407 and the hole 416 are located on an axis B-B which extends perpendicular to the hole 416. Optionally, the secondary arm 402 may rotate with respect to the primary arm 401 about the axis B-B, the axis B-B extending through the pivot member 407. Thus, the pivot member 407 allows rotation of the secondary arm 402 with respect to the primary arm 401.

The secondary arm 402 has a hole 429 located on the axis B-B and configured to receive the pivot member 407. The hole 429 is a generally square shape. Thus, the secondary arm 402 may rotate about the axis B-B with respect to the primary arm 401, the axis B-B intersecting the pivot member 407. The pivot member 407 is formed of a plastic material such as nylon, but may also be formed of metal or another material. The pivot member 407 also functions as a biasing element. Thus, the arrangement of the pivot member 407, in combination with the holes 416, 429, allows pivoting of the primary and secondary arms 401, 402. In addition, the pivot member 407 may also bias the secondary arm 402 with respect to the primary arm 401 in a first rotational direction $D_1$ about the axis B-B.

The first rotational direction $D_1$ is a counter-clockwise direction. In other implementations, the first rotational direction $D_1$ may be either clockwise or counter-clockwise, depending on the desired configuration. In the case of the linkage assembly 400, the secondary arm 402 is preferably biased into a first position where the secondary arm 402 is rotated counter-clockwise with respect to the primary arm 401. In other implementations, the secondary arm 402 may be biased into a second position where the secondary arm 402 is rotated clockwise with respect to the primary arm 401.

The secondary arm 402 further has an aperture 421 and a plurality of holes 427. The plurality of holes 427 are utilized to connect the throttle link 303 and the biasing element 308. The aperture 421 is shaped so that it receives the proximal end 332 of the governor shaft 331. The aperture 421 is also shaped to permit relative rotation of the secondary arm 402 with respect to the primary arm 401. Thus, the fastener 130 may be loosened, the correct relative orientation between the primary arm 401 and the secondary arm 402 set, and the fastener 130 may be tightened to clamp the primary arm 401 to the secondary arm 402 by virtue of threads on the proximal end 332 of the governor shaft 331. Thus, the relative orientation of the governor shaft 331 may be set with respect to the throttle link 303 and the throttle valve 21. This ensures rapid and reliable setting of the governor 30 during assembly or maintenance.

As can be seen, the aperture 421 sets the travel limits and defines the first and second positions of the secondary arm 402 with respect to the primary arm 401. Thus, the aperture 421 of the secondary arm 402 is used to control the range of motion. Optionally, the aperture 421 and the aperture 411 may be reversed, such that the aperture 411 is located on the secondary arm 402 and the aperture 421 is located on the primary arm 401. The aperture 421 may be a slot having a generally arcuate shape, with straight or arcuate ends defining the travel limits of the secondary arm 402.

Figure 63:
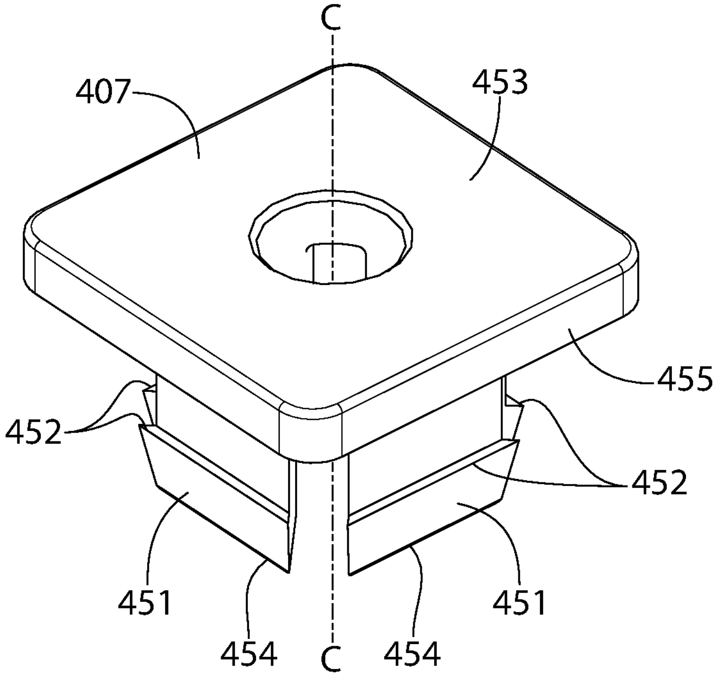
FIG. 63 is a perspective view of a pivot member of the linkage assembly thereof.
Figure 64:
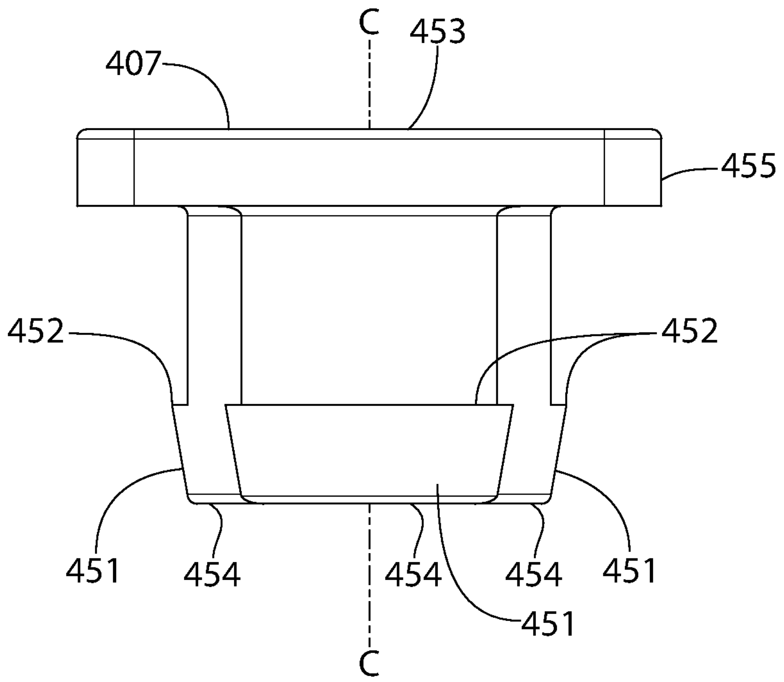
FIG. 64 is a front view of the pivot member of the linkage assembly thereof.

The pivot member 407 is shown in greater detail in FIGS. 63 and 64. The pivot member 407 is formed of a molded plastic material such as nylon, and has four tabs 451. Each tab 451 has a snap feature 452 and extends from a base 453 to a distal end 454. The snap features 452 are located proximate the distal ends 454. The base 453 further has a retention feature 455 which extends radially outward from a center axis C-C to form a generally square shape. The base 453 is substantially planar and perpendicular to the axis C-C. When assembled with the primary and secondary arms 401, 402, the tabs 451 extend through the holes 416, 429 such that the snap features 452 engage the primary arm 401 and compress the primary and secondary arms 401, 402 together to maintain them in position. The retention feature 455 engages the secondary arm 402 while the snap features 452 engage the primary arm 401.

Figure 65:
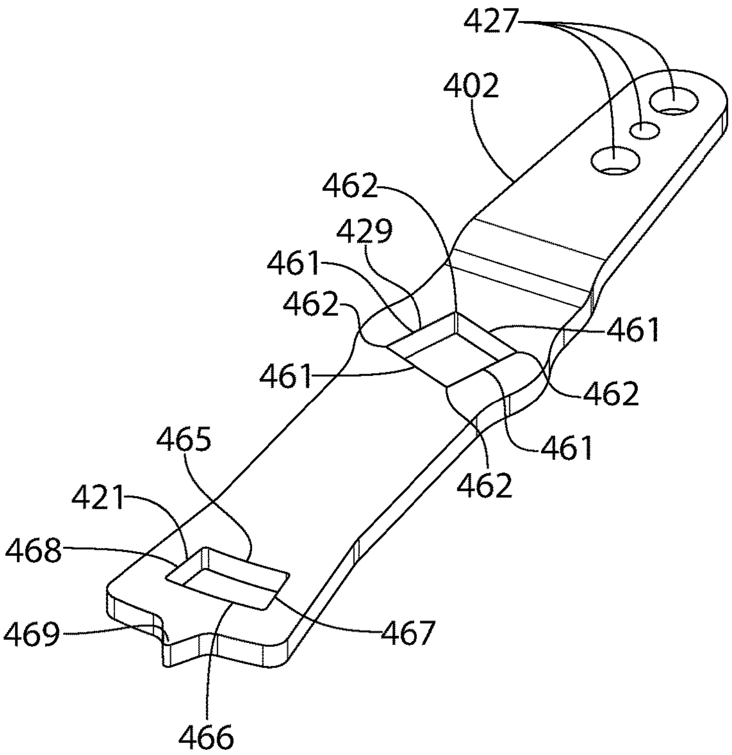
FIG. 65 is a perspective view of a secondary arm of the governor lever thereof.
Figure 66:
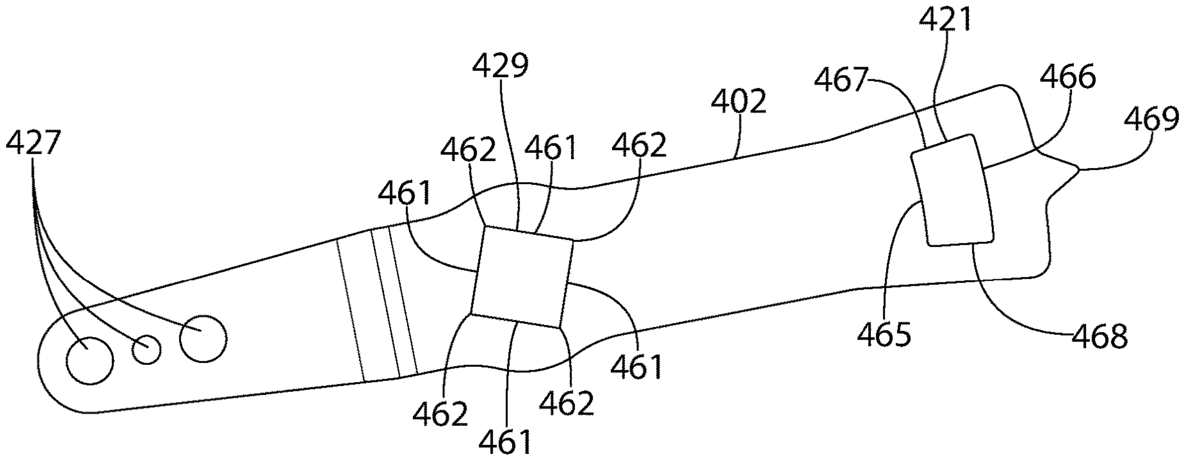
FIG. 66 is a top plan view of the secondary arm of the governor lever thereof.

FIGS. 65 and 66 illustrate the secondary arm 402 in greater detail. The secondary arm 402 incorporates the plurality of holes 427 for receiving the throttle link 303, the hole 429 for receiving the pivot member 407, and the aperture 421 for receiving the proximal end 332 of the governor shaft 331 while allowing a range of adjustment between the primary and secondary arms 401, 402. The hole 429 has a square shape as noted above. The hole 429 has four sides 461, each of the sides 461 sized to receive a tab 451 of the pivot member 407. Adjacent ones of the sides 461 are substantially perpendicular and terminate in corners 462 that have little or no radius or other deviation from a sharp corner. Optionally, the corners 462 may incorporate a chamfer, radius, or other feature if desired. In alternate configurations, the hole 429 may be a cruciform shape or other shape suitable for receiving the tabs 451 of the pivot member 407. The sides 461 prevent rotation of the pivot member 407 within the hole 429.

The aperture 421 has an arcuate inner wall 465, an arcuate outer wall 466, and first and second lateral sides 467, 468 which extend from the arcuate inner wall 465 to the arcuate outer wall 466. The first and second lateral sides 467, 468 constrain motion of the secondary arm 402 when they contact with the proximal end 332 of the governor shaft 331. An indicator 469 may be formed on the secondary arm 402 to indicate the position or orientation of the secondary arm 402 with respect to the primary arm 401. Optionally, one or more bends may be utilized to place the plurality of holes 427 on a different plane than the hole 429 and the aperture 421. This may be done for clearance reasons or may be done to better align the throttle link 303 and increase reliability of the linkage assembly 400.

Figure 67:
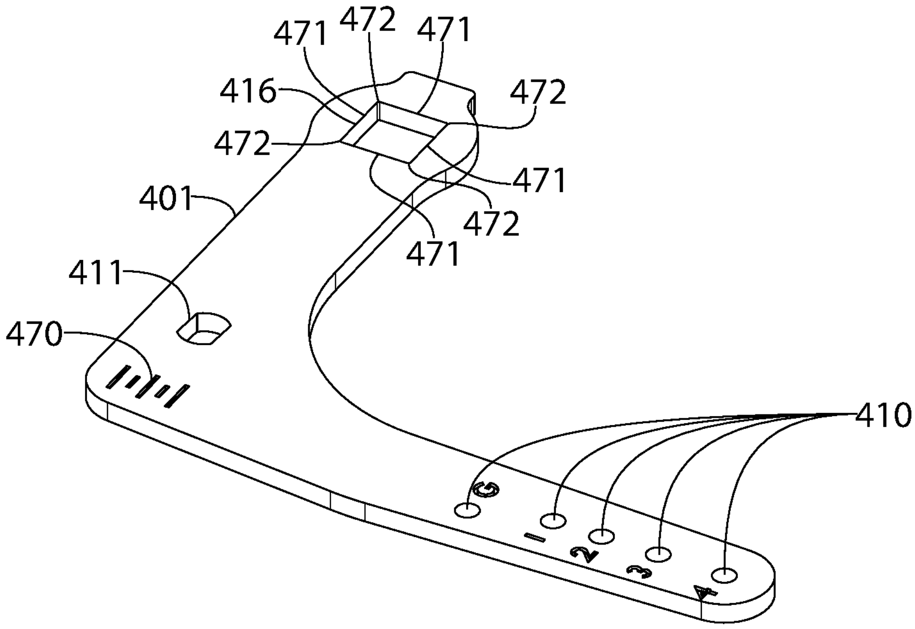
FIG. 67 is a perspective view of a primary arm of the governor lever thereof.
Figure 68:
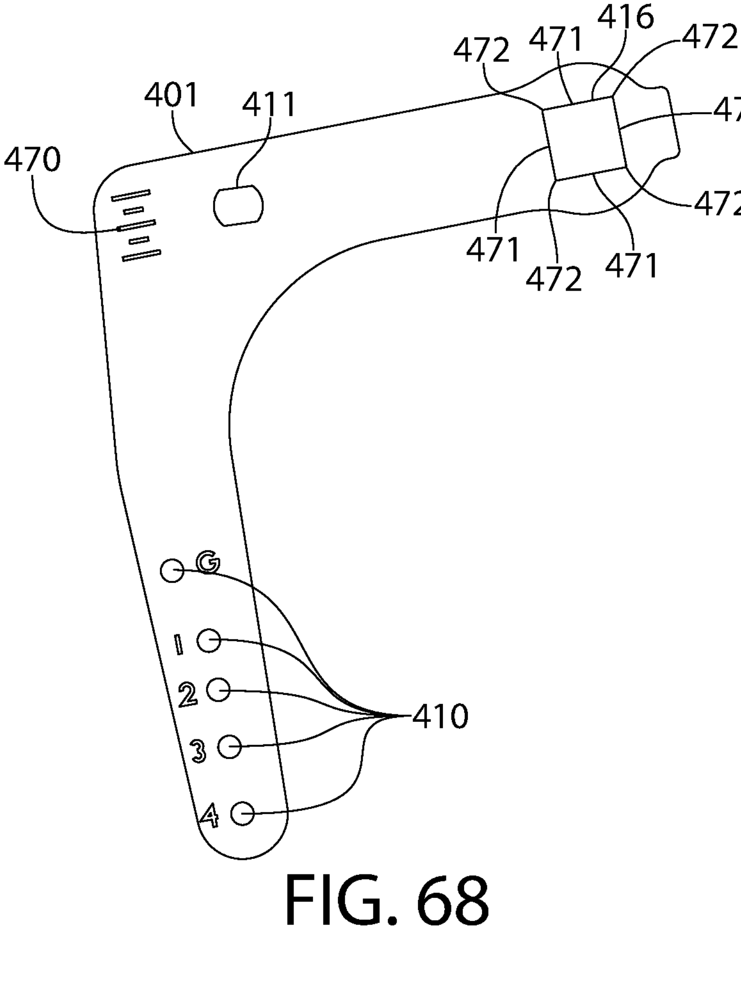
FIG. 68 is a top plan view of the primary arm of the governor lever thereof.
Figure 69:
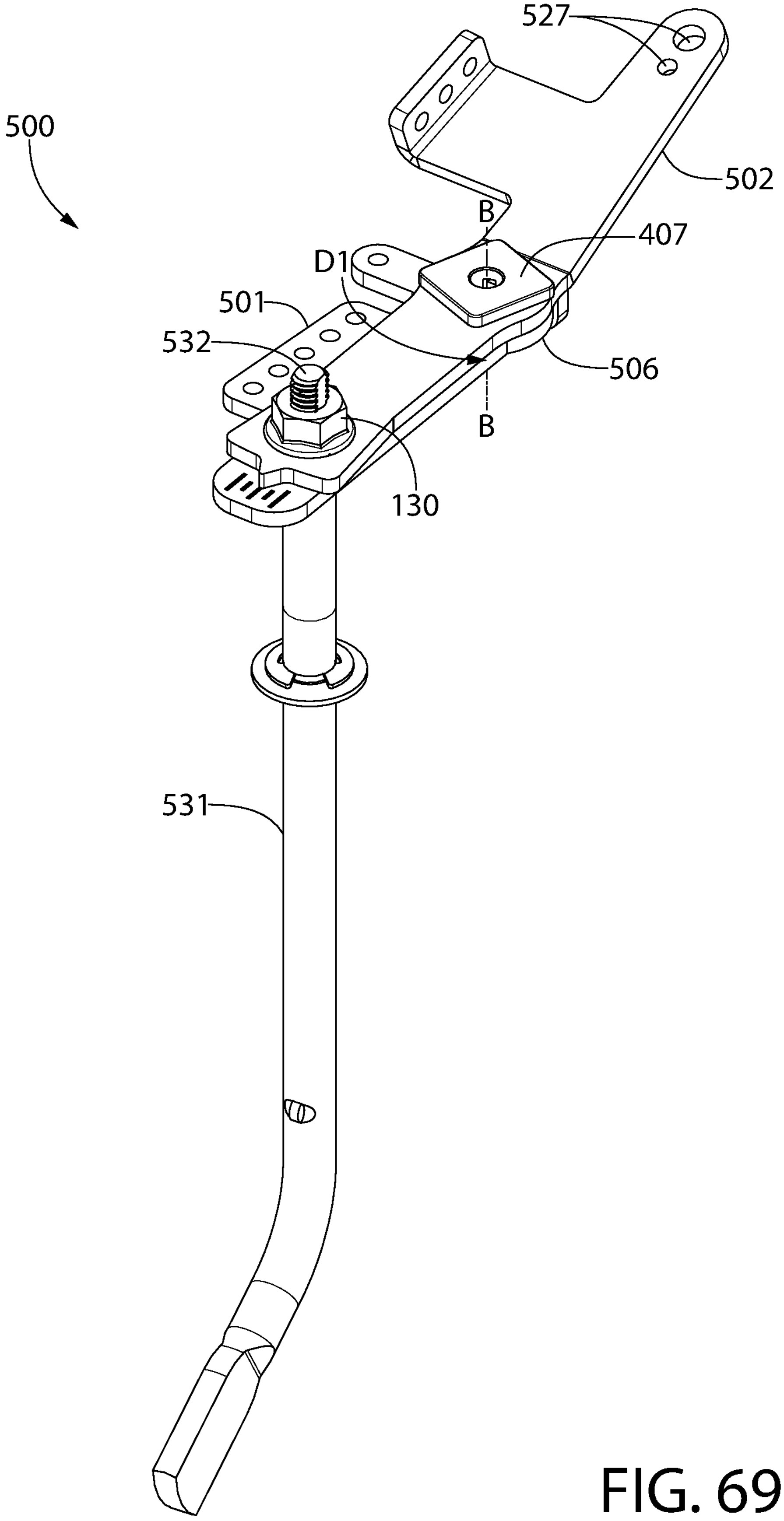
FIG. 69 is a perspective view of a fifth implementation of a linkage assembly and a governor shaft.
Figure 70:
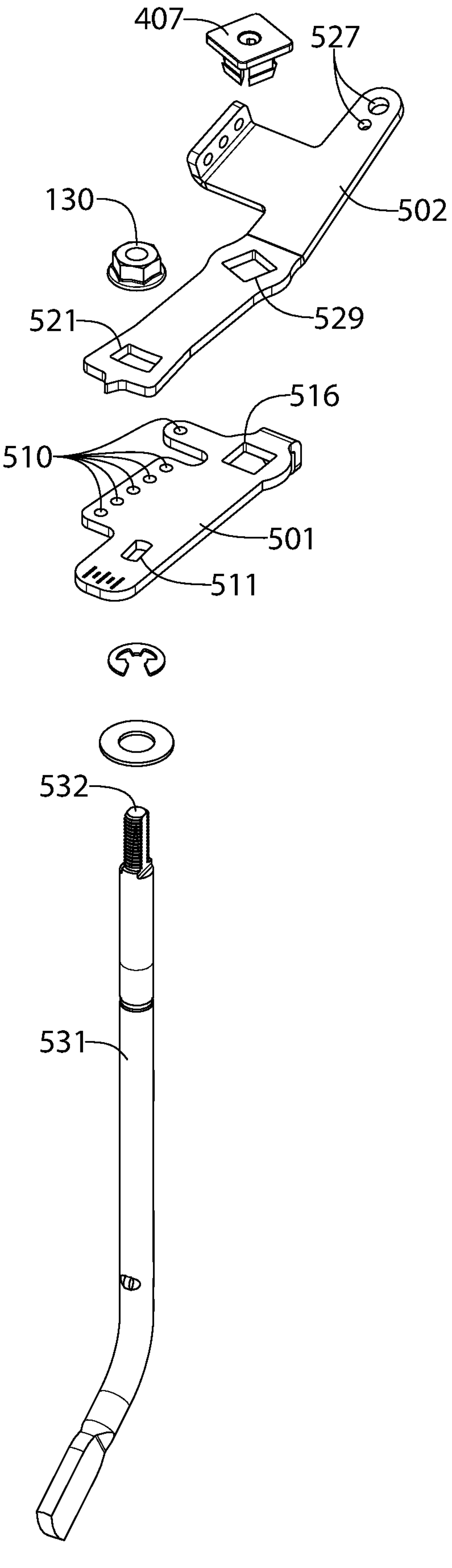
FIG. 70 is an exploded view of the linkage assembly and governor shaft of FIG. 69.

Turning to FIGS. 67 and 68, the primary arm 401 is illustrated in greater detail. The primary arm 401 has the hole 416, the aperture 411, and the plurality of holes 410. The aperture 411 may be a slot having two arcuate sides and two flat sides, or it may be any other shape suitable for non-rotatable connection to the proximal end 332 of the governor shaft 331. In other configurations, it may be a D shape, or it may be a spline or other shape. The primary arm 401 may be planar and have a generally L shaped configuration. In other implementations, the primary arm 401 may be non-planar and be elongate or have any other shape.

The primary arm 401 also incorporates a plurality of graduations 470 which, in combination with the indicator 469 of the secondary arm 402, may be utilized to indicate the current setting of the secondary arm 402 with respect to the primary arm 401. In other implementations, the indicator 469 and the graduations 470 may be reversed such that the indicator 469 is on the primary arm 401 and the graduations 470 are on the secondary arm 402. In yet other configurations, other means of position indication may be used or the indicator 469 and graduations 470 may be omitted.

The hole 416 has a substantially square shape, with four sides 471, each side 471 substantially perpendicular to each adjacent side 471. A plurality of corners 472 are formed at the intersection between adjacent sides 471. The corners 472 are substantially sharp, with no substantial radii or chamfer. In other embodiments, the corners 472 may have a chamfer or other feature to engage the tabs 451 as the secondary arm 402 is rotated with respect to the primary arm 401. Regardless of the shape of the corners 472, the tabs 451 deflect in response to relative rotation between the primary and secondary arms 401, 402, providing a biasing torque which biases the secondary arm 402 in the first rotational direction $D_1$.

The amount of biasing torque can be adjusted by a variety of factors including the stiffness of the tabs 451 and the relative positioning of the sides 471 of the primary arm 401 with respect to the sides 461 of the secondary arm 402. In other words, no biasing torque is present when the sides 471 are parallel with the sides 461. It is necessary to set the rotational position of the sides 471 with respect to the sides 461 to achieve the desired biasing torque at both the first and second positions of the secondary arm 402. The rotational angle between the sides 461 and the sides 471 may vary depending on the desired biasing torque, the properties and geometry of the pivot member 407, and the desired range of motion.

Turning to FIGS. 69-74, a fifth implementation of a linkage assembly 500 is illustrated. The linkage assembly 500 has a governor lever 506 that is shown coupled to a governor shaft 531 having a proximal end 532. The governor lever 506 has a primary arm 501 and a secondary arm 502, the primary arm 501 having an aperture 511. The aperture 511 receives the proximal end 532 of the governor shaft 531. The fastener 130 secures the primary and secondary arms 501, 502 to the governor shaft 531. A biasing member and throttle link are not shown, but are coupled to the secondary arm 502 in the same manner as in the linkage assembly 300.

The primary arm 501 has a plurality of holes 510 to engage the biasing element 40 so that the governor lever 506 of the linkage assembly 500 can be used to bias the governor shaft 531 into the rest position. The primary arm 501 also has a hole 516 which receives a pivot member 407. Optionally, the hole 516 may be non-circular. In the present example, the hole 516 is substantially square as will be discussed in greater detail below. The pivot member 407 extends into the hole 516 to couple the pivot member 407 to the primary arm 501. The pivot member 407 and the hole 516 are located on an axis B-B which extends perpendicular to the hole 516. Optionally, the secondary arm 502 may rotate with respect to the primary arm 501 about the axis B-B, the axis B-B extending through the pivot member 407. Thus, the pivot member 407 allows rotation of the secondary arm 502 with respect to the primary arm 501.

The secondary arm 502 has a hole 529 located on the axis B-B and configured to receive the pivot member 407. The hole 529 is a generally square shape. Thus, the secondary arm 502 may rotate about the axis B-B with respect to the primary arm 501, the axis B-B intersecting the pivot member 407. The pivot member 407 is formed of a plastic material such as nylon, but may also be formed of metal or another material. The pivot member 407 also functions as a biasing element. Thus, the arrangement of the pivot member 407, in combination with the holes 516, 529, allows pivoting of the primary and secondary arms 501, 502. In addition, the pivot member 407 may also bias the secondary arm 502 with respect to the primary arm 501 in a first rotational direction $D_1$ about the axis B-B.

The first rotational direction $D_1$ is a counter-clockwise direction. In other implementations, the first rotational direction $D_1$ may be either clockwise or counter-clockwise, depending on the desired configuration. In the case of the linkage assembly 500, the secondary arm 502 is preferably biased into a first position where the secondary arm 502 is rotated counter-clockwise with respect to the primary arm 501. In other implementations, the secondary arm 502 may be biased into a second position where the secondary arm 502 is rotated clockwise with respect to the primary arm 501.

The secondary arm 502 further has an aperture 521 and a plurality of holes 527. The plurality of holes 527 are utilized to connect the throttle link and the biasing element. The aperture 521 is shaped so that it receives the proximal end 532 of the governor shaft 531. The aperture 521 is also shaped to permit relative rotation of the secondary arm 502 with respect to the primary arm 501. Thus, the fastener 130 may be loosened, the correct relative orientation between the primary arm 501 and the secondary arm 502 set, and the fastener 130 may be tightened to clamp the primary arm 501 to the secondary arm 502 by virtue of threads on the proximal end 532 of the governor shaft 531. Thus, the relative orientation of the governor shaft 531 may be set with respect to the throttle link and the throttle valve 21. This ensures rapid and reliable setting of the governor 30 during assembly or maintenance.

As can be seen, the aperture 521 sets the travel limits and defines the first and second positions of the secondary arm 502 with respect to the primary arm 501. Thus, the aperture 521 of the secondary arm 502 is used to control the range of motion. Optionally, the aperture 521 and the aperture 511 may be reversed, such that the aperture 511 is located on the secondary arm 502 and the aperture 521 is located on the primary arm 501. The aperture 521 may be a slot having a generally arcuate shape, with straight or arcuate ends defining the travel limits of the secondary arm 502.

Figure 71:
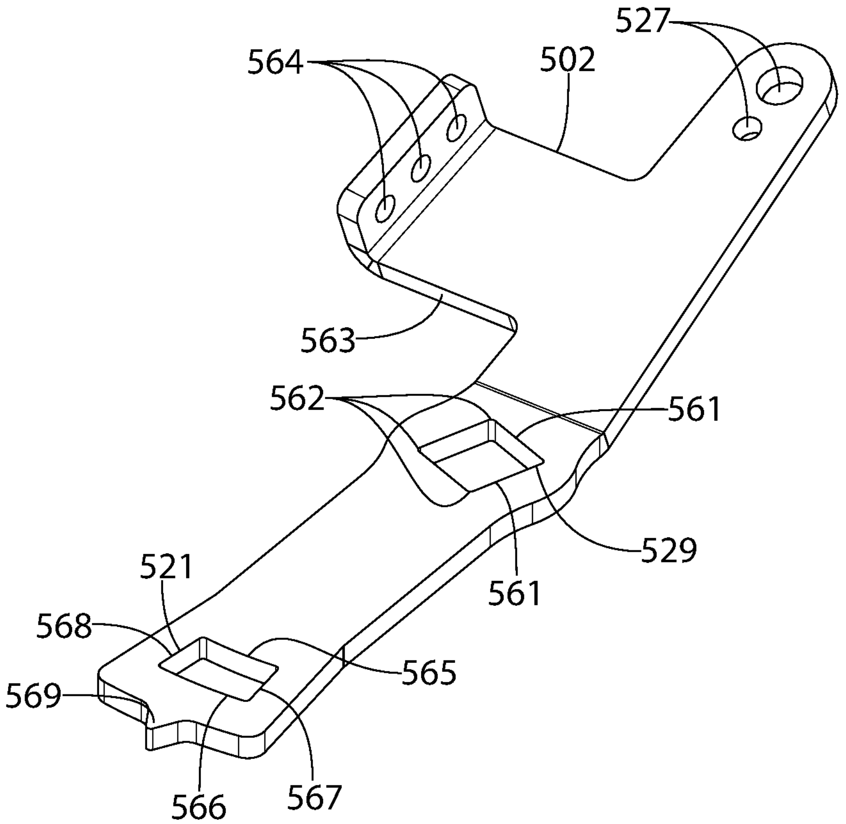
FIG. 71 is a perspective view of a secondary arm of the governor lever thereof.
Figure 72:
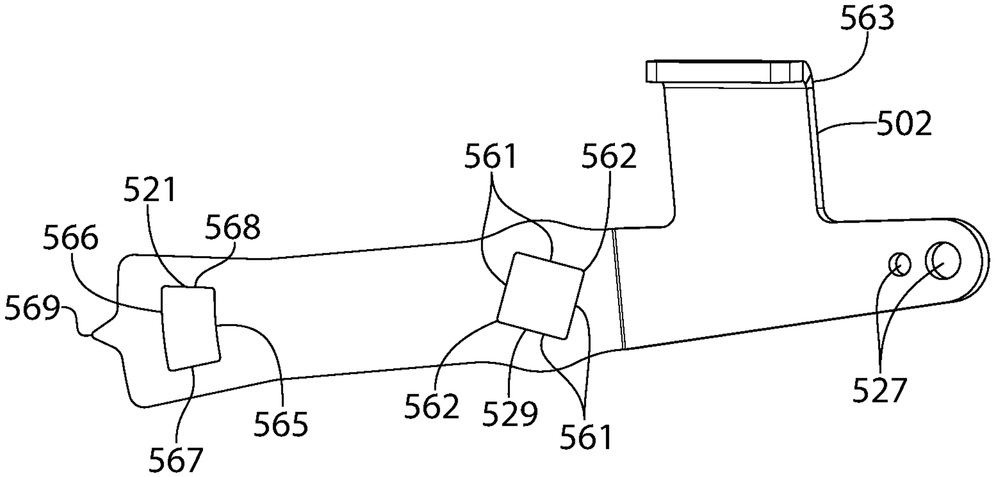
FIG. 72 is a top plan view of the secondary arm of the governor lever thereof.

FIGS. 71 and 72 illustrate the secondary arm 502 in greater detail. The secondary arm 502 incorporates the plurality of holes 527 for receiving the throttle link, the hole 529 for receiving the pivot member 407, and the aperture 521 for receiving the proximal end 532 of the governor shaft 531 while allowing a range of adjustment between the primary and secondary arms 501, 502. The hole 529 has a square shape as noted above. The hole 529 has four sides 561, each of the sides 561 sized to receive a tab 451 of the pivot member 407. Adjacent ones of the sides 561 are substantially perpendicular and terminate in corners 562 that have little or no radius or other deviation from a sharp corner. Optionally, the corners 562 may incorporate a chamfer, radius, or other feature if desired. In alternate configurations, the hole 529 may be a cruciform shape or other shape suitable for receiving the tabs 451 of the pivot member 407. The sides 561 prevent rotation of the pivot member 407 within the hole 529.

The aperture 521 has an arcuate inner wall 565, an arcuate outer wall 566, and first and second lateral sides 567, 568 which extend from the arcuate inner wall 565 to the arcuate outer wall 566. The first and second lateral sides 567, 568 constrain motion of the secondary arm 502 when they contact with the proximal end 532 of the governor shaft 531. An indicator 569 may be formed on the secondary arm 502 to indicate the position or orientation of the secondary arm 502 with respect to the primary arm 501. Optionally, one or more bends may be utilized to place the plurality of holes 527 on a different plane than the hole 529 and the aperture 521. This may be done for clearance reasons or may be done to better align the throttle link and increase reliability of the linkage assembly 500. In addition, a tab 563 may be formed on the secondary arm 502 to connect additional components. The tab 563 may have additional holes 564 or other features to retain biasing elements or links.

Figure 73:
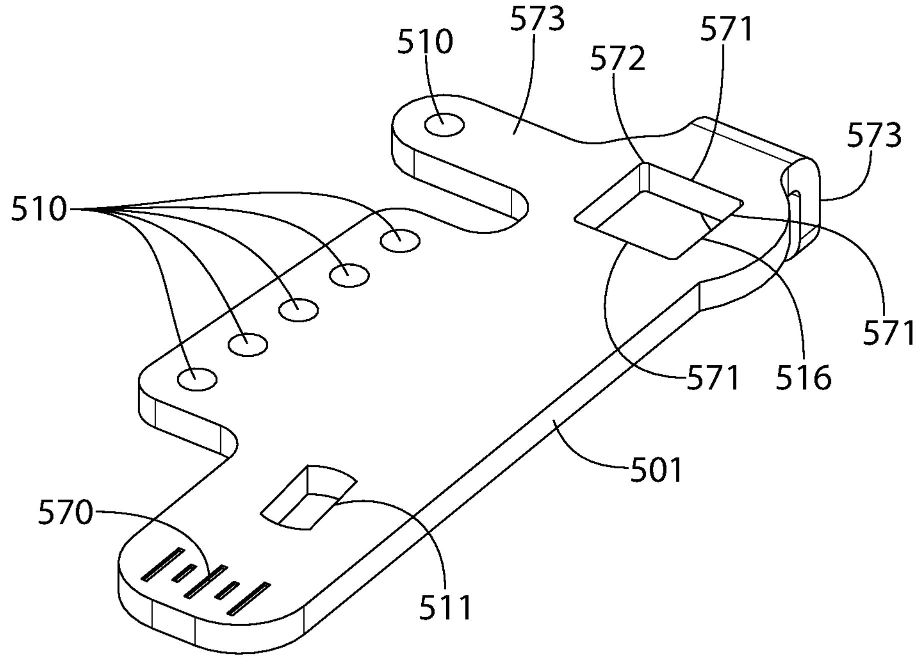
FIG. 73 is a perspective view of a primary arm of the governor lever thereof.
Figure 74:
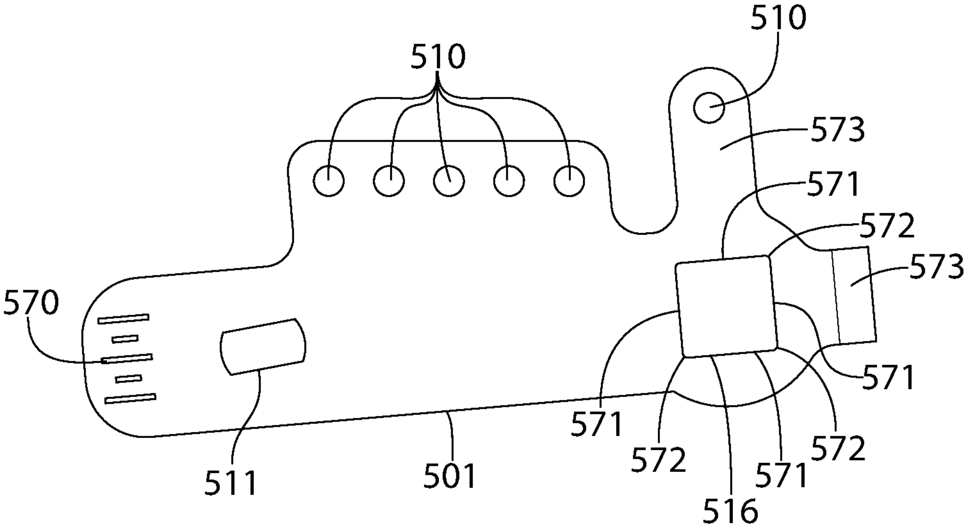
FIG. 74 is a top plan view of the primary arm of the governor lever thereof.
Figure 75:
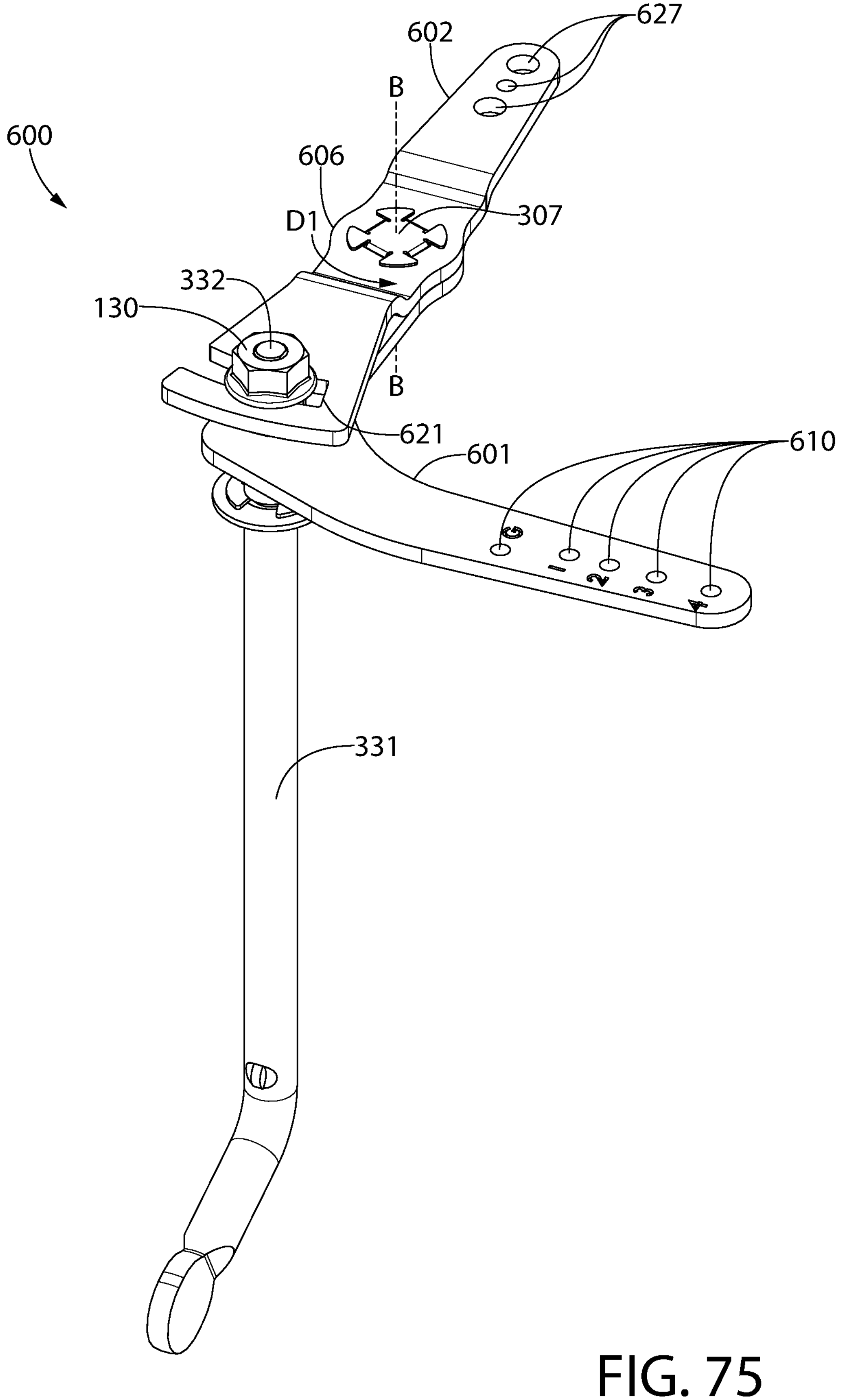
FIG. 75 is a perspective view of a sixth implementation of a linkage assembly and a governor shaft.
Figure 76:
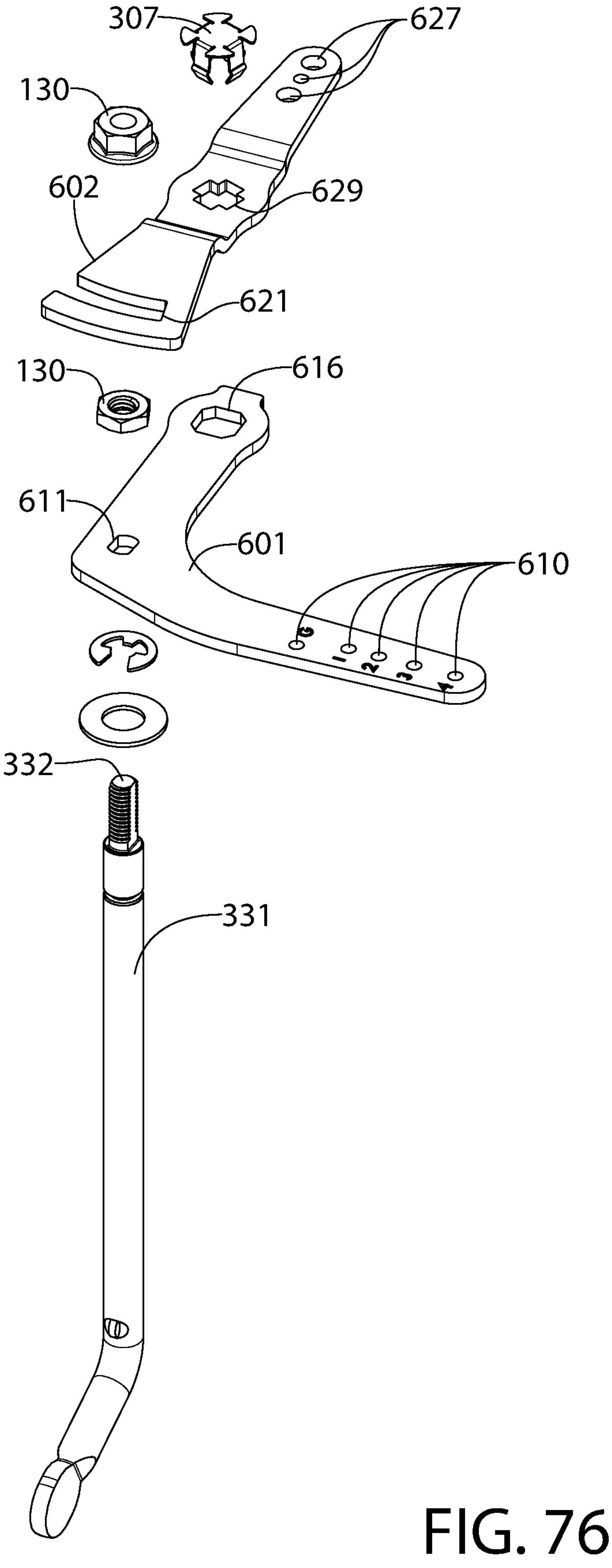
FIG. 76 is an exploded view of the linkage assembly and governor shaft of FIG. 75.

Turning to FIGS. 73 and 74, the primary arm 501 is illustrated in greater detail. The primary arm 501 has the hole 516, the aperture 511, and the plurality of holes 510.

The aperture 511 may be a slot having two arcuate sides and two flat sides, or it may be any other shape suitable for non-rotatable connection to the proximal end 532 of the governor shaft 531. In other configurations, it may be a D shape, or it may be a spline or other shape. The primary arm 501 also incorporates a plurality of tabs 573. The tabs 573 may serve a variety of purposes, including ensuring correct orientation of the primary arm 501 during assembly. The primary arm 501 may be planar and have a elongate configuration. In other implementations, the primary arm 501 may be non-planar and be L shaped or have any other shape.

The primary arm 501 also incorporates a plurality of graduations 570 which, in combination with the indicator 569 of the secondary arm 502, may be utilized to indicate the current setting of the secondary arm 502 with respect to the primary arm 501. In other implementations, the indicator 569 and the graduations 570 may be reversed such that the indicator 569 is on the primary arm 501 and the graduations 570 are on the secondary arm 502. In yet other configurations, other means of position indication may be used or the indicator 569 and graduations 570 may be omitted.

The hole 516 has a substantially square shape, with four sides 571, each side 571 substantially perpendicular to each adjacent side 571. A plurality of corners 572 are formed at the intersection between adjacent sides 571. The corners 572 are substantially sharp, with no substantial radii or chamfer. In other embodiments, the corners 572 may have a chamfer or other feature to engage the tabs 451 as the secondary arm 502 is rotated with respect to the primary arm 501. Regardless of the shape of the corners 572, the tabs 451 deflect in response to relative rotation between the primary and secondary arms 501, 502, providing a biasing torque which biases the secondary arm 502 in the first rotational direction $D_1$.

The amount of biasing torque can be adjusted by a variety of factors including the stiffness of the tabs 451 and the relative positioning of the sides 571 of the primary arm 501 with respect to the sides 561 of the secondary arm 502. In other words, no biasing torque is present when the sides 571 are parallel with the sides 561. It is necessary to set the rotational position of the sides 571 with respect to the sides 561 to achieve the desired biasing torque at both the first and second positions of the secondary arm 502. The rotational angle between the sides 561 and the sides 571 may vary depending on the desired biasing torque, the properties and geometry of the pivot member 407, and the desired range of motion.

Turning to FIGS. 75-80, a sixth implementation of a linkage assembly 600 is illustrated. The linkage assembly 600 has a governor lever 606 that is shown coupled to a governor shaft 331 having a proximal end 332. The governor lever 606 has a primary arm 601 and a secondary arm 602, the primary arm 601 having an aperture 611. The aperture 611 receives the proximal end 332 of the governor shaft 331. Two fasteners 130 secure the primary and secondary arms 601, 602 to the governor shaft 331. A first one of the fasteners 130 secures the primary arm 601 to the proximal end 332 of the governor shaft 331, then the secondary arm 602 is sandwiched between the first one of the fasteners 130 and a second one of the fasteners 130. A biasing member and throttle link are not shown, but are coupled to the secondary arm 602 in the same manner as in the linkage assembly 300.

The primary arm 601 has a plurality of holes 610 to engage the biasing element 40 so that the governor lever 606 of the linkage assembly 600 can be used to bias the governor shaft 331 into the rest position. The primary arm 601 also has a hole 616 which receives a pivot member 307. Optionally, the hole 616 may be non-circular. In the present example, the hole 616 is substantially square as will be discussed in greater detail below. The pivot member 307 extends into the hole 616 to couple the pivot member 307 to the primary arm 601. The pivot member 307 and the hole 616 are located on an axis B-B which extends perpendicular to the hole 616. Optionally, the secondary arm 602 may rotate with respect to the primary arm 601 about the axis B-B, the axis B-B extending through the pivot member 307. Thus, the pivot member 307 allows rotation of the secondary arm 602 with respect to the primary arm 601.

The secondary arm 602 has a hole 629 located on the axis B-B and configured to receive the pivot member 307. The hole 629 is a generally cruciform shape. Thus, the secondary arm 602 may rotate about the axis B-B with respect to the primary arm 601, the axis B-B intersecting the pivot member 607. The pivot member 307 is formed of a metal material such as spring steel, but may also be formed of plastic or another material. The pivot member 307 also functions as a biasing element. Thus, the arrangement of the pivot member 307, in combination with the holes 616, 629, allows pivoting of the primary and secondary arms 601, 602. In addition, the pivot member 307 may also bias the secondary arm 602 with respect to the primary arm 601 in a first rotational direction $D_1$ about the axis B-B.

The first rotational direction $D_1$ is a counter-clockwise direction. In other implementations, the first rotational direction $D_1$ may be either clockwise or counter-clockwise, depending on the desired configuration. In the case of the linkage assembly 600, the secondary arm 602 is preferably biased into a first position where the secondary arm 602 is rotated counter-clockwise with respect to the primary arm 601. In other implementations, the secondary arm 602 may be biased into a second position where the secondary arm 602 is rotated clockwise with respect to the primary arm 601.

The secondary arm 602 further has a slot 621 and a plurality of holes 627. The plurality of holes 627 are utilized to connect a throttle link 303 and may optionally receive additional links or biasing elements as desired. The slot 621 is shaped so that it receives the proximal end 332 of the governor shaft 331. The slot 621 is also shaped to permit relative rotation of the secondary arm 602 with respect to the primary arm 601. Thus, the second fastener 130 mentioned above may be loosened, the correct relative orientation between the primary arm 601 and the secondary arm 602 set, and the fastener 130 may be tightened to clamp the primary arm 601 to the secondary arm 602 by virtue of threads on the proximal end 332 of the governor shaft 331. Thus, the relative orientation of the governor shaft 331 may be set with respect to the throttle link 303 and the throttle valve 21. This ensures rapid and reliable setting of the governor 30 during assembly or maintenance.

As can be seen, the slot 621 sets a travel limit in one direction and defines the second position of the secondary arm 602 with respect to the primary arm 601. Thus, the slot 621 of the secondary arm 602 is used to partially control the range of motion. Optionally, the slot 621 and the aperture 611 may be reversed, such that the aperture 611 is located on the secondary arm 602 and the slot 621 is located on the primary arm 601. The slot 621 may be a slot having a generally arcuate shape, with an open end and a straight or arcuate end. The straight or arcuate end defines the travel limit of the secondary arm 602.

Figure 77:
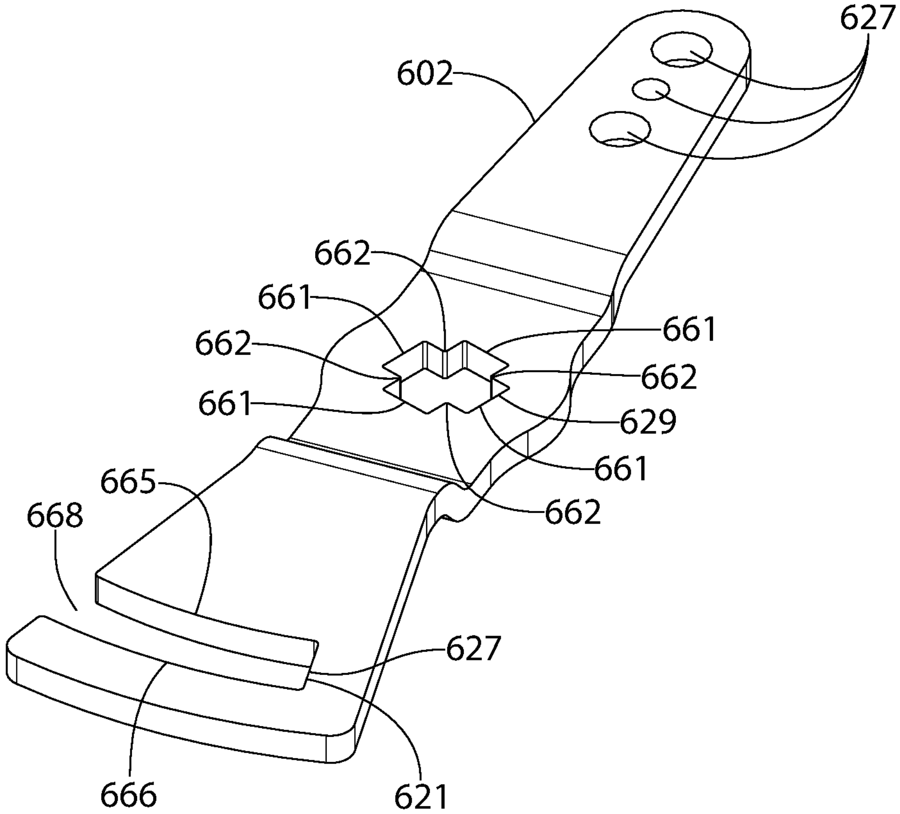
FIG. 77 is a perspective view of a secondary arm of the governor lever thereof.
Figure 78:
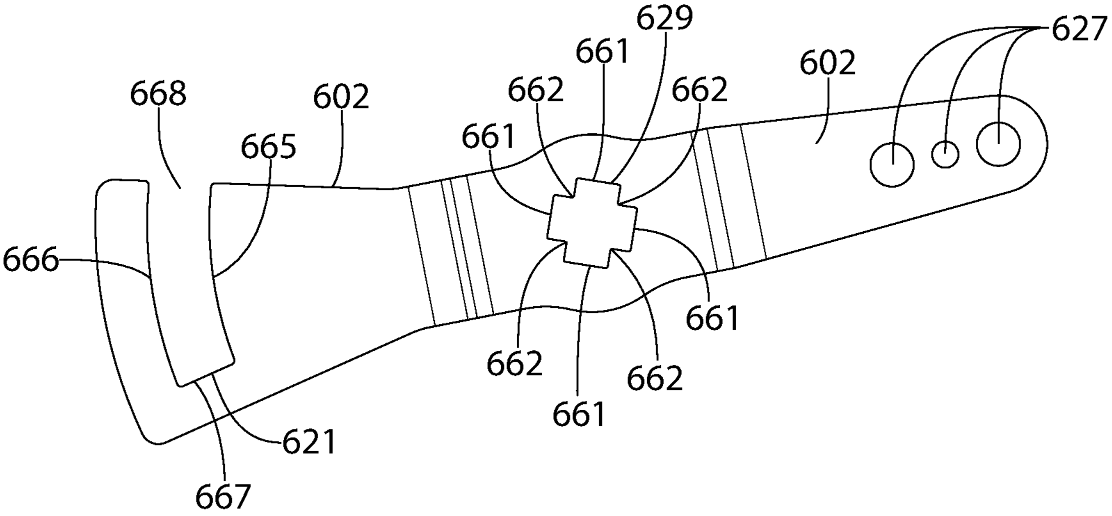
FIG. 78 is a top plan view of the secondary arm of the governor lever thereof.

FIGS. 77 and 78 illustrate the secondary arm 602 in greater detail. The secondary arm 602 incorporates the plurality of holes 627 for receiving the throttle link 303, the hole 629 for receiving the pivot member 307, and the slot 621 for receiving the proximal end 332 of the governor shaft 331 while allowing a range of adjustment between the primary and secondary arms 601, 602. The hole 629 has a cruciform shape as noted above. The hole 629 incorporates four notches 661, each of the notches 661 sized to receive a tab 351 of the pivot member 307. The notches 661 terminate in corners 662 which isolate the notches 661 from one another. The notches 661 prevent rotation of the pivot member 307 within the hole 629.

The slot 621 has an arcuate inner wall 665 and an arcuate outer wall 666. A first lateral side 667 and a second open side 668 extend from the arcuate inner wall 665 to the arcuate outer wall 666. The first lateral side 667 constrains motion of the secondary arm 602 when it comes in contact with the proximal end 332 of the governor shaft 331. Optionally, one or more bends may be utilized to place the plurality of holes 627 on a different plane than the hole 629 and the slot 621. This may be done for clearance reasons or may be done to better align the throttle link 303 and increase reliability of the linkage assembly 600. As can be seen, bends may also be utilized to place the slot 621 and the hole 629 on different planes. This may be done to accommodate a fastener 130 which may be sandwiched between the primary and secondary arms 601, 602 or may be done for any other reason including clearance or improving fit of the linkage assembly 600.

Figure 79:
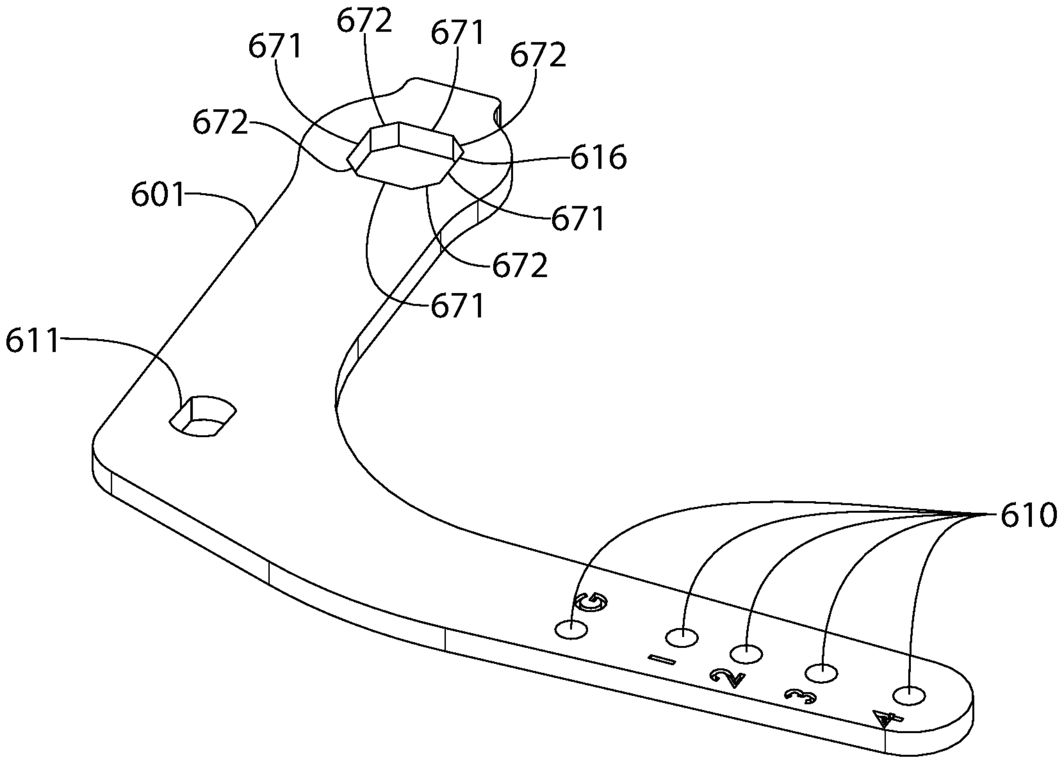
FIG. 79 is a perspective view of a primary arm of the governor lever thereof.
Figure 80:
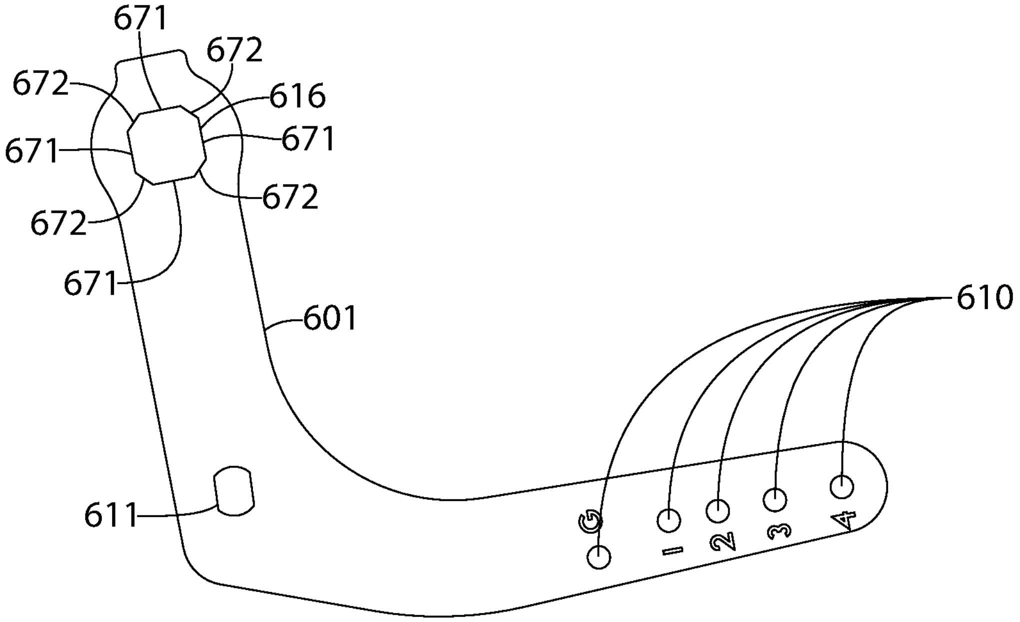
FIG. 80 is a top plan view of the primary arm of the governor lever thereof.
Figure 81:
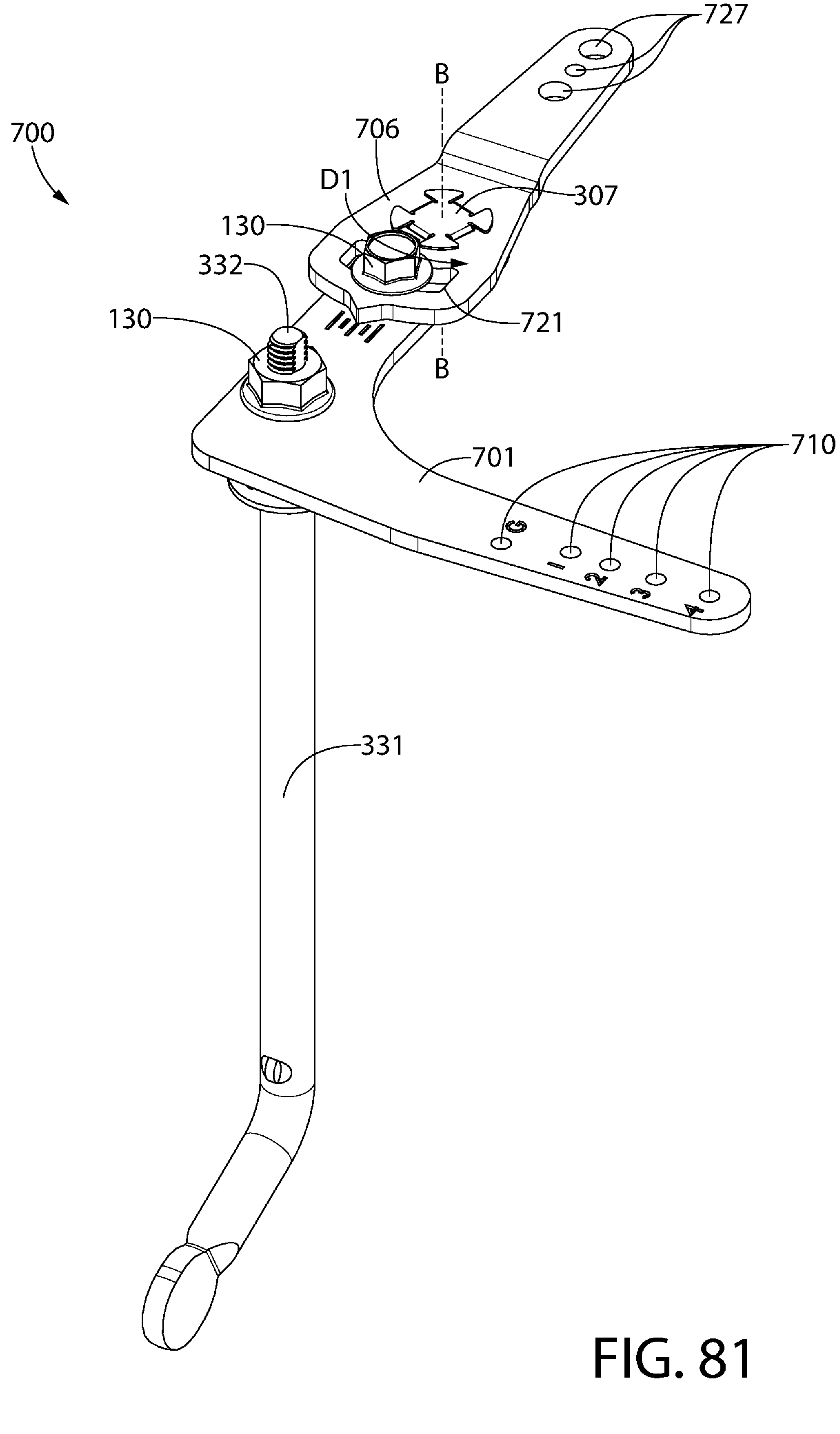
FIG. 81 is a perspective view of a seventh implementation of a linkage assembly and a governor shaft.
Figure 82:
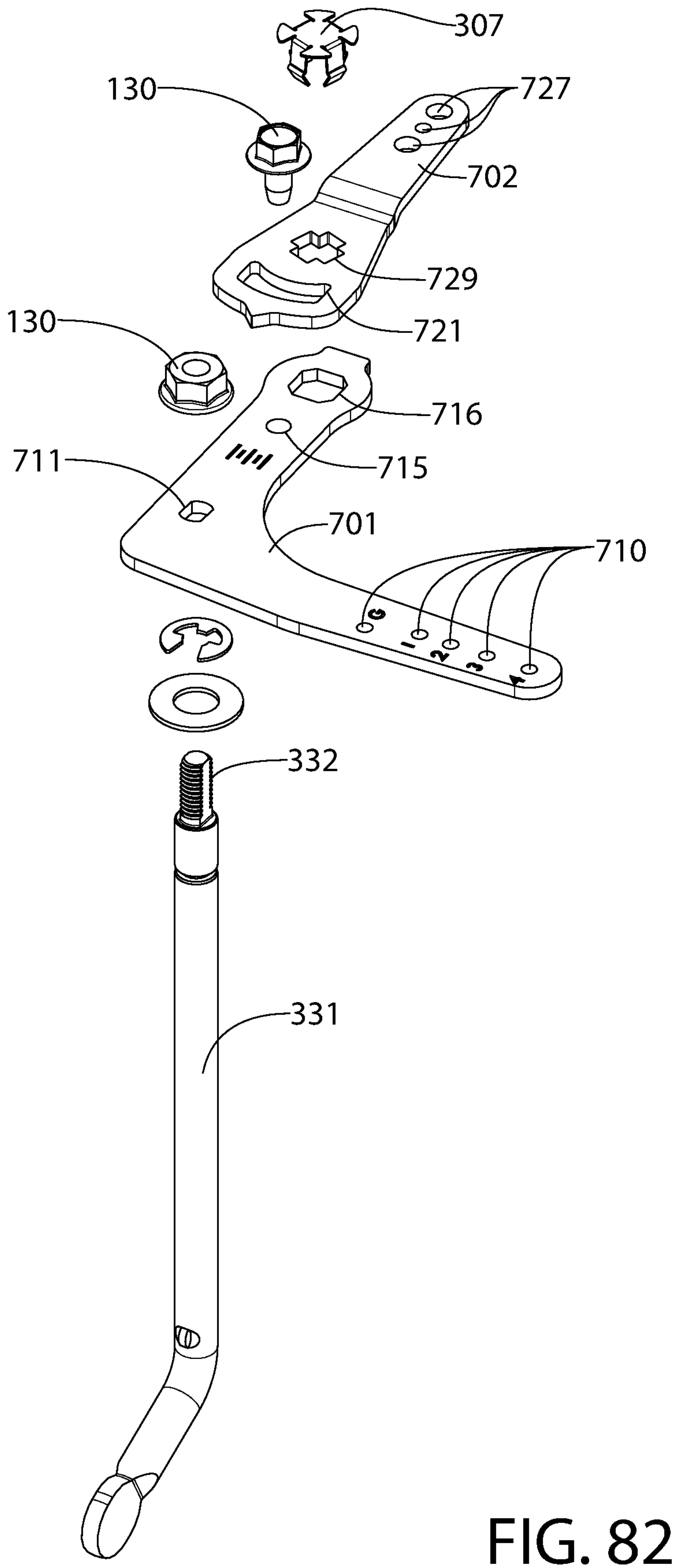
FIG. 82 is an exploded view of the linkage assembly and governor shaft of FIG. 81.

Turning to FIGS. 79 and 80, the primary arm 601 is illustrated in greater detail. The primary arm 601 has the hole 616, the aperture 611, and the plurality of holes 610. The aperture 611 may be a slot having two arcuate sides and two flat sides, or it may be any other shape suitable for non-rotatable connection to the proximal end 332 of the governor shaft 331. In other configurations, it may be a D shape, or it may be a spline or other shape. The primary arm 601 may be planar and have a generally L shaped configuration. In other implementations, the primary arm 601 may be non-planar and be elongate or have any other shape.

The hole 616 has a substantially square shape, with four sides 671, each side 671 substantially perpendicular to each adjacent side 671. A plurality of projections 672 extend between adjacent sides 671. The projections 672 engage the tabs 351 as the secondary arm 602 is rotated with respect to the primary arm 601. The tabs 351 deflect, providing a biasing torque which biases the secondary arm 602 in the first rotational direction $D_1$.

The amount of biasing torque can be adjusted by a variety of factors including the stiffness of the tabs 351 and the relative positioning of the sides 671 of the primary arm 601 with respect to the notches 661 of the secondary arm 602. In other words, no biasing torque is present when the sides 671 are parallel with the notches 661. It is necessary to set the rotational position of the sides 671 with respect to the notches 661 to achieve the desired biasing torque at both the first and second positions of the secondary arm 602. The rotational angle between the notches 661 and the sides 671 may vary depending on the desired biasing torque, the properties and geometry of the pivot member 307, and the desired range of motion.

Turning to FIGS. 81-86, a seventh implementation of a linkage assembly 700 is illustrated. The linkage assembly 700 has a governor lever 706 that is shown coupled to a governor shaft 331 having a proximal end 332. The governor lever 706 has a primary arm 701 and a secondary arm 702, the primary arm 701 having an aperture 711. The aperture 711 receives the proximal end 332 of the governor shaft 331. A first fastener 130 secures the primary arm 701 to the governor shaft 331. A second fastener 130 secures the secondary arm 701 to the primary arm 701. A biasing member and throttle link are not shown, but are coupled to the secondary arm 702 in the same manner as in the linkage assembly 300.

The primary arm 701 has a plurality of holes 710 to engage the biasing element 40 so that the governor lever 706 of the linkage assembly 700 can be used to bias the governor shaft 331 into the rest position. The primary arm 701 also has a hole 716 which receives a pivot member 307. Optionally, the hole 716 may be non-circular. In the present example, the hole 716 is substantially square as will be discussed in greater detail below.

The pivot member 307 extends into the hole 716 to couple the pivot member 307 to the primary arm 701. The pivot member 307 and the hole 716 are located on an axis B-B which extends perpendicular to the hole 716. Optionally, the secondary arm 702 may rotate with respect to the primary arm 701 about the axis B-B, the axis B-B extending through the pivot member 307. Thus, the pivot member 307 allows rotation of the secondary arm 702 with respect to the primary arm 701. The primary arm 701 further has a hole 715 which receives a fastener 130 such as a bolt. Optionally, this hole 715 may be threaded or may be a plain hole. In yet other configurations the hole 715 may be substituted for a stud, threaded protuberance, or a pin which can receive a fastener 130. The hole 715 receives a fastener 130 which couples the primary arm 701 to the secondary arm 702 and allows setting of relative position between the primary arm 701 and the secondary arm 702.

The secondary arm 702 has a hole 729 located on the axis B-B and configured to receive the pivot member 307. The hole 729 is a generally cruciform shape. Thus, the secondary arm 702 may rotate about the axis B-B with respect to the primary arm 701, the axis B-B intersecting the pivot member 307. The pivot member 307 is formed of a metal material such as spring steel, but may also be formed of plastic or another material. The pivot member 307 also functions as a biasing element. Thus, the arrangement of the pivot member 307, in combination with the holes 716, 729, allows pivoting of the primary and secondary arms 701, 702. In addition, the pivot member 307 may also bias the secondary arm 702 with respect to the primary arm 701 in a first rotational direction $D_1$ about the axis B-B.

The first rotational direction $D_1$ is a counter-clockwise direction. In other implementations, the first rotational direction $D_1$ may be either clockwise or counter-clockwise, depending on the desired configuration. In the case of the linkage assembly 700, the secondary arm 702 is preferably biased into a first position where the secondary arm 702 is rotated counter-clockwise with respect to the primary arm 701. In other implementations, the secondary arm 702 may be biased into a second position where the secondary arm 702 is rotated clockwise with respect to the primary arm 701.

The secondary arm 702 further has an aperture 721 and a plurality of holes 727. The plurality of holes 727 are utilized to connect a throttle link and may optionally receive additional links or biasing elements as desired. The aperture 721 is shaped so that it receives a fastener 130 as discussed above. The aperture 721 is also shaped to permit relative rotation of the secondary arm 702 with respect to the fastener 130. Thus, the fastener 130 mentioned above may be loosened, the correct relative orientation between the primary arm 701 and the secondary arm 702 set, and the fastener 130 may be tightened to clamp the primary arm 701 to the secondary arm 702. Thus, the relative orientation of the governor shaft 331 may be set with respect to the throttle link 303 and the throttle valve 21. This ensures rapid and reliable setting of the governor 30 during assembly or maintenance.

As can be seen, the aperture 721 sets the travel limits and defines the first and second positions of the secondary arm 702 with respect to the primary arm 701. Thus, the aperture 721 of the secondary arm 702 is used to control the range of motion. The aperture 721 may be a slot having a generally arcuate shape, with straight or arcuate ends defining the travel limits of the secondary arm 702.

Figure 83:
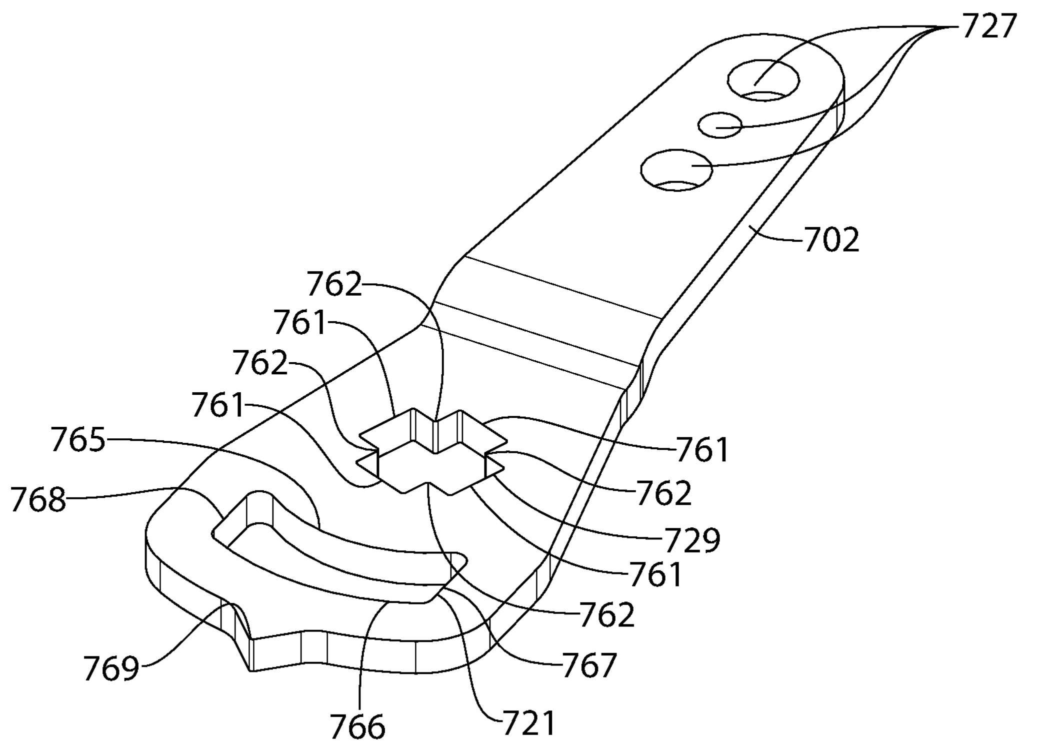
FIG. 83 is a perspective view of a secondary arm of the governor lever thereof.
Figure 84:
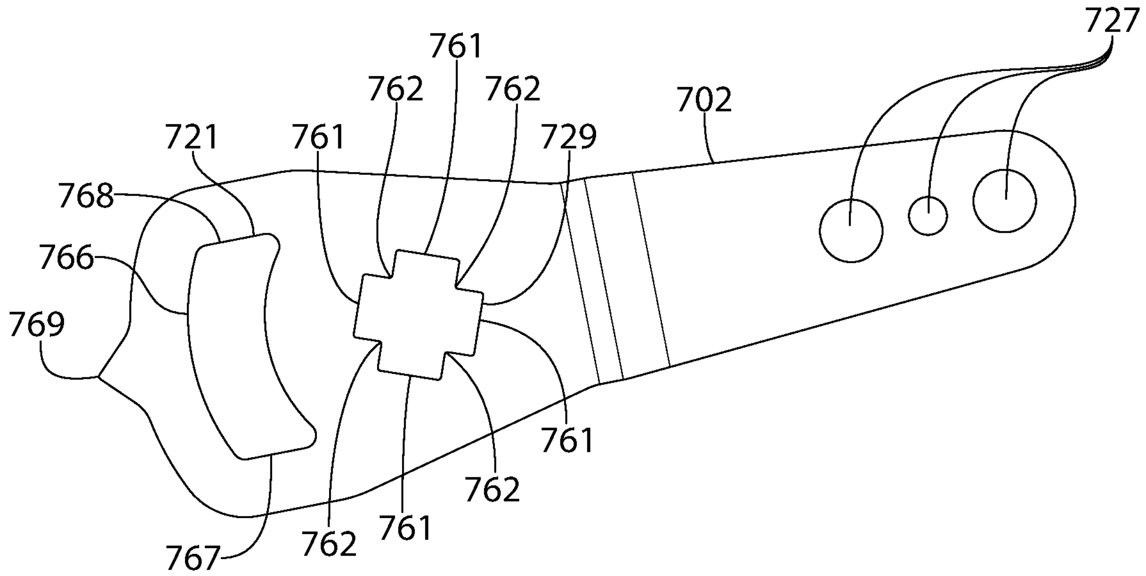
FIG. 84 is a top plan view of the secondary arm of the governor lever thereof.

FIGS. 83 and 84 illustrate the secondary arm 702 in greater detail. The secondary arm 702 incorporates the plurality of holes 727 for receiving the throttle link 303, the hole 729 for receiving the pivot member 307, and the aperture 721 for receiving the proximal end 332 of the governor shaft 331 while allowing a range of adjustment between the primary and secondary arms 701, 702. The hole 729 has a cruciform shape as noted above. The hole 729 incorporates four notches 761, each of the notches 761 sized to receive a tab 351 of the pivot member 307. The notches 761 terminate in corners 762 which isolate the notches 761 from one another. The notches 761 prevent rotation of the pivot member 307 within the hole 729.

The aperture 721 has an arcuate inner wall 765, an arcuate outer wall 766, and first and second lateral sides 767, 768 which extend from the arcuate inner wall 765 to the arcuate outer wall 766. The first and second lateral sides 767, 768 constrain motion of the secondary arm 702 when they contact with the proximal end 332 of the governor shaft 331. An indicator 769 may be formed on the secondary arm 702 to indicate the position or orientation of the secondary arm 702 with respect to the primary arm 701. Optionally, one or more bends may be utilized to place the plurality of holes 727 on a different plane than the hole 729 and the aperture 721. This may be done for clearance reasons or may be done to better align the throttle link 303 and increase reliability of the linkage assembly 700.

Figure 85:
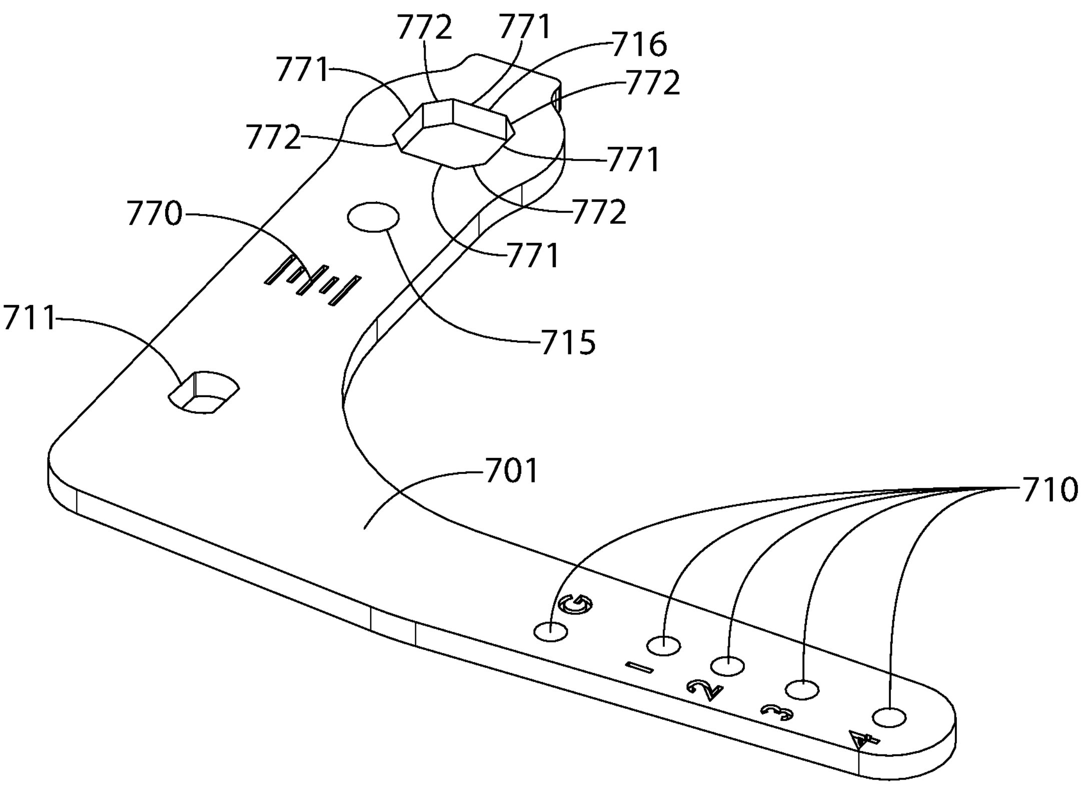
FIG. 85 is a perspective view of a primary arm of the governor lever thereof.
Figure 86:
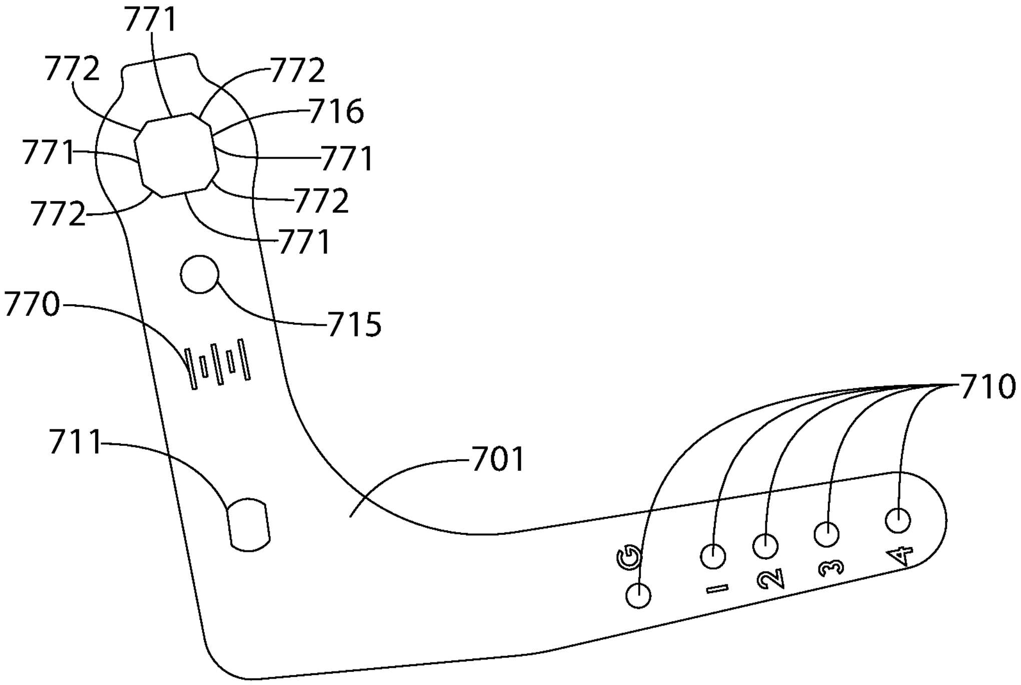
FIG. 86 is a top plan view of the primary arm of the governor lever thereof.

Turning to FIGS. 85 and 86, the primary arm 701 is illustrated in greater detail. The primary arm 701 has the hole 716, the aperture 711, the plurality of holes 710, and the hole 715. The aperture 711 may be a slot having two arcuate sides and two flat sides, or it may be any other shape suitable for non-rotatable connection to the proximal end 332 of the governor shaft 331. In other configurations, it may be a D shape, or it may be a spline or other shape. The primary arm 701 may be planar and have a generally L shaped configuration. In other implementations, the primary arm 701 may be non-planar and be elongate or have any other shape.

The primary arm 701 also incorporates a plurality of graduations 770 which, in combination with the indicator 769 of the secondary arm 702, may be utilized to indicate the current setting of the secondary arm 702 with respect to the primary arm 701. In other implementations, the indicator 769 and the graduations 770 may be reversed such that the indicator 769 is on the primary arm 701 and the graduations 770 are on the secondary arm 702. In yet other configurations, other means of position indication may be used or the indicator 369 and graduations 770 may be omitted.

The hole 716 has a substantially square shape, with four sides 771, each side 771 substantially perpendicular to each adjacent side 771. A plurality of projections 772 extend between adjacent sides 771. The projections 772 engage the tabs 351 as the secondary arm 702 is rotated with respect to the primary arm 701. The tabs 351 deflect, providing a biasing torque which biases the secondary arm 702 in the first rotational direction $D_1$.

The amount of biasing torque can be adjusted by a variety of factors including the stiffness of the tabs 351 and the relative positioning of the sides 771 of the primary arm 701 with respect to the notches 761 of the secondary arm 702. In other words, no biasing torque is present when the sides 771 are parallel with the notches 761. It is necessary to set the rotational position of the sides 771 with respect to the notches 761 to achieve the desired biasing torque at both the first and second positions of the secondary arm 702. The rotational angle between the notches 761 and the sides 771 may vary depending on the desired biasing torque, the properties and geometry of the pivot member 307, and the desired range of motion.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. A method of installation of a linkage assembly, the method comprising:

a) providing an engine comprising a fuel/air mixer and a governor, the fuel/air mixer comprising a throttle valve and the governor comprising a governor shaft;

b) coupling a primary arm of a governor lever of a linkage assembly to the governor shaft of the governor such that the primary arm is non-rotatable with respect to the governor shaft;

c) coupling a throttle link of the linkage assembly to the throttle valve of the fuel/air mixer;

d) adjusting a relative position of a secondary arm of the governor lever with respect to the primary arm; and e) securing a fastener of the linkage assembly to prevent relative movement between the primary arm and the secondary arm of the governor lever.

2. The method of claim 1 wherein, in step e), the fastener secures the primary arm to the governor shaft.

3. The method of claim 1 wherein, in step d), the governor shaft is biased into a rest state prior to adjusting the relative position of the secondary arm of the governor lever with respect to the primary arm.

4. The method of claim 3 wherein, in step d), the secondary arm is adjusted until the throttle is maintained in a wide open throttle position.

5. The method of claim 1 wherein, in step e), the fastener of the linkage assembly couples both of the primary arm and the secondary arm to the governor shaft.

6. The method of claim 1 wherein, in step b), the secondary arm is spaced and isolated from the governor shaft.

7. The method of claim 1 wherein, in step e), the fastener is coupled to governor shaft, the fastener preventing rotational motion between the primary arm and the governor shaft.

8. The method of claim 1 wherein, in step e), the fastener secures the primary arm to the secondary arm.

9. The method of claim 1 wherein the linkage assembly further comprises a pivot member.

10. The method of claim 9 wherein, in step d), the secondary arm rotates with respect to the primary arm about an axis, the axis intersecting the pivot member.

11. The method of claim 9 wherein, in step d), the secondary arm is biased in a first rotational direction about the axis.

12. The method of claim 9 wherein, in step d), the secondary arm translates with respect to the primary arm along an axis.

13. The method of claim 12 wherein, in step d), an adjustment component constrains translation of the secondary arm with respect to the primary arm.

14. The method of claim 1 wherein the linkage assembly further comprises a biasing element.

15. The method of claim 1 wherein the linkage assembly further comprises a pivot member, in step d), the pivot member biasing the secondary arm in a first rotational direction.

16. The method of claim 1 wherein the secondary arm comprises a slot, in step d), the slot allowing movement of the secondary arm with respect to the primary arm.

17. The method of claim 16 wherein the governor shaft extends through the slot in the secondary arm.

18. The method of claim 16 wherein, in step d), the slot limits motion between the primary arm and the secondary arm.

19. A method of installation of a linkage assembly, the method comprising:

a) providing an engine comprising a fuel/air mixer and a governor, the fuel/air mixer comprising a throttle valve and the governor comprising a governor shaft and a throttle link coupled to the throttle valve;

b) coupling a governor lever of a linkage assembly to the governor shaft of the governor and to the throttle link, the governor lever in a first position where the governor shaft is in a first orientation relative to the throttle link;

c) adjusting the governor lever to a second position where the governor shaft is a second orientation relative to the throttle link; and e) securing a fastener of the linkage assembly to prevent relative movement between the primary arm and the secondary arm of the governor lever.

20. The method of claim 19 wherein the governor lever comprises a primary arm coupled to the governor shaft and a secondary arm coupled to the throttle link, the primary arm configured to be adjusted relative to the secondary arm.

* * * * *